(12) United States Patent
Böttcher et al.

(10) Patent No.: US 7,792,631 B2
(45) Date of Patent: Sep. 7, 2010

(54) CONTROL SYSTEM FOR INTERNAL COMBUSTION ENGINE

(75) Inventors: Jörg Böttcher, Offenbach/Am Main (DE); Michael Fischer, Offenbach/Am Main (DE); Yuji Yasui, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 8 days.

(21) Appl. No.: 12/121,848

(22) Filed: May 16, 2008

(65) Prior Publication Data
US 2009/0192699 A1 Jul. 30, 2009

(30) Foreign Application Priority Data
Jan. 29, 2008 (EP) ................................. 08001628

(51) Int. Cl.
*F02D 41/30* (2006.01)
(52) U.S. Cl. ........................................ 701/108; 123/698
(58) Field of Classification Search ................. 123/698, 123/568.11, 568.16, 306, 299, 568.21; 701/103–106, 701/108; 60/285–286
See application file for complete search history.

(56) References Cited

U.S. PATENT DOCUMENTS

| | | | | |
|---|---|---|---|---|
| 5,537,977 A | * | 7/1996 | Hartman et al. | 123/406.46 |
| 5,542,390 A | * | 8/1996 | Hartman et al. | 123/406.68 |
| 5,755,212 A | * | 5/1998 | Ajima | 123/674 |
| 5,857,321 A | * | 1/1999 | Rajamani et al. | 60/39.27 |
| 5,964,820 A | * | 10/1999 | Miwa et al. | 701/108 |
| 6,405,122 B1 | * | 6/2002 | Yamaguchi | 701/106 |
| 6,497,212 B2 | * | 12/2002 | Matsumoto et al. | 123/295 |
| 6,725,829 B2 | * | 4/2004 | Kataoka et al. | 123/299 |
| 6,742,335 B2 | * | 6/2004 | Beck et al. | 60/605.2 |
| 7,107,978 B2 | * | 9/2006 | Itoyama | 123/683 |
| 7,270,118 B2 | * | 9/2007 | Yamaoka et al. | 123/672 |
| 7,281,518 B1 | * | 10/2007 | Allain et al. | 123/434 |
| 7,321,820 B2 | * | 1/2008 | Yanakiev et al. | 701/105 |

(Continued)

FOREIGN PATENT DOCUMENTS

DE 10125166 A1 12/2002

(Continued)

OTHER PUBLICATIONS

Bergkvist, Conny et al., "Self-organizing maps for virtual sensors, fault detection and fault isolation in diesel engines," retrieved online at http://www.control.isy.liu.se/student/exjobb/xfiles/3634.pdf (2005).

(Continued)

*Primary Examiner*—Hai H Huynh
(74) *Attorney, Agent, or Firm*—Lahive & Cockfield, LLP; Anthony A. Laurentano, Esq.

(57) ABSTRACT

A control system for an internal combustion engine having an exhaust gas recirculation device for recirculating a part of exhaust gases to an intake system of the engine is disclosed. An estimated exhaust gas recirculation amount is calculated using a neural network to which at least one engine operating parameter indicative of an operating condition of the engine is input. The neural network outputs an estimated value of an amount of exhaust gases recirculated by the exhaust gas recirculation device. At least one engine control parameter for controlling the engine is calculated based on the estimated exhaust gas recirculation amount.

14 Claims, 34 Drawing Sheets

U.S. PATENT DOCUMENTS

| | | | |
|---|---|---|---|
| 2006/0011180 A1* | 1/2006 | Sasaki et al. | 123/698 |
| 2008/0156302 A1* | 7/2008 | El Tahry et al. | 123/568.11 |
| 2008/0216557 A1* | 9/2008 | Wang et al. | 73/23.31 |
| 2009/0143959 A1* | 6/2009 | Yamaoka et al. | 701/108 |
| 2009/0192693 A1* | 7/2009 | Bottcher et al. | 701/102 |

FOREIGN PATENT DOCUMENTS

| | | |
|---|---|---|
| DE | 102005051358 A1 | 4/2007 |
| EP | 0877309 A1 | 11/1998 |
| EP | 1348857 A2 | 10/2003 |
| JP | 6-137219 | 5/1994 |
| JP | 2006-189053 | 7/2006 |
| JP | 2006-214322 | 8/2006 |
| JP | 2006-250120 | 9/2006 |
| WO | WO-2007-020456 A2 | 2/2007 |

OTHER PUBLICATIONS

Neil, Paul, "Combining a hardware neural network with a powerful automotive MCU for powertrain applications," retrieved online at http://www.industrial-embedded.com/pdfs/Axeon.Oct05.pdf (2005).

European Search Report for Application No. 08 00 1629, dated Aug. 12, 2008.

Japanese Office Action for Application No. 2008-040827, dated Jun. 15, 2010.

* cited by examiner

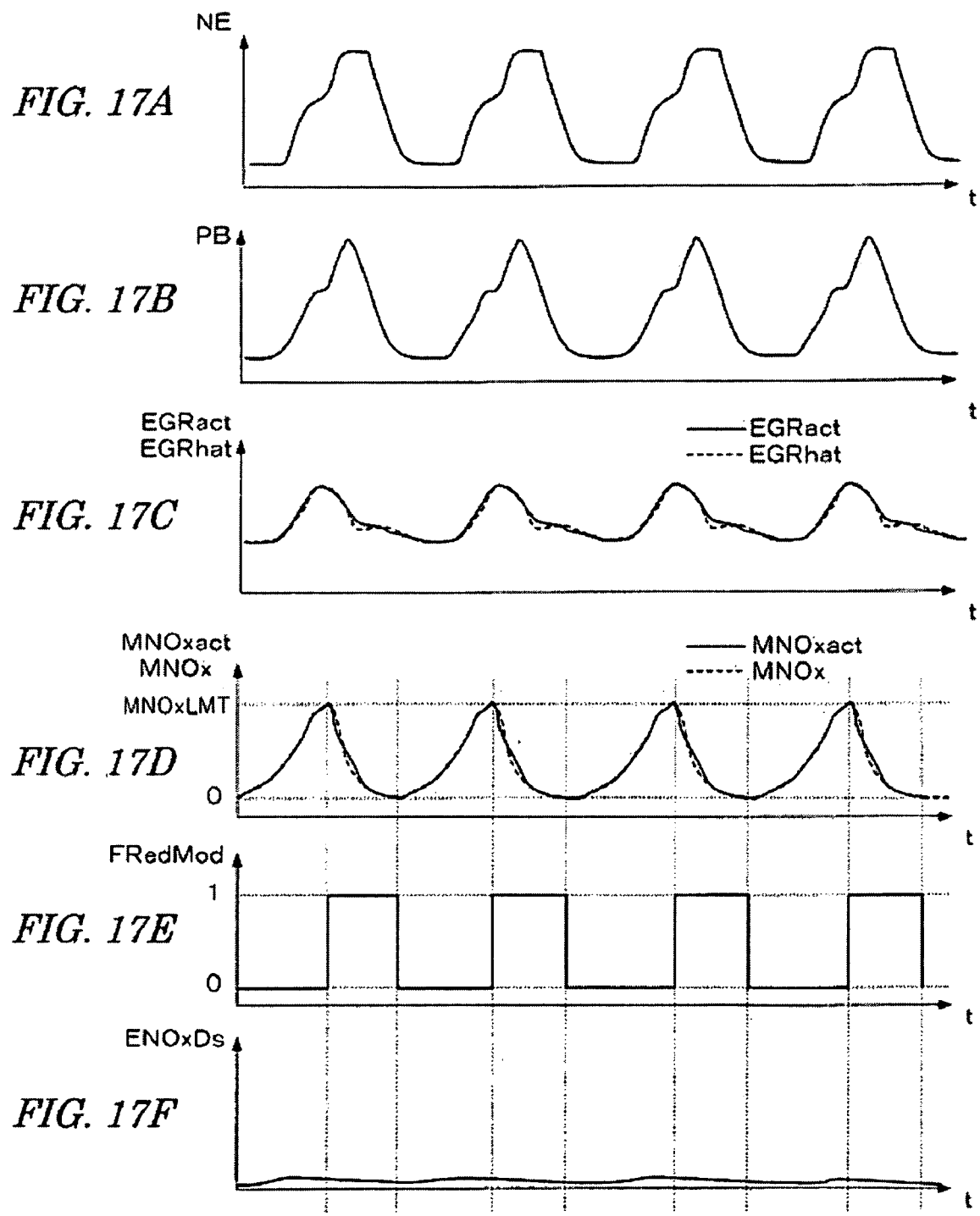

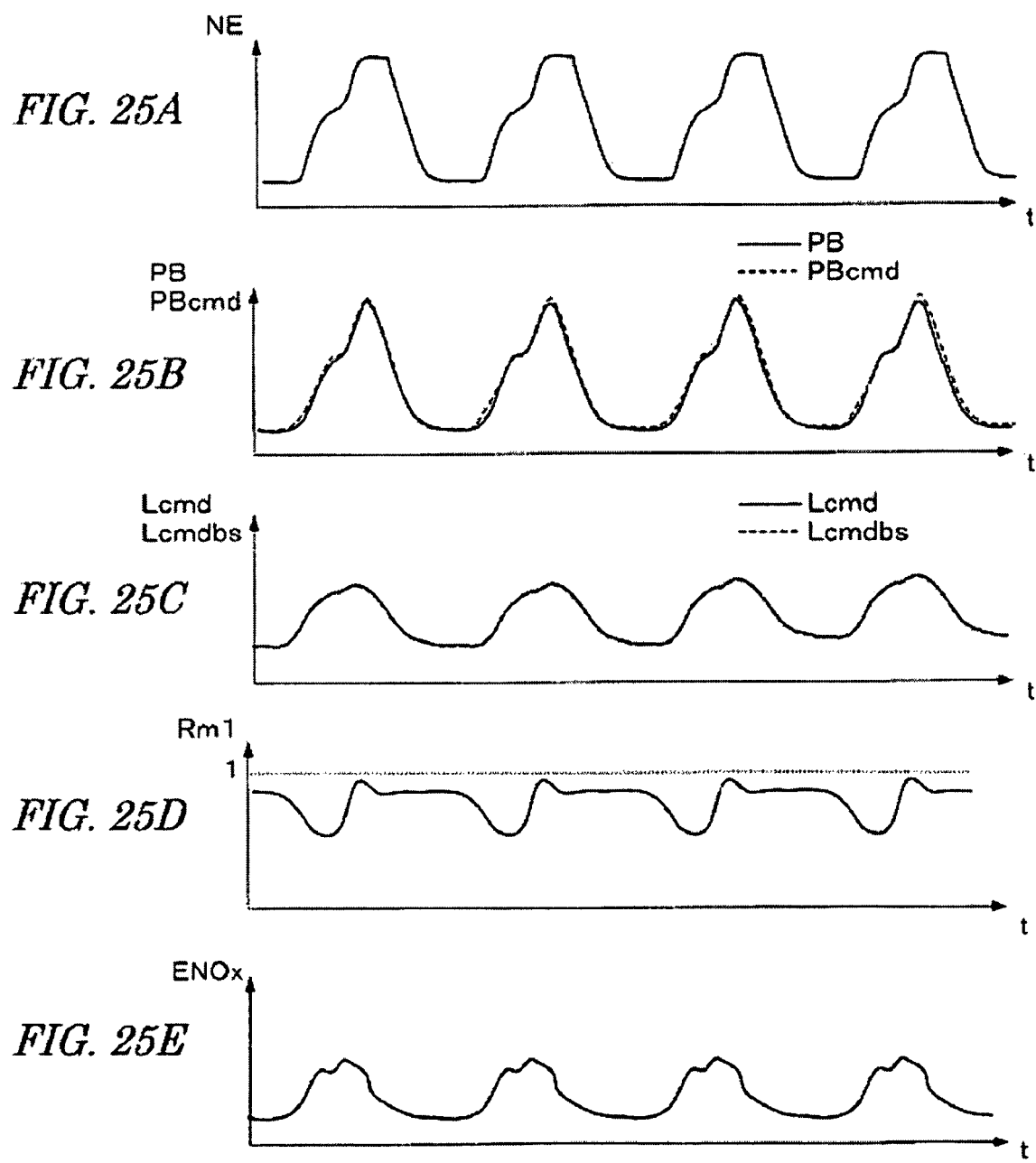

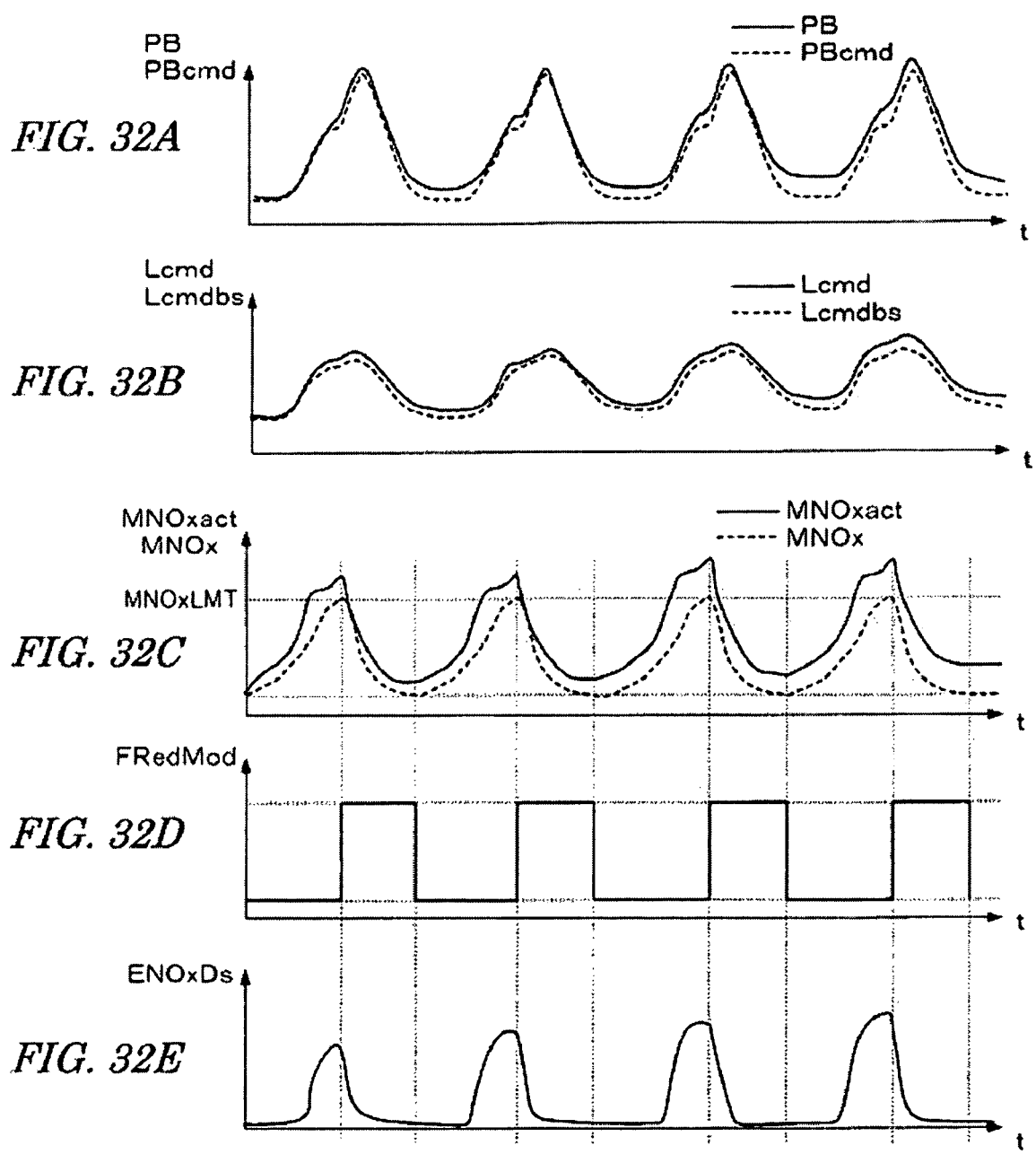

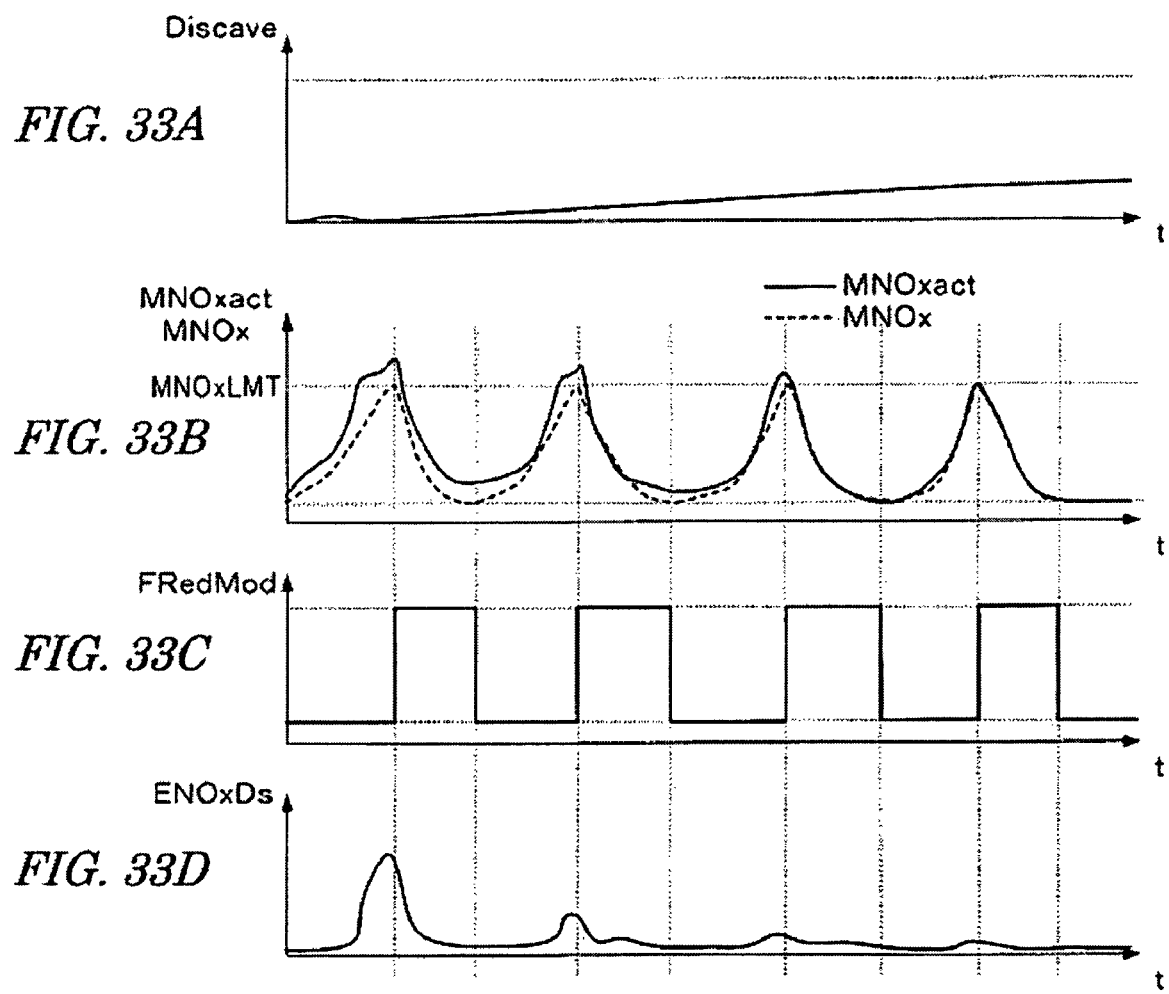

CONTROL SYSTEM FOR INTERNAL COMBUSTION ENGINE

BACKGROUND OF THE INVENTION

1. Field of the Invention

The present invention relates to a control system for an internal combustion engine, and particularly to a control system for an internal combustion engine having an exhaust gas recirculation device for recirculating a part of exhaust gases to an intake system of the engine.

2. Description of the Related Art

Japanese Patent Laid Open No. 2006-250120 (JP'120) discloses a fuel injection control apparatus for a diesel engine. According to this apparatus, a main fuel injection is performed in one combustion cycle with a plurality of divided injections (e.g., two injections), and a dividing ratio of amounts of fuel injected in the divided fuel injections (e.g., a ratio of the fuel amount of the first injection to the fuel amount of the second injection) is changed according to the engine load. With this method, deterioration of the fuel consumption rate and an increase in an amount of generated soot are suppressed when enriching the air-fuel ratio.

Further, Japanese Patent Laid Open No. 2006-214322 (JP'322) discloses a control system for an internal combustion engine having a lean NOx catalyst in the exhaust system. Since NOx is trapped in the lean NOx catalyst during a lean operation wherein the air-fuel ratio is set to a comparatively large value, it is necessary to timely supply reducing components (HC, CO) to the lean NOx catalyst so as to reduce the trapped NOx. In the system shown in JP'322, an amount of NOx trapped in the lean NOx catalyst is estimated according to an engine rotational speed and a demand torque of the engine. The NOx amount in the feed gas (gas discharged from the combustion chamber of the engine) changes depending on an exhaust gas recirculation amount (an amount of exhaust gases recirculated to the intake system). Therefore, in the system of JP'322, the amount of trapped NOx is corrected according to the exhaust gas recirculation amount.

In recent years, the demand for the diesel engine is increasing for reducing carbon-dioxide emission. On the other hand, since the regulation of the NOx emission amount is very strict especially in the United States, it is necessary to surely maintain the NOx emission amount below the regulation value for a long period of time. Therefore, it is necessary to significantly reduce the NOx emission amount of the diesel engine, and also to improve robustness of the NOx emission amount against characteristic variation in mass-produced engines (hereinafter referred to simply as "characteristic variation") or aging. The robustness means a characteristic of being hard to be influenced by the characteristic variation or aging.

As shown in JP'120, a setting of the dividing ratio when performing the divided fuel injections influences the NOx emission amount. In the apparatus described in JP'120, the dividing ratio is merely set according to the engine load. Accordingly, the robustness of the NOx emission amount cannot be improved.

Since the NOx amount in the feed gas changes depending on the exhaust gas recirculation amount, it is effective for improving the robustness to detect a deviation amount of the exhaust gas recirculation amount due to the characteristic variation or aging. However, it is difficult to accurately estimate the exhaust gas recirculation amount, using maps or tables which are previously set to calculate the exhaust gas recirculation amount, or using a physical model of the engine, since the exhaust gas recirculation amount is influenced by various factors, such as the boost pressure, the fuel injection amount, and the intake pressure.

Therefore, even if an exhaust gas recirculation amount sensor is provided to detect the exhaust gas recirculation amount, it is difficult to determine whether or not the detected value is a proper value, or whether or not the detected value is obtained in a normal (typical) condition of the exhaust gas recirculation device. Consequently, the dividing ratio of the fuel injection amounts cannot be set to an appropriate value, to improve the robustness of the NOx emission amount.

Further, in the system shown in JP'322, a deviation between a detected intake air flow rate and a target intake air flow rate is used as an exhaust gas recirculation amount parameter indicative of an actual exhaust gas recirculation amount, and a correction of the trapped NOx amount is performed according to the exhaust gas recirculation amount parameter. However, the exhaust gas recirculation amount is influenced by various factors, such as the boost pressure, the fuel injection amount, and the intake pressure. Therefore, it is difficult to estimate the actual exhaust gas recirculation amount using the maps or the tables which are previously set to calculate the exhaust gas recirculation amount, or using the physical model, even if the engine is operating in a steady operating condition. In a transient operating condition of the engine, the difficulty further increases. Therefore, the exhaust gas recirculation amount parameter shown in JP'322 does not accurately indicate the actual exhaust gas recirculation amount, and the correction cannot be performed accurately.

Particularly when controlling a diesel engine, a closed-loop control is performed wherein the exhaust gas recirculation amount is made to coincide with a target value based on the air-fuel ratio detected by an air-fuel ratio sensor, a detected value of the intake air flow rate by an air flow meter and the like, and/or another closed-loop control is performed wherein a vane opening of a turbocharger is adjusted so that the boost pressure coincides with a target pressure. Therefore, the control systems performing the above closed-loop controls intricately cooperate with each other, to accordingly compensate the characteristic variation or aging changes in the exhaust gas recirculation amount. Therefore, an accurate trapped NOx amount cannot be obtained by the simple method as shown JP'322, and the timing of performing a process for reducing NOx may be inappropriate, which may increase the NOx emission amount.

SUMMARY OF THE INVENTION

The present invention was made contemplating the above-described points, and an object of the present invention is to provide a control system for an internal combustion engine, which appropriately calculates one or more engine control parameter influenced by the exhaust gas recirculation amount, regardless of the characteristic variation or aging of the engine, thereby improving the robustness of the NOx emission amount.

To attain the above object, the present invention provides a control system for an internal combustion engine having exhaust gas recirculation means for recirculating a part of exhaust gases to an intake system of the engine. The control system includes estimated exhaust recirculation amount calculating means and engine control parameter calculating means. The estimated exhaust recirculation amount calculating means calculates an estimated exhaust gas recirculation amount (EGRhat), using a neural network to which at least one engine operating parameter indicative of an operating condition of the engine is input. The neural network outputs an estimated value of an amount of exhaust gases recirculated by the exhaust gas recirculation means. The engine control parameter calculating means calculates at least one engine control parameter (Rm1', MNOx, θSCV) for controlling the engine, based on the estimated exhaust gas recirculation amount (EGRhat).

With this configuration, the estimated exhaust gas recirculation amount is calculated using the neural network to which at least one engine operation parameter indicative of the operating condition of the engine is input. At least one engine control parameter for controlling the engine is calculated based on the estimated exhaust gas recirculation amount. The neural network is able to store nonlinear relationships among the input parameters. Therefore, by using the neural network, an accurate estimated value can be obtained not only in a steady operating condition but also in a transient operating condition of the engine, thereby appropriately setting the at least one engine control parameter suitable for the exhaust gas recirculation amount.

Preferably, the neural network is a neural network to which a self-organizing map algorithm is applied.

With this configuration, the estimated exhaust gas recirculation amount is calculated using the neural network to which the self-organizing map algorithm is applied. In the self-organizing map, a combination of the input parameters and a pattern of appearance frequency of the input parameters are stored as a distribution of neurons. Therefore, by using the data corresponding to the appearance frequency in the actual engine operation as the training data, distribution intervals among neurons becomes comparatively narrow in the region corresponding to the operating condition of high appearance frequency, which enables estimation with high accuracy.

Preferably, the control system further includes exhaust gas recirculation amount detecting means for detecting the exhaust gas recirculation amount, and the engine control parameter calculating means has difference parameter calculating means for calculating a difference parameter (a(k)) indicative of a difference between the detected exhaust gas recirculation amount (EGRact) and the estimated exhaust gas recirculation amount (EGRhat). The engine control parameter calculating means calculates the at least one engine control parameter (Rm1', MNOx, θSCV) according to the difference parameter.

With this configuration, the difference parameter indicative of a difference between the detected exhaust gas recirculation amount and the estimated exhaust gas recirculation amount is calculated, and at least one engine control parameter is calculated according to the difference parameter. By setting the neural network for calculating the estimated exhaust gas recirculation amount, corresponding to a reference engine (an engine which is new and has an average operating characteristic of the mass-produced engines), the difference parameter indicates a difference between the characteristic of the engine to be controlled and the characteristic of the reference engine. Therefore, by calculating the engine control parameter according to the difference parameter, the control in which influence of the characteristic variation or aging is eliminated can be performed, thereby improving the robustness of the NOx emission amount.

Preferably, the difference parameter (a(k)) is a correlation parameter indicative of a relationship between the estimated exhaust gas recirculation amount (EGRhat) and the detected exhaust gas recirculation amount (EGRact). The correlation parameter is calculated using a sequential statistical processing algorithm.

With this configuration, the difference parameter is calculated, using the sequential statistical processing algorithm, as the correlation parameter indicative of the relationship between the estimated exhaust gas recirculation amount and the detected exhaust gas recirculation amount. Since the neural network can store a nonlinear characteristic of the controlled object with sufficient accuracy, the neural network has a characteristic of outputting comparatively high frequency fluctuation which is included in the output of the actual controlled object when the input parameter fluctuates at a comparatively high frequency due to noises or the like. Therefore, if the difference parameter applied to the calculation of the engine control parameter is calculated only using an instantaneous value output from the neural network, the difference parameter fluctuates, resulting in fluctuation of the engine control parameter. Consequently, by using the correlation parameter obtained by the statistical processing, the influence of fluctuation of the input parameter due to noises or the like can be removed.

Preferably, the engine has fuel injection means (9) for injecting fuel into a combustion chamber of the engine, and the control system includes fuel injection control means for controlling the fuel injection means so that the fuel injection means performs a plurality of fuel injections (IM1, IM2) in one combustion cycle of the engine in a predetermined operating condition of the engine. The at least one engine control parameter includes a dividing ratio (Rm1') of fuel injection amounts corresponding to the plurality of fuel injections.

With this configuration, a plurality of fuel injections are performed in one combustion cycle in the predetermined operating condition of the engine, and the dividing ratio of the fuel injection amounts corresponding to the plurality of fuel injections is calculated based on the estimated exhaust gas recirculation amount. For example, by calculating the above-described difference parameter based on the estimated exhaust gas recirculation amount, and setting the dividing ratio according to the difference parameter, the optimal divided injections are performed regardless of the characteristic variation or aging, thereby improving the robustness of the NOx emission amount.

Preferably, the engine has NOx removing means (31) for removing NOx in the exhaust gases, and the control system includes trapped NOx amount estimating means for calculating an estimated trapped NOx amount (MNOx) which is an estimated value of an amount of NOx trapped by the NOx removing means. The at least one engine control parameter includes the estimated trapped NOx amount (MNOx).

With this configuration, the estimated trapped NOx amount which is an estimated value of an amount of NOx trapped by the NOx removing means is calculated based on the estimated exhaust gas recirculation amount. With respect to the reference engine or an engine which is in the vicinity of the reference engine in the operating characteristic, an accurate estimated trapped NOx amount can be obtained using the estimated exhaust gas recirculation amount itself. Further, by applying the above-described difference parameter, the influence of the characteristic variation or aging of the engine can be eliminated.

Preferably, the engine has swirl control means (41) for controlling a swirl of an air-fuel mixture in a combustion chamber of the engine, and the at least one engine control parameter includes a control amount (θSCV) of the swirl control means.

With this configuration, the control amount of the swirl control means is calculated based on the estimated exhaust gas recirculation amount. For example, by calculating the above-described difference parameter based on the estimated exhaust gas recirculation amount, and setting the control amount of the swirl control means according to the difference parameter, the optimal swirl is generated in the combustion chamber regardless of the characteristic variation or aging of the engine, thereby improving the robustness of the NOx emission amount.

Preferably, the control system further includes failure determining means for determining a failure of the exhaust gas recirculation means based on the difference parameter (a(k)).

With this configuration, the failure of the exhaust gas recirculation means is determined based on the difference parameter. When the characteristic change due to aging becomes significant, the situation where the NOx emission amount exceeds a regulation value may be invited even if the engine control parameter is corrected. In such case, by determining that the exhaust gas recirculation means has failed and recommending to repair it, the situation where the NOx emission amount exceeds the regulation value can be promptly eliminated.

BRIEF DESCRIPTION OF THE DRAWINGS

FIGS. 17A-17F, 18A-18D, and 19A-19D are time charts for illustrating examples of the control operation in the second embodiment;

FIGS. 25A-25E, 26A-26C, and 27A-27C are time charts for illustrating examples of the control operation in the third embodiment;

FIGS. 31A-31F, 32A-32E, and 33A-33D are time charts for illustrating examples of the control operation in the fourth embodiment;

DETAILED DESCRIPTION OF THE PREFERRED EMBODIMENTS

Preferred embodiments of the present invention will now be described with reference to the drawings.

First Embodiment

Figure 1:
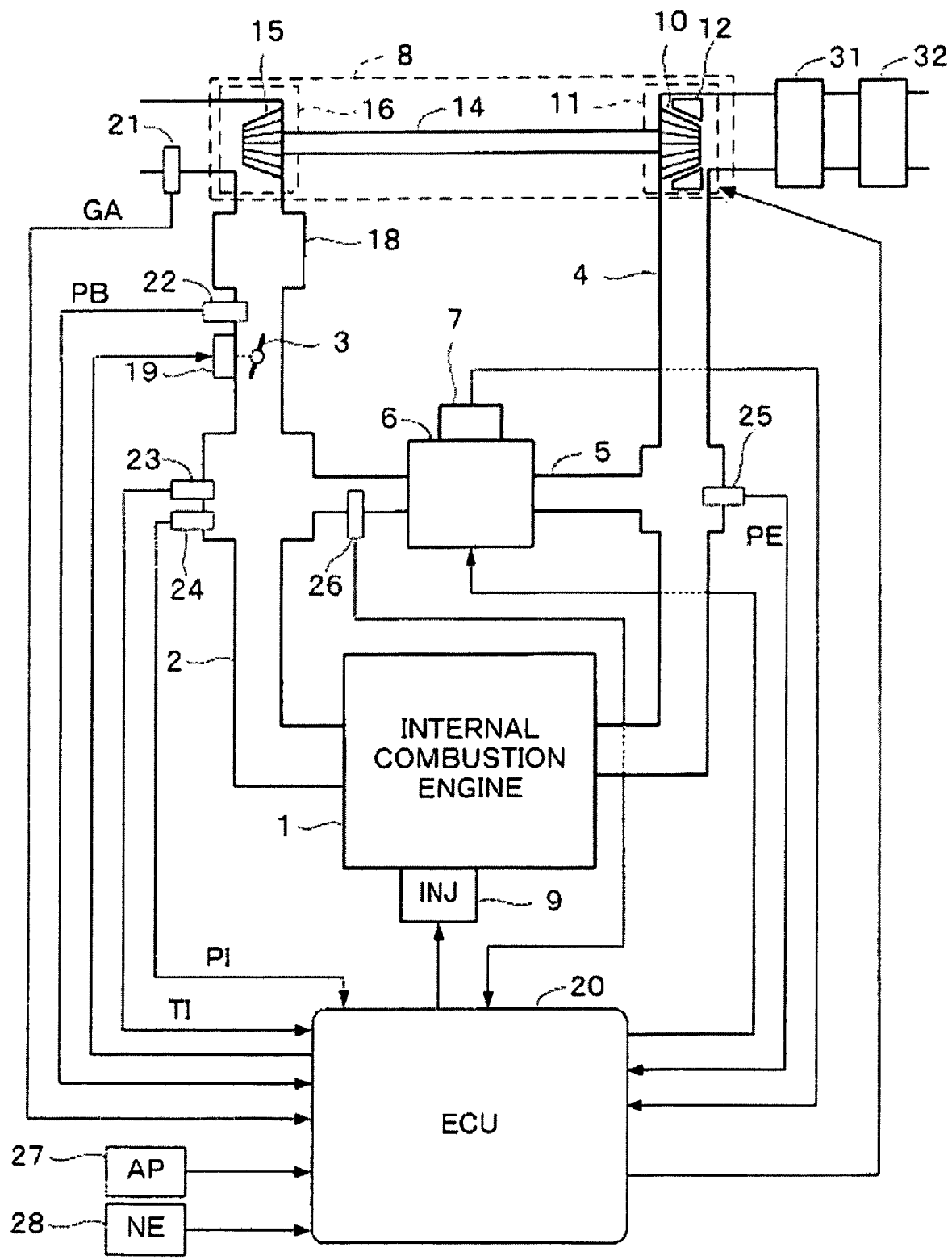
FIG. 1 shows a configuration of an internal combustion engine and a control system therefor according to a first embodiment of the present invention.

FIG. 1 is a schematic diagram showing a configuration of an internal combustion engine and a control system therefor according to a first embodiment of the present invention. The internal combustion engine 1 (hereinafter referred to as "engine") is a diesel engine wherein fuel is injected directly into the cylinders. Each cylinder is provided with a fuel injection valve 9 that is electrically connected to an electronic control unit 20 (hereinafter referred to as "ECU"). The ECU 20 controls a valve opening timing and a valve opening period of each fuel injection valve 9.

The engine 1 has an intake pipe 2, an exhaust pipe 4, and a turbocharger 8. The turbocharger 8 includes a turbine 11 and a compressor 16. The turbine 11 has a turbine wheel 10 rotationally driven by the kinetic energy of exhaust gases. The compressor 16 has a compressor wheel 15 connected to the turbine wheel 10 via a shaft 14. The compressor wheel 15 pressurizes (compresses) the intake air of the engine 1.

The turbine 11 has a plurality of movable vanes 12 (only two are illustrated) and an actuator (not shown) for actuating the movable vanes 12 to open and close. The plurality of movable vanes 12 are actuated to open and close for changing a flow rate of exhaust gases that are injected to the turbine wheel 10. The turbine 11 is configured so that the flow rate of exhaust gases injected to the turbine wheel 10 is changed by changing an opening of the movable vane 12 (hereinafter referred to as "vane opening") θvgt, to change the rotational speed of the turbine wheel 10. The actuator which actuates the movable vanes 12 is connected to the ECU 20, and the vane opening θvgt is controlled by the ECU 20. Specifically, the ECU 20 supplies a control signal of a variable duty ratio to the actuator and controls the vane opening θvgt by the control signal. The configuration of the turbocharger having movable vanes is widely known, for example, disclosed in Japanese Patent Laid-open No. H01-208501.

The intake pipe 2 is provided with an intercooler 18 downstream of the compressor 16, and a throttle valve 3 downstream of the intercooler 18. The throttle valve 3 is configured to be actuated to open and close by an actuator 19, and the actuator 19 is connected to the ECU 20. The ECU 20 performs an opening control of the throttle valve 3 through the actuator 19.

An exhaust gas recirculation passage 5 for recirculating exhaust gases to the intake pipe 2 is provided between the exhaust pipe 4 and the intake pipe 2. The exhaust gas recirculation passage 5 is provided with an exhaust gas recirculation control valve 6 (hereinafter referred to as "EGR valve 6") that controls the amount of exhaust gases (EGR amount) that are recirculated. The EGR valve 6 is an electromagnetic valve having a solenoid. A valve opening of the EGR valve 6 is controlled by the ECU 20. The EGR valve 6 is provided with a lift sensor 7 for detecting a valve opening (a valve lift amount) LACT, and the detection signal is supplied to the ECU 20. The exhaust gas recirculation passage 5 and the EGR valve 6 constitute an exhaust gas recirculation device. The exhaust gas recirculation passage 5 is provided with an exhaust gas recirculation amount sensor 26 for detecting an exhaust gas recirculation amount EGRact, and the detection signal is supplied to the ECU 20. The exhaust gas recirculation amount EGRact is actually detected as a flow rate (mass/time).

An intake air flow rate sensor 21, a boost pressure sensor 22, an intake air temperature sensor 23, and an intake pressure sensor 24 are disposed in the intake pipe 2. The intake air flow rate sensor 21 detects an intake air flow rate GA. The boost pressure sensor 22 detects an intake pressure (boost pressure) PB at a portion of the intake pipe 2 downstream of the compressor 16. The intake air temperature sensor 23 detects an intake air temperature TI. The intake pressure sensor 24 detects an intake pressure PI. Further, an exhaust pressure sensor 25 is disposed in the exhaust pipe 4. The exhaust pressure sensor 25 detects an exhaust pressure PE at a portion of the exhaust pipe 4 upstream of the turbine 11. These sensors 21 to 25 are connected to the ECU 20, and the detection signals from the sensors 21 to 25 are supplied to the ECU 20.

A lean NOx catalyst 31 and a particulate filter 32 are disposed downstream of the turbine 11 in the exhaust pipe 4. The lean NOx catalyst 31 is a NOx removing device for removing NOx contained in the exhaust gases. The particulate filter 32 traps particulate matter (which mainly consists of soot) contained in the exhaust gases. The lean NOx catalyst 31 is configured so that NOx is trapped in a state where an oxygen concentration in the exhaust gases is comparatively high, i.e., a concentration of reducing components (HC, CO) is comparatively low, and the trapped NOx is reduced by the reducing components and discharged in a state where the reducing components concentration in the exhaust gases is comparatively high.

An accelerator sensor 27, an engine rotational speed sensor 28, and an atmospheric pressure sensor 29 are connected to the ECU 20. The accelerator sensor 27 detects an operation amount AP of an accelerator pedal (not shown) of the vehicle driven by the engine 1 (hereinafter preferred to as "accelerator pedal operation amount AP"). The engine rotational speed sensor 28 detects an engine rotational speed NE. The atmospheric pressure sensor 29 detects an atmospheric pressure PA. The detection signals of these sensors are supplied to the ECU 20. The engine rotational speed sensor 28 supplies a crank angle pulse and a TDC pulse to the ECU 20. The crank angle pulse is generated at every predetermined crank angle (e.g., 6 degrees). The TDC pulse is generated in synchronism with a timing when a piston in each cylinder of the engine 1 is located at the top dead center.

The ECU 20 includes an input circuit, a central processing unit (hereinafter referred to as "CPU"), a memory circuit, and an output circuit. The input circuit performs various functions, including shaping the waveforms of input signals from various sensors, correcting the voltage levels of the input signals to a predetermined level, and converting analog signal values into digital values. The memory circuit preliminarily stores various operating programs to be executed by the CPU and stores the results of computations or the like by the CPU. The output circuit supplies control signals to the actuator for actuating the movable vanes 12 of the turbine 11, the fuel injection valves 9, the EGR valve 6, the actuator 19 for actuating the throttle valve 3, and the like.

The ECU 20 performs a fuel injection control with the fuel injection valve 9, an exhaust gas recirculation control with the EGR valve 6, a boost pressure control with the movable vanes 12, and the like according to an engine operating condition (which is indicated mainly by the engine rotational speed NE and an engine load target value Pmecmd). The engine load target value Pmecmd is calculated according to the accelerator pedal operation amount AP, and is set so as to increase as the accelerator pedal operation amount AP increases.

In this embodiment, the fuel injection by the fuel injection valve 9 is performed with a main injection Ml and a pilot injection PI preceding the main injection MI. Further, in a predetermined operating condition of the engine 1 (specifically, a condition where the engine rotational speed NE is lower than a predetermined high speed NEH), the main injection Ml is performed by two divided injections, i.e., a first main injection MI1 and a second main injection MI2. A dividing ratio Rm1 of the fuel injection amount is defined as "first main injection amount/(first main injection amount+ second main injection amount)", and is basically set according to the engine rotational speed NE and the engine load target value Pmecmd.

Further, the ECU 20 calculates an estimated value of an exhaust gas recirculation amount (hereinafter referred to as "estimated exhaust gas recirculation amount") EGRhat by using a neural network to which a self-organizing map algorithm is applied. This neural network is hereinafter referred to simply as "self-organizing map". The ECU 20 corrects the dividing ratio Rm1 using the estimated exhaust gas recirculation amount EGRhat and the actual exhaust gas recirculation amount EGRact detected by the exhaust gas recirculation amount sensor 26. By performing this correction, the influence of characteristic variation or aging changes in the engine 1 and its peripheral devices mounted on the engine 1 (e.g, the exhaust gas recirculation device, the intake air flow rate sensor) are suppressed, thereby improving the robustness of the NOx emission amount.

The self-organizing map will be hereinafter described in detail.

An input data vector xj which consists of "N" elements is defined by the following equation (1), and a weighting vector wi of each neuron which constitutes the self-organizing map is defined by the following equation (2). A number of neurons is expressed by "M". That is, a parameter "i" takes values from "1" to "M". An initial value of the weighting vector wi is given using a random number.

$$xj=(xj1, xj2, \ldots, xjN) \tag{1}$$

$$wi=(wi1, wi2, \ldots, wiN) \tag{2}$$

With respect to each of "M" neurons, an Euclid distance DWX $(=|wi-xj|)$ between the input data vector xj and the weighting vector wi of the corresponding neuron is calculated. A neuron whose distance DWX takes a minimum value is defined as the winner neuron. The Euclid distance DWX is calculated by the following equation (3).

$$DWX = \sqrt{\sum_{k=1}^{N}(wik - xjk)^2} \quad (3)$$

Next, the weighting vectors wi of the winner neuron and neurons contained in a neuron set Nc in the vicinity of the winner neuron are updated by the following equation (4). In the equation (4), "α(t)" is a training coefficient, and "t" is a number of times of training (hereinafter referred to simply as "training number"). The training coefficient α (t) is, for example, set to "0.8" as an initial value, and set so as to decrease as the training number "t" increases.

$$wi(t+1) = wi(t) + \alpha(t)(xj - wi(t)) \quad (4)$$

The weighting vectors wi of the neurons which are not contained in the neuron set Nc maintain a preceding value as shown by the following equation (5).

$$wi(t+1) = wi(t) \quad (5)$$

It is to be noted that the neuron set Nc is also a function of the training number "t", and is set so that a range of the vicinity of the winner neuron becomes narrow as the training number "t" increases. The weighting vectors of the winner neuron and the neurons in the vicinity of the winner neuron are modified by updating with the equation (4) to approach the input data vector.

If the calculation according to the training rule described above is performed with respect to many input data vectors, the distribution of "M" neurons results in reflecting the distribution of the input data vectors. For example, when the input data vectors are simplified to two-dimensional vectors and the distribution of the input data vectors is expressed on a two-dimensional plane, the neurons distribute uniformly over the plane if the input data vectors distribute uniformly over the plane. If nonuniformity is in the distribution of the input data vectors (if changes in the distribution density exist), the distribution of the neurons finally becomes a distribution having similar nonuniformity.

The self-organizing map obtained as described above may be further modified by applying the learning vector quantization (LVQ) algorithm, thereby obtaining a more suitable distribution of the neurons.

Figure 2:
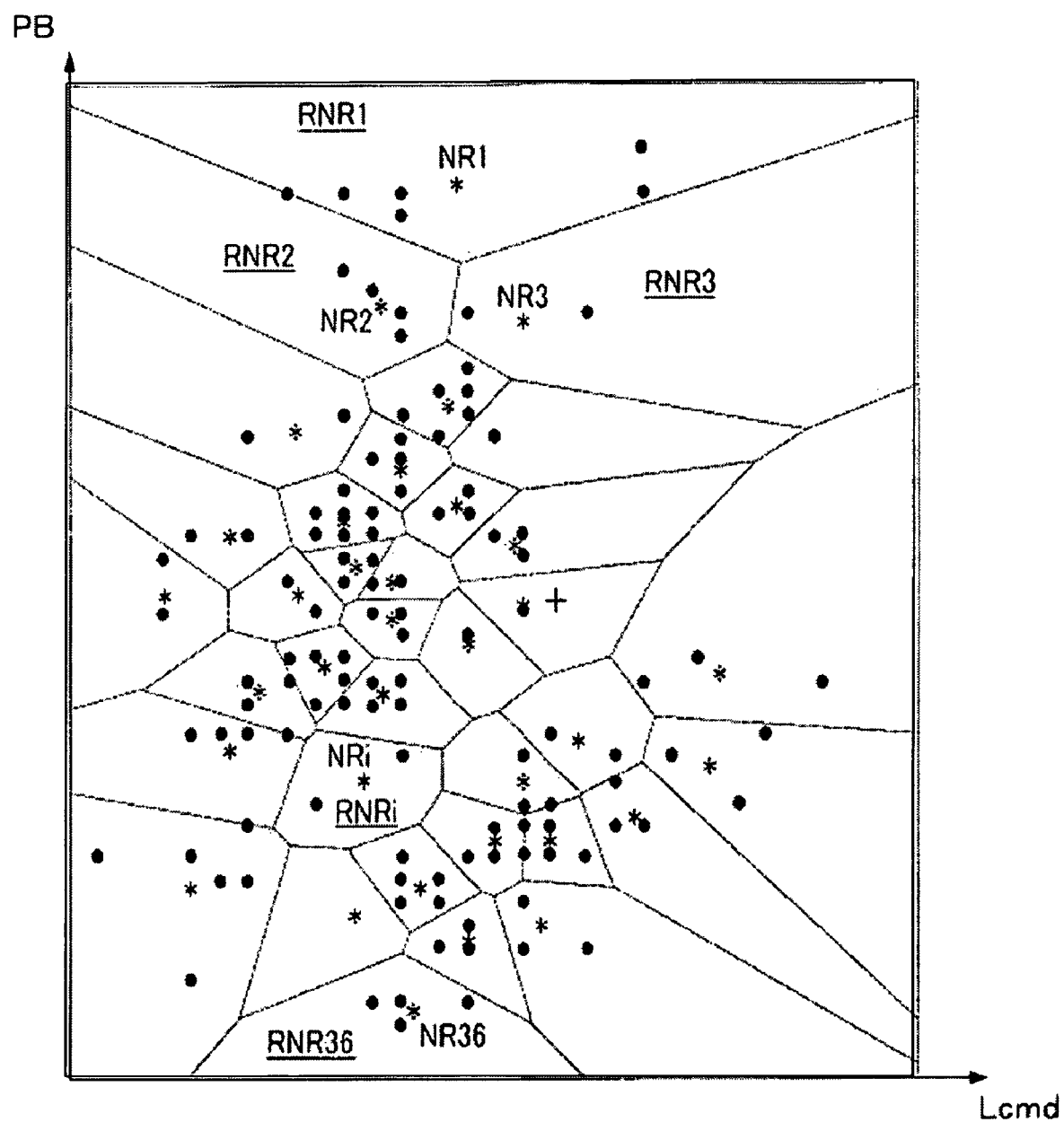
FIG. 2 shows a self-organizing map.

FIG. 2 shows a self-organizing map for calculating the estimated exhaust gas recirculation amount EGRhat in this embodiment, as a two-dimensional map. This two-dimensional map is defined by a lift amount command value Lcmd of the EGR valve 6 and the boost pressure PB which are two input parameters as the most dominant factors. An input data vector xEGR is defined by the following equation (10). That is, the input parameters are the lift amount command value Lcmd, the boost pressure PB, the intake air temperature TI, the exhaust pressure PE, a fuel injection amount Tout, the intake air flow rate GA, and the engine rotational speed NE. The fuel injection amount Tout is a total fuel injection amount in one combustion cycle including a pilot injection amount and a main injection amount described later.

$$xEGR = (Lcmd, PB, TI, PE, Tout, GA, NE) \quad (10)$$

The map shown in FIG. 2 is divided into a plurality of regions RNRi (i=1 to M, M=36). Each region includes one neuron NRi (plotted with "*"). By previously performing the training (learning) with a lot of input data vectors xEGR, the position (weighting vector wi) of each neuron NRi is determined. Each region RNRi is defined by drawing borderlines in consideration of the positional relationships with the adjacent neurons. By making the distribution of the input data vector xEGR applied upon training coincide with an actual distribution appearing in the actual engine operation, the distribution density of the neuron NRi becomes comparatively high in the regions corresponding to an engine operating condition with high appearance frequency during the actual engine operation. With this feature of the self-organizing map, accuracy of the estimated exhaust gas recirculation amount in the operating conditions with high appearance frequency can be improved. The map shown in FIG. 2 is obtained by performing the training corresponding to the reference engine (which is new and has an average operating characteristic). In FIG. 2, the input data applied to the training are plotted with black dots.

When training the self-organizing map, a weighting coefficient vector Ci (i=1 to M) expressed by the following equation (11) is calculated and stored using the input data vector xEGR and the actual exhaust gas recirculation amount EGRact corresponding to the input data vector xEGR. The weighting coefficient vector Ci is calculated and stored corresponding to each neuron NRi.

$$Ci = (C0i, C1i, C2i, C3i, C4i, C5i, C6i, C7i) \quad (11)$$

In the actual control operation, the region RNRi which includes the present operating point on the map is first selected. The operating point is defined by the lift amount command value Lcmd and the boost pressure PB which are elements of the input data vector xEGR. Next, the weighting coefficient vector Ci, which corresponds to the neuron NRi representing the region RNRi, and the input data vector xEGR are applied to the following equation (12), to calculate the estimated exhaust gas recirculation amount EGRhat.

$$EGRhat = C1i \times Lcmd + C2i \times PB + C3i \times TI + \\ C4i \times PE + C5i \times Tout + C6i \times GA + C7i \times NE + C0i \quad (12)$$

Figure 3:
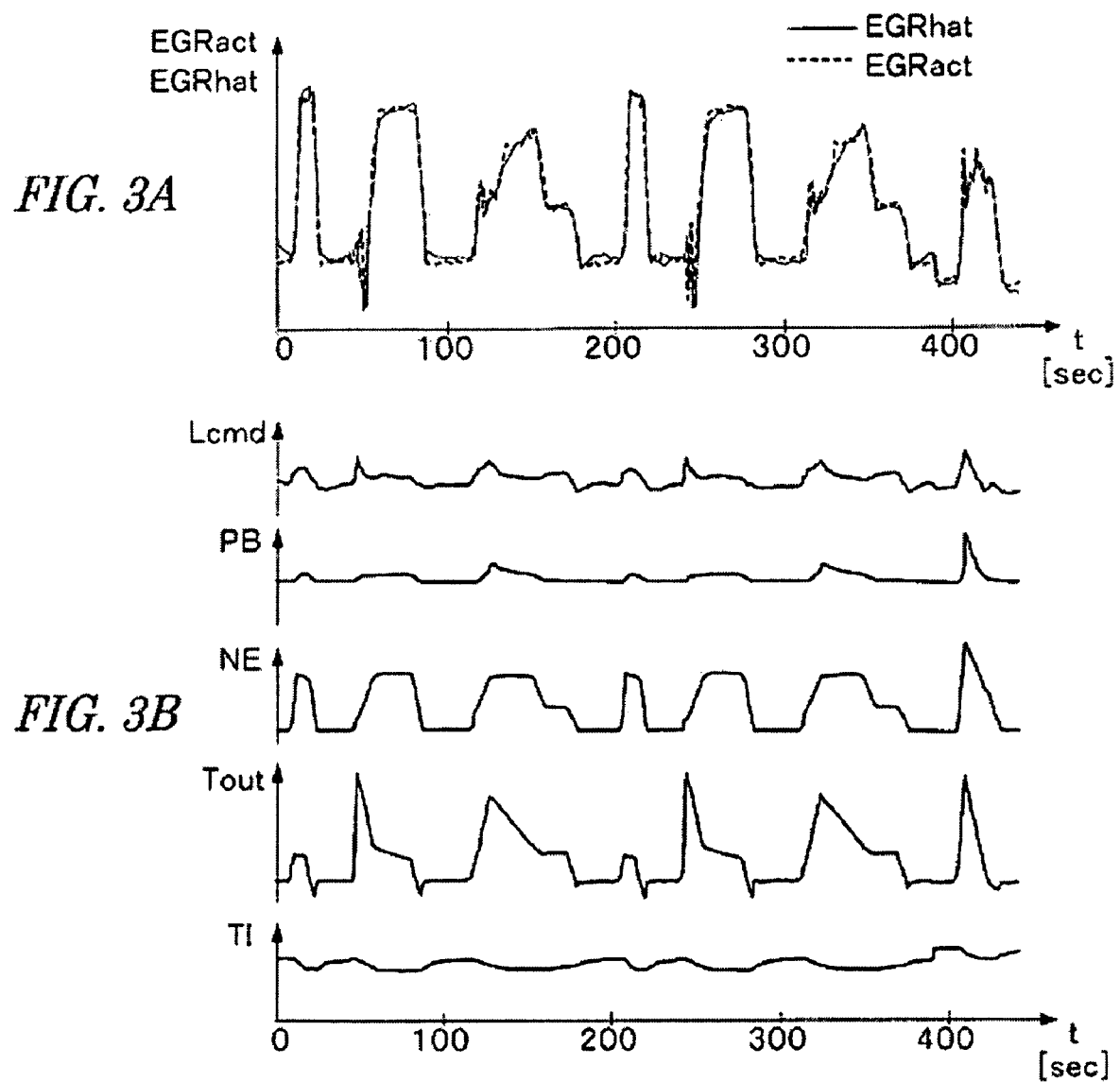
FIGS. 3A and 3B show changes in an estimated exhaust gas recirculation amount (EGRhat) and an actual exhaust gas recirculation amount (EGRact) and changes in engine operating parameters.

FIG. 3A is a time chart showing changes in the estimated exhaust gas recirculation amount EGRhat and the actual exhaust gas recirculation amount EGRact. FIG. 3B is a time chart showing changes in the corresponding main input data. From these figures, it is confirmed that accurate calculated values of the estimated exhaust gas recirculation amount EGRhat are obtained not only in the steady state where the engine operating condition is comparatively stable but also in the transient state.

Figure 4:
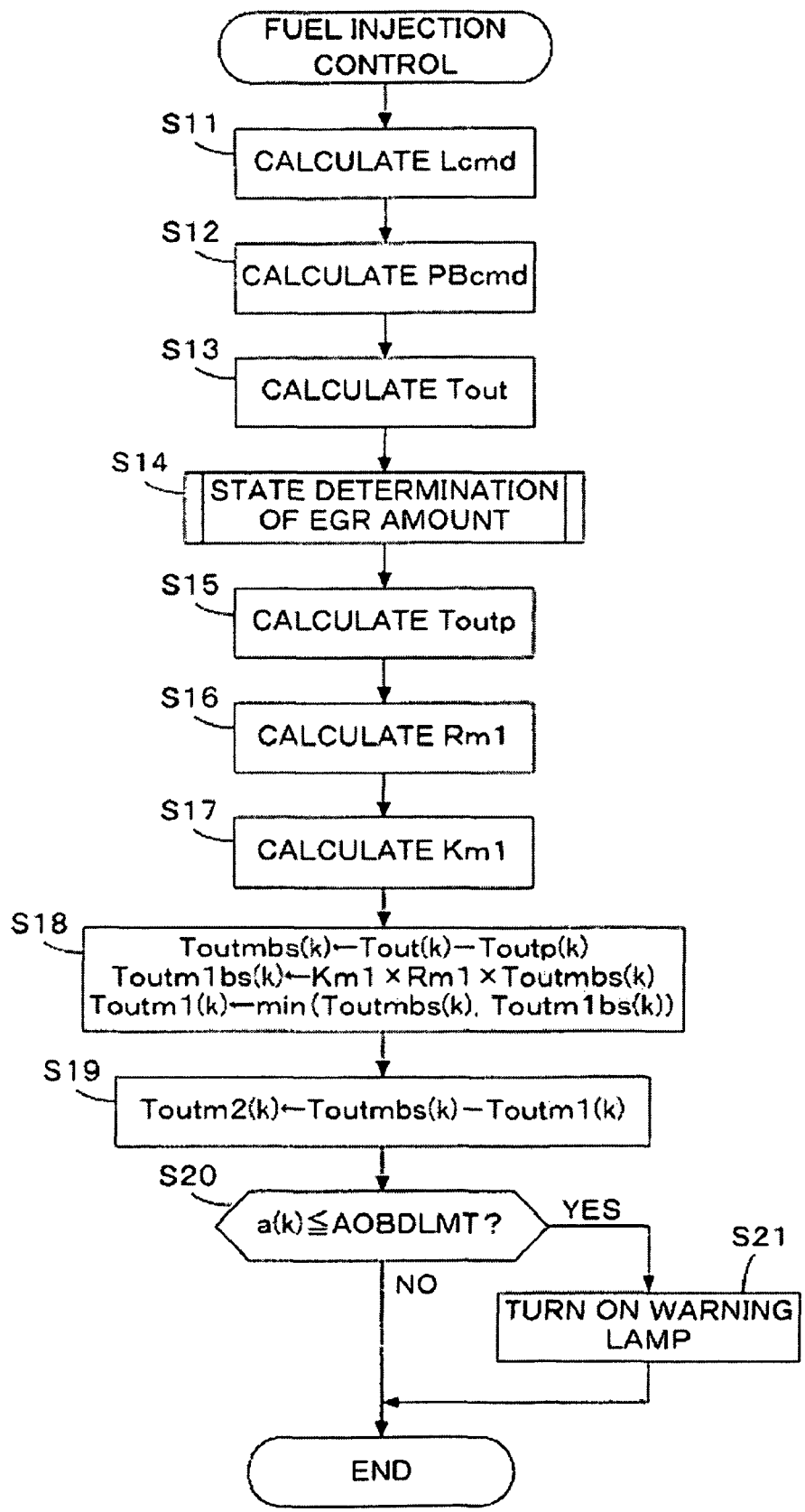
FIG. 4 is a flowchart of a fuel injection control process.

Next, the fuel injection control using the estimated exhaust gas recirculation amount EGRhat is described below. FIG. 4 is a flowchart of the fuel injection control process. This process is executed by the CPU in the ECU 20 in synchronism with the TDC pulse.

Figure 5A:
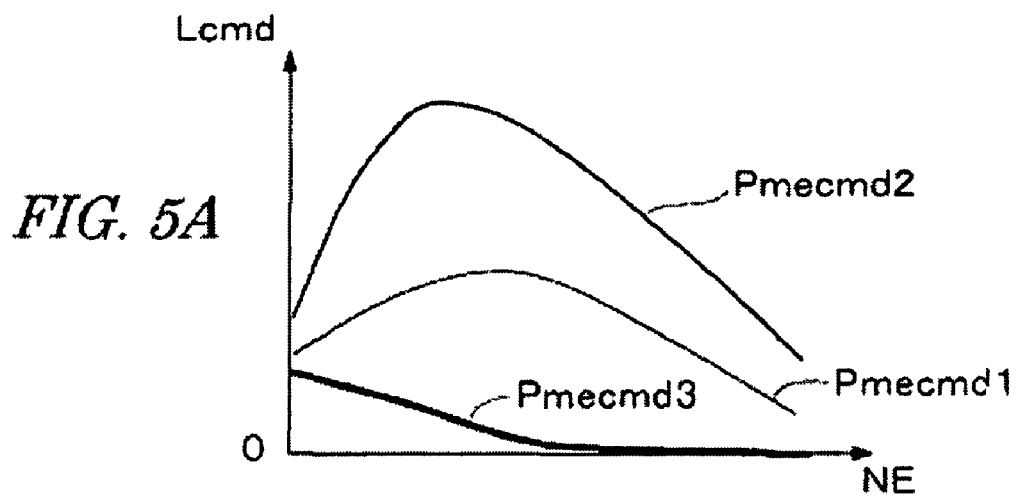
FIGS. 5A-5C and 6A-6C show maps referred to in the process of FIG. 4.

In step S11, a Lcmd map shown in FIG. 5A is retrieved according to the engine rotational speed NE and the engine load target value Pmecmd, to calculate the EGR valve lift amount command value Lcmd.

Pmecmd1, Pmecmd2, and Pmecmd3 shown in FIG. 5A are predetermined engine load target values, and the relationship of "Pmecmd1<Pmecmd2<Pmecmd3" is satisfied. Therefore, when the engine load target value Pmecmd increases from a value corresponding to a low-load condition, the EGR valve lift amount command value Lcmd increases until the predetermined engine load target value Pmecmd2. When the engine load target value Pmecmd further increases, the EGR valve lift amount command value Lcmd decreases. That is, according to the Lcmd map shown in FIG. 5A, the EGR valve lift amount command value Lcmd is set to a comparatively great value in order to reduce the NOx emission amount in the ordinarily-used operating region of the engine (medium-speed and medium-load engine operating region). Further, the EGR valve lift amount command value Lcmd is set to a comparatively small value in order to ensure a sufficient output torque of the engine in a high-load engine operating region. Further, the EGR valve lift amount command value Lcmd is set to a comparatively small value in order to ensure stable combustion in a low-speed engine operating region.

Figure 5B:
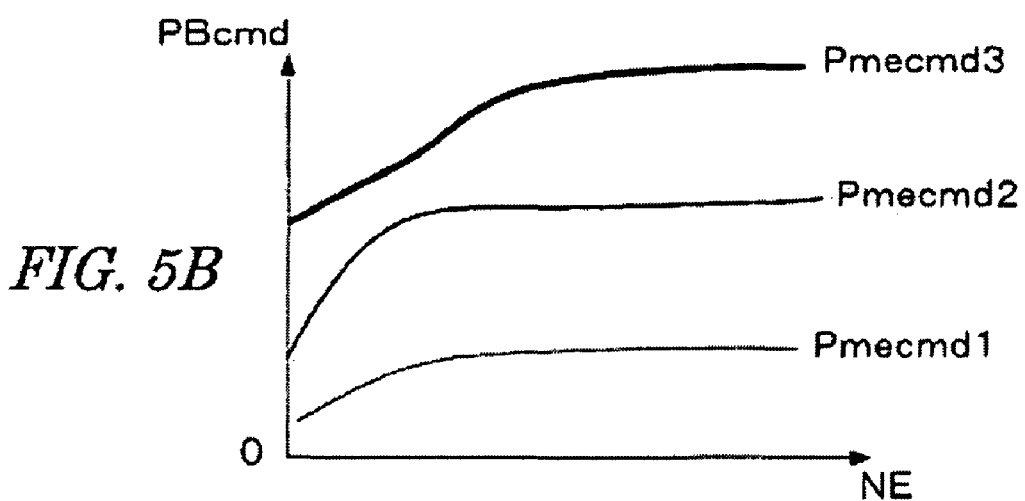

In step S12, a PBcmd map shown in FIG. 5B is retrieved according to the engine rotational speed NE and the engine load target value Pmecmd, to calculate a target boost pressure PBcmd. The PBcmd map is set in the low-speed engine operating region so that the target boost pressure PBcmd increases as the engine rotational speed NE increases, and the target boost pressure PBcmd increases as the engine load target value Pmecmd increases. In the medium-speed and medium-load engine operating region, the target boost pressure PBcmd is set comparatively high in order to ensure the fresh air amount since the EGR amount is increased. The vane opening θvgt of the turbine is controlled according to the target boost pressure PBcmd.

Figure 5C:
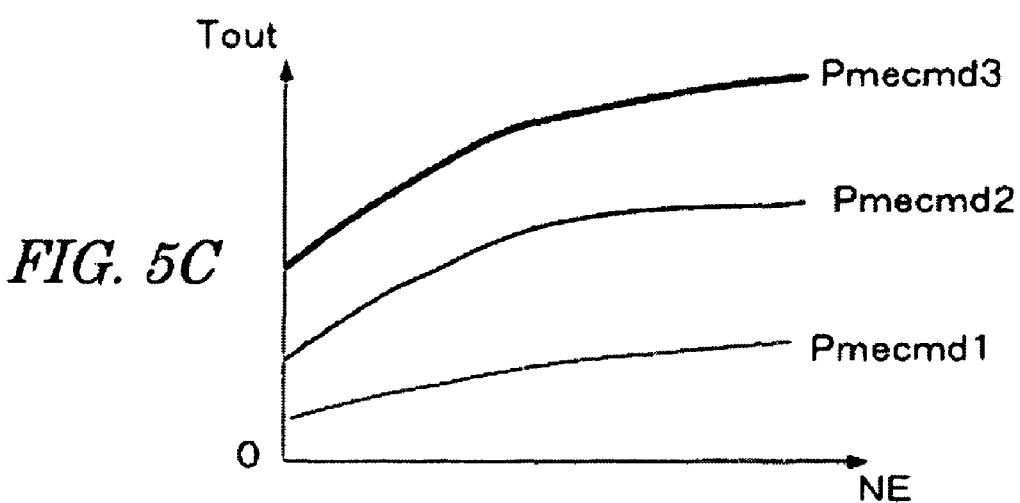

In step S13, a Tout map shown in FIG. 5C is retrieved according to the engine rotational speed NE and the engine load target value Pmecmd, to calculate the fuel injection amount Tout. The Tout map is set so that the fuel injection amount Tout increases as the engine rotational speed NE increases and/or the engine load target value Pmecmd increases. The Tout map is set so that an actual air-fuel ratio in the combustion chamber coincides with a target air-fuel ratio when the actual boost pressure PB coincides with the target boost pressure PBcmd; the actual exhaust gas recirculation amount EGRact coincides with a desired value; and an actual fuel injection amount coincides with the fuel injection amount Tout.

Figure 8:
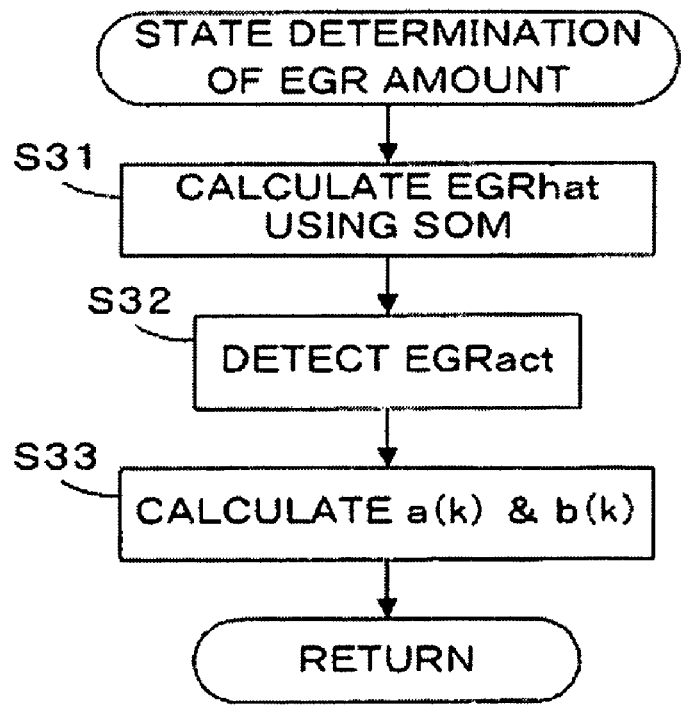
FIG. 8 is a flowchart of a process for performing a state determination of an exhaust gas recirculation amount.

In step S14, a state determination process of the exhaust gas recirculation amount (EGR amount) shown in FIG. 8 is executed, to calculate the estimated exhaust gas recirculation amount EGRhat, and correlation parameters a(k) and b(k) which indicate a relationship between the estimated exhaust gas recirculation amount EGRhat and the detected actual exhaust gas recirculation amount EGRact. "k" indicates a control time digitized with the execution period of this process.

When the correlation parameter a(k) calculated in step S14 takes a value in the vicinity of "1.0", this indicates that the actual exhaust gas recirculation amount EGRact substantially coincides with the estimated exhaust gas recirculation amount EGRhat approximating an actual exhaust gas recirculation amount of the reference engine. Further, when the correlation parameter a(k) is less than "1.0", this indicates that the actual exhaust gas recirculation amount EGRact takes a smaller value compared with the estimated exhaust gas recirculation amount EGRhat, i.e., the actual exhaust gas recirculation amount EGRact is less than a desired value due to the characteristic variation or aging of the engine. Conversely, when the correlation parameter a(k) is greater than "1.0", this indicates that the actual exhaust gas recirculation amount EGRact takes a greater value compared with the estimated exhaust gas recirculation amount EGRhat, i.e., the actual exhaust gas recirculation amount EGRact is greater than the desired value due to the characteristic variation of the engine.

Figure 6A:
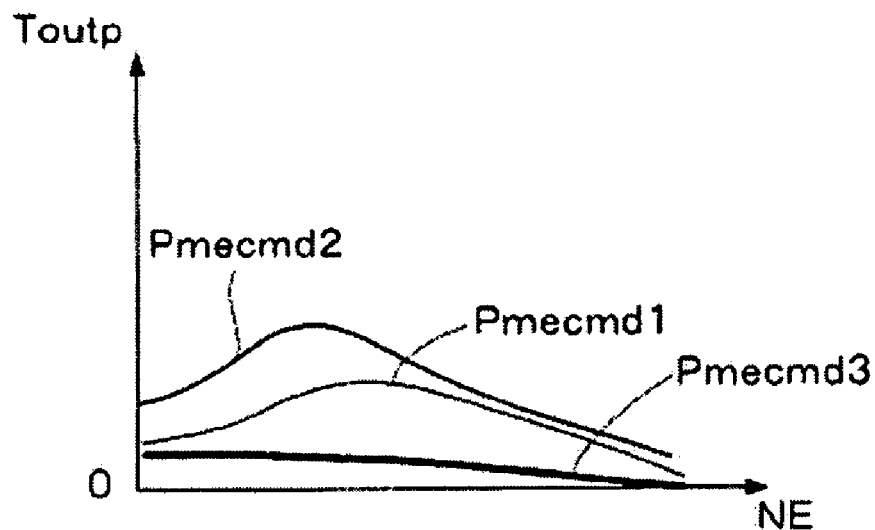

In step S15, a Toutp map shown in FIG. 6A is retrieved according to the engine rotational speed NE and the engine load target value Pmecmd, to calculate a pilot injection fuel amount Toutp which is a fuel injection amount of the pilot injection PI. The Toutp map is set so that the pilot injection amount Toutp increases in order to reduce the combustion noise in the low-speed and low-load engine operating region wherein an ignition delay of the injected fuel becomes comparatively great, and in the medium-speed and medium-load engine operating region wherein the exhaust gas recirculation amount is increased.

Figure 6B:
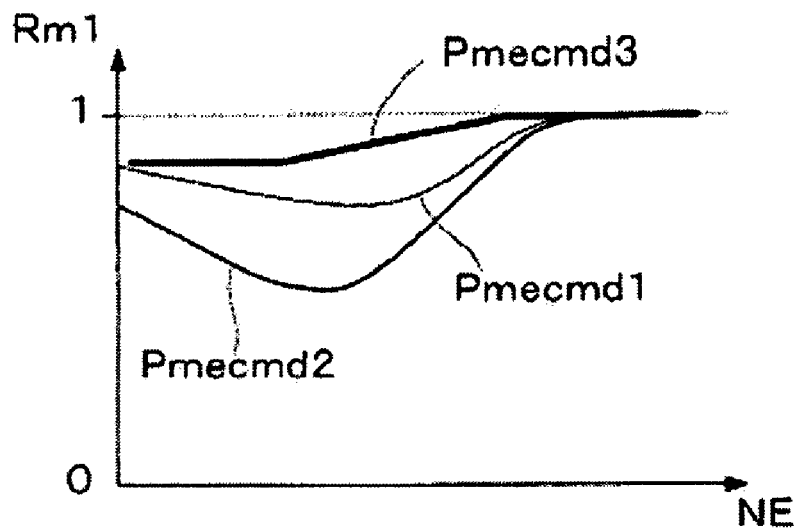

In step S16, a Rm1 map shown in FIG. 6B is retrieved according to the engine rotational speed NE and the engine load target value Pmecmd, to calculate a dividing ratio Rm1. The dividing ratio Rm1 is defined by the following equation (13). In the equation (13), "Toutm1" is a first main injection amount, and "Toutm2" is a second main injection amount.

$$Rm1 = Toutm1/(Toutm1 + Toutm2) \quad (13)$$

According to the Rm1 map, the dividing ratio Rm1 is set to "1.0" in the high-speed engine operating region, since the divided main injections cannot be performed due the response delay of the fuel injection valve 9. In the low-load and the medium-load engine operating regions, the divided main injections are performed in order to reduce the NOx emission amount, and the Rm1 map is set so that the dividing ratio Rm1 mostly decreases in the medium-speed and medium-load engine operating region. Further, in the high-load engine operating region, the divided main injections are performed in order to reduce the maximum cylinder pressure, thereby reducing the combustion noise.

Figure 7:
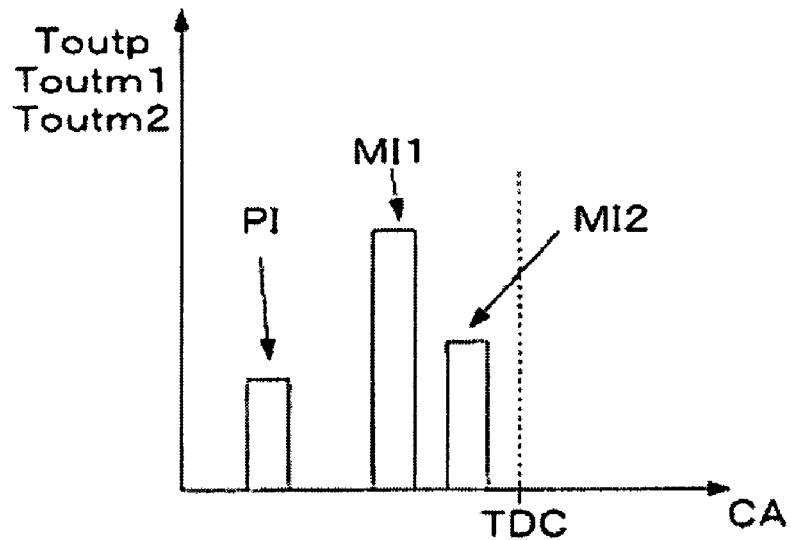
FIG. 7 illustrates a pilot injection and divided main injections of fuel.

The typical relationship of the pilot injection amount Toutp, the first main injection amount Toutm1, and the second main injection amount Toutm2 is shown in FIG. 7. The horizontal axis of FIG. 7 is the crank angle CA, and the execution timing of each injection is indicated.

Figure 6C:
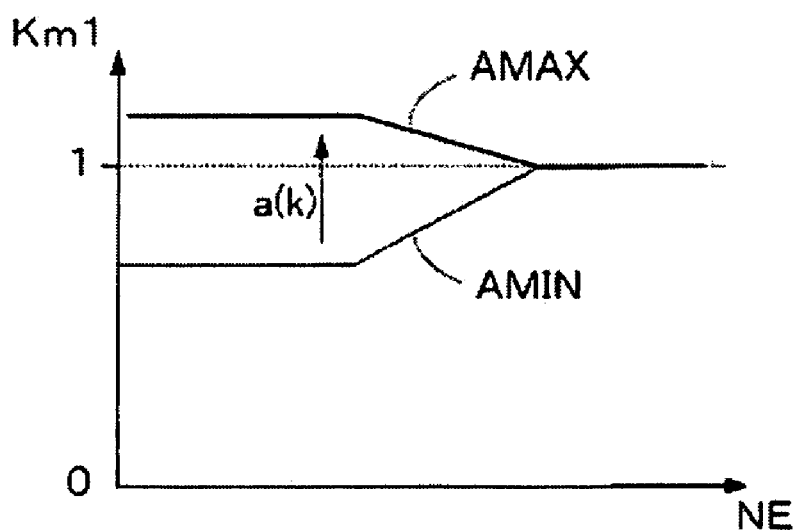

In step S17, a Km1 map shown in FIG. 6C is retrieved according to the engine rotational speed NE and the correlation parameter a(k), to calculate a correction coefficient Km1 of the dividing ratio Rm1 (hereinafter referred to as "dividing ratio correction coefficient Km1"). The thick line shown in FIG. 6C corresponds to the maximum value AMAX of the correlation parameter a(k), and the thin line corresponds to the minimum value AMIN of the correlation parameter a(k). According to the Km1 map, the dividing ratio correction coefficient Km1 is set to "1.0" when the correlation parameter a(k) is equal to "1.0". When the correlation parameter a(k) is greater than "1.0", which indicates that the actual exhaust gas recirculation amount is greater than the desired value, the dividing ratio correction coefficient Km1 is set to a value greater than "1.0" in order to increase the dividing ratio Rm1 for securing stable combustion. Further, when the correlation parameter a(k) is less than "1.0", the exhaust gas recirculation amount became less than the desired value. Therefore, the dividing ratio correction coefficient Km1 is set to a value smaller than "1.0" to decrease the dividing ratio Rm1, thereby reducing the NOx emission amount. The dividing ratio correction coefficient Km1 is set to a smaller value as the correlation parameter a(k) decreases.

In step S18, a basic main injection amount Toutmbs(k) is calculated by the following equation (14). The calculated basic main injection amount Toutmbs(k), the dividing ratio Rm1, and the dividing ratio correction coefficient Km1 are applied to the following equation (15), to calculate a first main injection basic amount Toutm1bs(k). Further, the first main injection amount Toutm1(k) is calculated by the equation (16) i.e., by selecting the smaller one of the basic main injection amount Toutmbs(k) and the first main injection basic amount Toutm1bs(k). The calculation of the equation (16) is performed for preventing the first main injection amount Toutm1(k) from exceeding the basic main injection amount Toutmbs(k).

$$Toutmbs(k)=Tout(k)-Toutp(k) \tag{14}$$

$$Toutm1bs(k)=Km1 \times Rm1 \times Toutmbs(k) \tag{15}$$

$$Toutm1(k)=\min(Toutmbs(k), Toutm1bs(k)) \tag{16}$$

In step S19, the second main injection amount Toutm2(k) is calculated by the following equation (17).

$$Toutm2(k)=Toutmbs(k)-Toutm1(k) \tag{17}$$

In step S20, it is determined whether or not the correlation parameter a(k) is equal to or less than a determination threshold value AOBDLMT. If the answer to step S20 is affirmative (YES), it is determined that the exhaust gas recirculation device has failed (for example, clogging of the EGR valve 6 has occurred), and a warning lamp is turned on (step S21). If a(k) is greater than AOBDLMT, the process immediately ends.

FIG. 8 is a flowchart of the state determination process of the EGR amount executed in step S14 of FIG. 4.

In step S31, the estimated exhaust gas recirculation amount EGRhat is calculated using the self-organizing map (SOM) described above. That is, the neuron NRi is selected according to the EGR valve lift amount command value Lcmd and the boost pressure PB, and the weighting coefficient vector Ci corresponding to the neuron NRi and the input parameters are applied to the equation (12), to calculate the estimated exhaust gas recirculation amount EGRhat.

In step S32, the actual exhaust gas recirculation amount EGRact is detected by the exhaust gas recirculation amount sensor 26. In step S33, the correlation parameters a(k) and b(k), which indicate the relationship between the estimated exhaust gas recirculation amount EGRhat and the actual exhaust gas recirculation amount EGRact, are calculated with a sequential identifying (sequential statistical processing) algorithm.

Figure 9A:
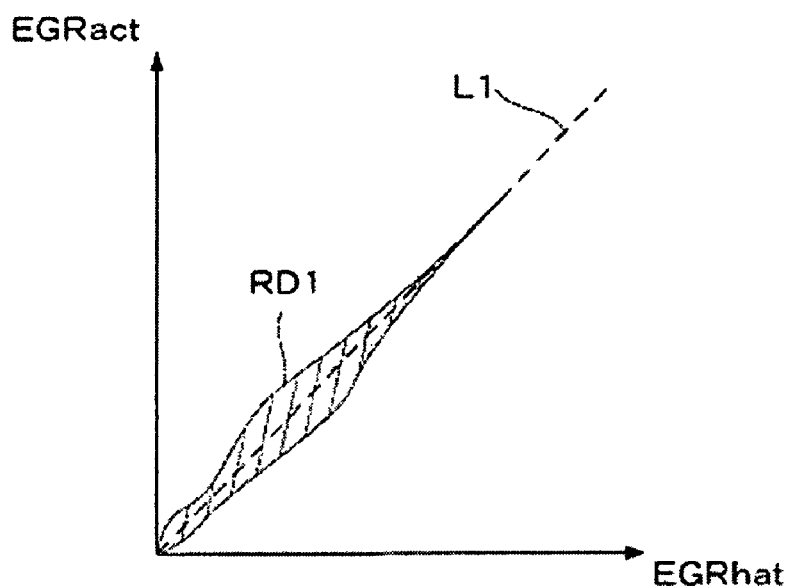
FIGS. 9A-9C illustrate relationships between the estimated exhaust gas recirculation amount (EGRhat) and the actual exhaust gas recirculation amount (EGRact)
Figure 9B:
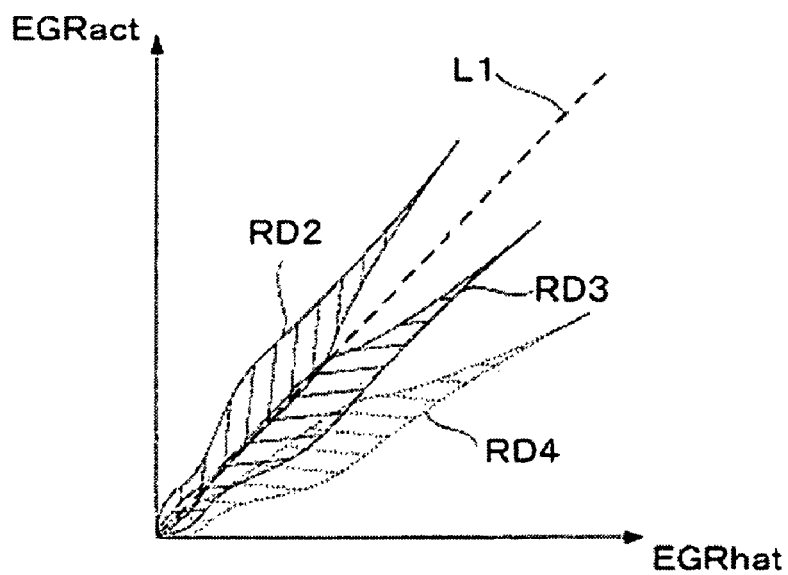
Figure 9C:
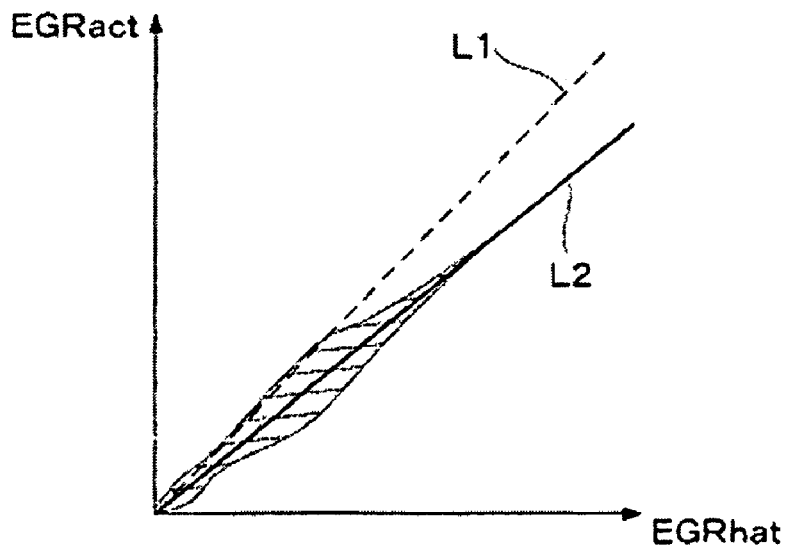

FIGS. 9A-9C illustrate the relationships between the estimated exhaust gas recirculation amount EGRhat and the actual exhaust gas recirculation amount EGRact. With respect to the reference engine, the estimated exhaust gas recirculation amount EGRhat substantially coincides with the actual exhaust gas recirculation amount EGRact. Accordingly, data points (hereinafter referred to as "correlation data points") defined by the estimated exhaust gas recirculation amount EGRhat and the actual exhaust gas recirculation amount EGRact distribute, as shown in FIG. 9A for example, in the region RD1 with hatching. The region RD1 is defined around the central straight line L1 and the inclination of the line L1 is equal to "1".

With respect to an engine having a characteristic that the actual exhaust gas recirculation amount EGRact is comparatively great compared with the reference engine, the correlation data points are distributed, for example, in the region RD2 of FIG. 9B. Conversely, with respect to an engine having a characteristic that the actual exhaust gas recirculation amount EGRact is comparatively small due to, for example, clogging of the EGR valve, the correlation data points distribute in the region RD3 of FIG. 9B for example. If the state of clogging becomes worse, the distribution of the correlation data points shifts to the region RD4.

Therefore in this embodiment, the correlation parameters a(k) and b(k) which correspond to the approximated straight line L2 as shown in FIG. 9C, are calculated from the distribution of the correlation data points, wherein the engine control parameter is corrected according to the correlation parameter a(k) indicative of the inclination of the approximated straight line L2. Further, if the correlation parameter a(k) is less than the determination threshold value AOBDLMT (for example, when the correlation data points distribute in the region RD4), it is determined that the exhaust gas recirculation device has failed, and the warning lump is turned on (FIG. 4, steps S20 and S21).

The calculation method of the correlation parameters a(k) and b(k) is described below. The sequential identifying algorithm is a least squares method algorithm for calculating the present values a(k) and b(k) of the correlation parameters, based on the present values (latest values) EGRhat(k) and EGRact(k) of the data to be processed and the preceding values a(k−1) and b(k−1) of the correlation parameters.

If a correlation parameter vector θCR(k) including the correlation parameters a(k) and b(k) as elements is defined by the following equation (21), the correlation parameter vector θCR(k) is calculated by the following equation (22) according to the sequential identifying algorithm.

$$\theta CR(k)^T=[a(k)\ b(k)] \tag{21}$$

$$\theta CR(k)=\theta CR(k-1)+KP(k)\times eid(k) \tag{22}$$

In the equation (22), "eid(k)" is an identification error defined by the following equations (23) and (24). "KP(k)" is a gain coefficient vector defined by the following equation (25), and "P(k)" in the equation (25) is a second-order square matrix calculated by the following equation (26).

$$eid(k) = EGRact(k) - \theta CR(k-1)^T \zeta(k) \tag{23}$$

$$\zeta^T(k) = [EGRhat(k)\ 1] \tag{24}$$

$$KP(k) = \frac{P(k)\zeta(k)}{1+\zeta^T(k)P(k)\zeta(k)} \tag{25}$$

$$P(k+1) = \frac{1}{\lambda_1}\left(I - \frac{\lambda_2 P(k)\zeta(k)}{\lambda_1+\lambda_2\zeta^T(k)P(k)\zeta(k)}\right)P(k) \tag{26}$$

The coefficient λ1 in the equation (26) is set to a value from "0" to "1", and the coefficient λ2 is set to "1". "I" is a unit matrix.

According to the sequential identifying algorithm by the equations (21) to (26), the statistic processing operation can be simplified.

If the correlation parameters a(k) and b(k) are used, a statistically processed exhaust gas recirculation amount EGRIs is given by the following equation (27). The equation (27) is a linear expression corresponding to the straight line L2 shown in FIG. 9C.

$$EGRIs=a(k)\times EGRhat+b(k) \tag{27}$$

According to the process of FIG. 8, the correlation parameters a(k) and b(k), which indicate the relationship between the actual exhaust gas recirculation amount EGRact and the estimated exhaust gas recirculation amount EGRhat, are calculated by the sequential statistical processing. Accordingly, even if the boost pressure PB, the engine rotational speed NE, and the like, which are the input parameters of the neural network, fluctuate at comparatively high frequencies due to noise, the influence of such fluctuation can be eliminated.

In this embodiment, the dividing ratio Rm1 of the first main injection amount Toutm1 and the second main injection amount Toutm2 is corrected by the dividing ratio correction coefficient Km1 calculated according to the correlation parameter a(k). Consequently, the divided injections are performed with an appropriate dividing ratio, thereby improving the robustness of the NOx emission amount, regardless of the characteristic variation or aging of the engine (or the exhaust gas recirculation device).

Further, if the correlation parameter a(k) is equal to or less than the determination threshold value AOBDLMT, it is determined that the exhaust gas recirculation device has failed and the warning lump is turned on. Therefore, the situation where the NOx emission amount exceeds the regulation value can be promptly eliminated.

Figures 10A, 10B, 10C, 10D, 10E:
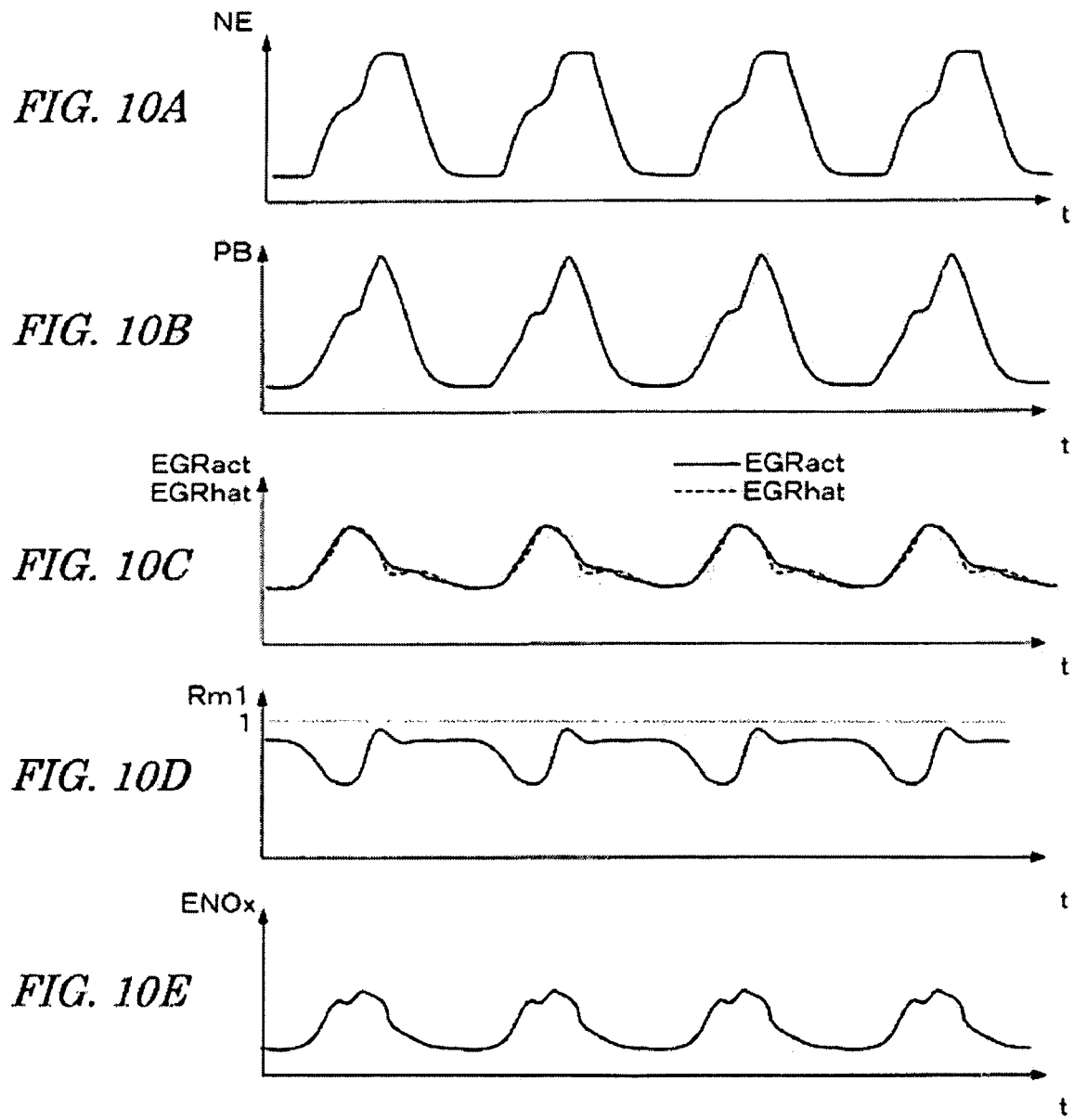
FIGS. 10A-10E, 11A, 11B, and 12A-12C are time charts for illustrating examples of the control operation in the first embodiment.

FIGS. 10A-10E show time charts of an example of the control operation with respect to the reference engine, i.e., changes in the engine rotational speed NE, the boost pressure PB, the actual exhaust gas recirculation amount EGRact, the estimated exhaust gas recirculation amount EGRhat, the dividing ratio Rm1, and the NOx emission amount ENOx are shown. In FIG. 10C, the solid line corresponds to the actual exhaust gas recirculation amount EGRact, and the dashed line corresponds to the estimated exhaust gas recirculation amount EGRhat. It is confirmed that both of the lines well coincide with each other. In the state shown in FIG. 10C, the NOx emission amount ENOx is suppressed to a comparatively low level.

Figure 11A:
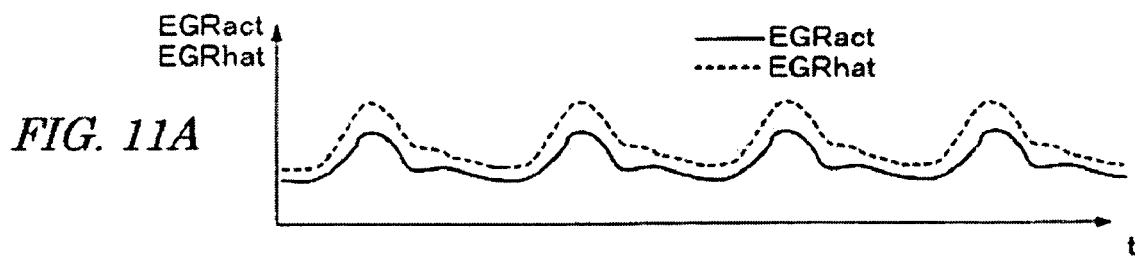
Figure 11B:
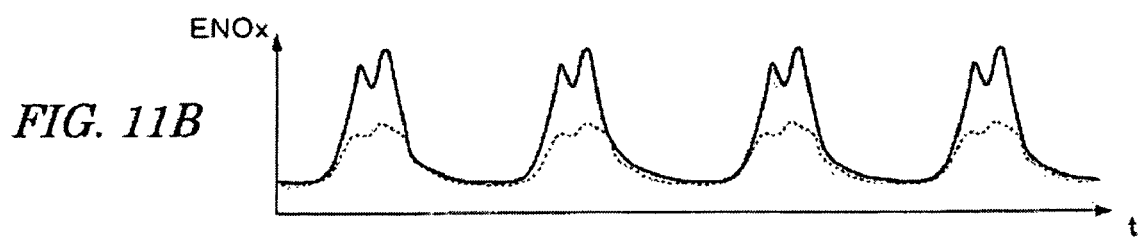

FIGS. 11A and 11B show an example of the control operation wherein the engine is different in the operating characteristic from the reference engine and the correction with the dividing ratio correction coefficient Km1 described above is not performed. Changes in the engine rotational speed NE, the boost pressure PB, and the dividing ratio Rm1, which are not shown in FIGS. 11A and 11B, are the same as those of FIGS. 10A, 10B, and 10D. As shown in FIG. 11A, the actual exhaust gas recirculation amount EGRact is less than the estimated exhaust gas recirculation amount EGRhat, and the NOx emission amount ENOx increases compared with the example shown by the dashed line which corresponds to the solid line in FIG. 10E.

Figure 12A:
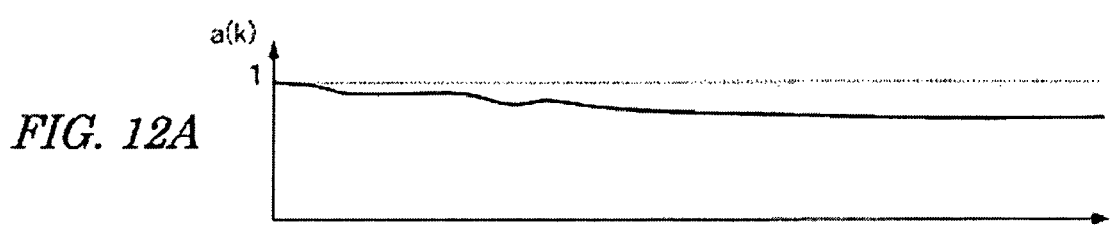
Figure 12B:
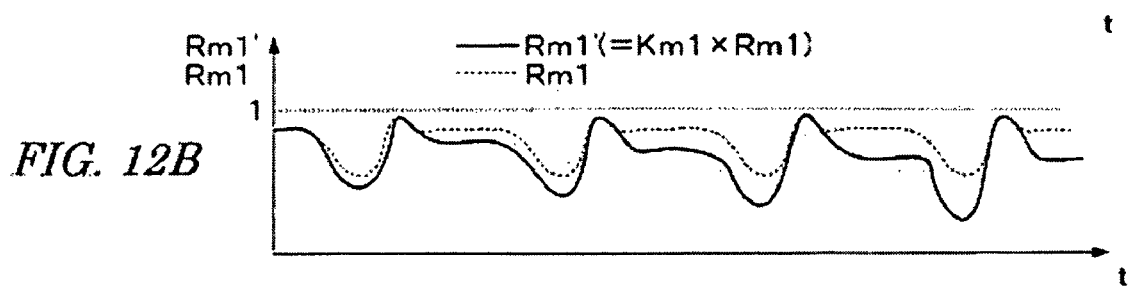
Figure 12C:

FIGS. 12A-12C show an example in which the correlation parameter a(k) is calculated by the sequential identifying algorithm and the dividing ratio correction coefficient Km1 calculated according to the correlation parameter a(k) is applied in the example of the control operation shown in FIGS. 11A and 11B. The solid line in FIG. 12B shows a change in the corrected dividing ratio Rm1' (=Rm1×Km1). The correlation parameter a(k) gradually converges to a value which reflects the present engine state by repeating the control operation. The corrected dividing ratio Rm1' gradually becomes appropriate with the convergence of the correlation parameter a(k) and the NOx emission amount ENOx gradually decreases as shown by the solid line in FIG. 12C. The dashed line in FIG. 12C, which is the same as the waveform of FIG. 10E, is shown for comparison.

In this embodiment, the exhaust gas recirculation device corresponds to the exhaust gas recirculating means; the exhaust gas recirculation amount sensor 26 corresponds to the exhaust gas recirculation amount detecting means; and the fuel injection valve 9 corresponds to the fuel injection means. The ECU 20 constitutes the estimated exhaust gas recirculation amount calculating means, the engine control parameter calculating means, the difference parameter calculating means, the fuel injection control means, and the failure determining means. Specifically, step S31 of FIG. 8 corresponds to the estimated exhaust gas recirculation amount calculating means, and steps S16 and S17 of FIG. 4 correspond to the engine control parameter calculation means. That is, the dividing ratio Rm1' (=Km1×Rm1) corrected by the dividing ratio correction coefficient Km1 corresponds to "the engine control parameter". Step S33 in FIG. 8 corresponds to the difference parameter calculating means; steps S15 to S19 in FIG. 4 correspond to the fuel injection control means; and steps S20 and S21 correspond to the failure determining means.

Second Embodiment

In this embodiment, the emission amount of NOx, which is applied to a calculation of an amount of NOx trapped in the lean NOx catalyst 31, is corrected according to the correlation parameter a(k). The points that are different from the first embodiment will be described below.

Figure 13:
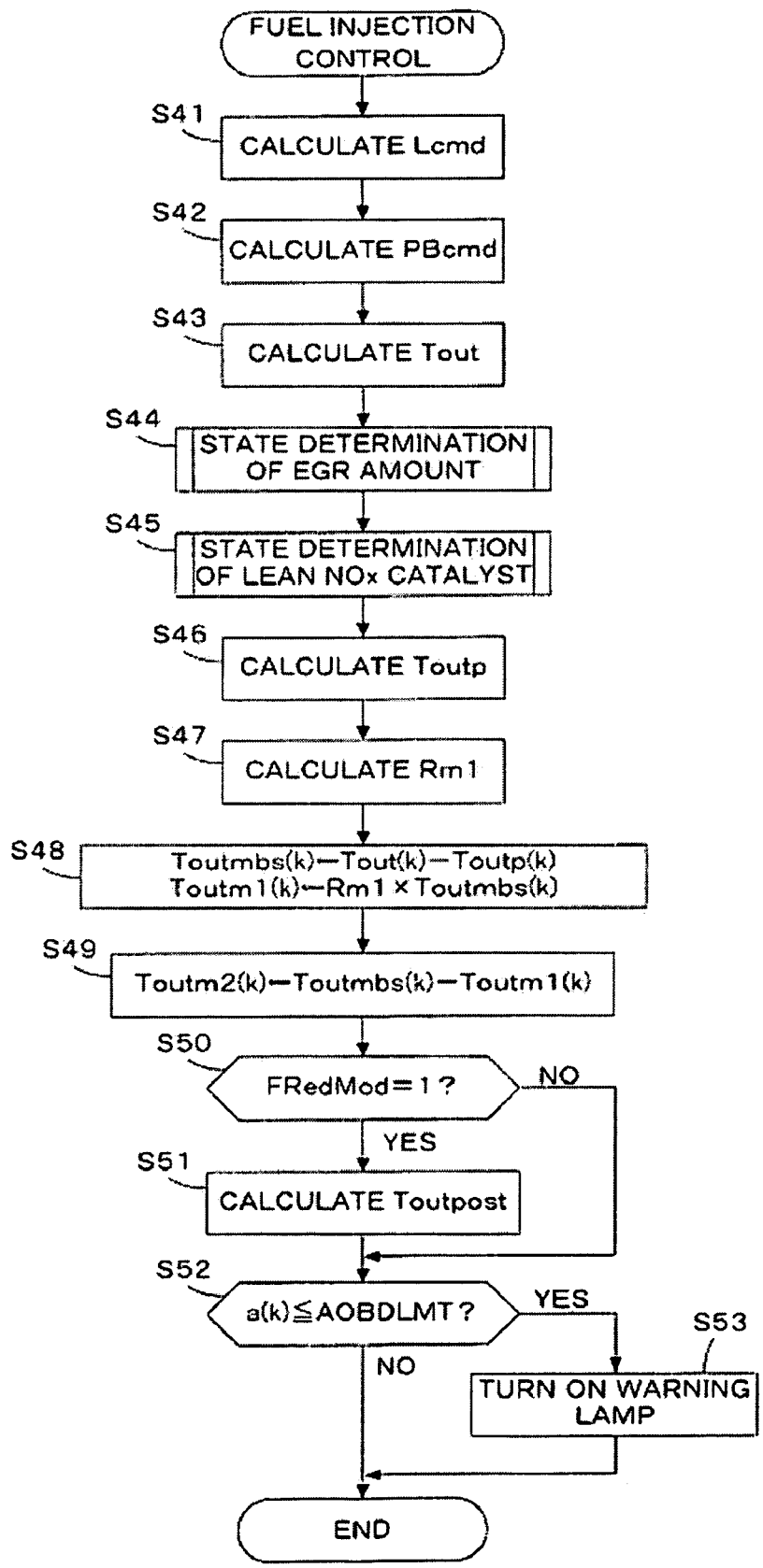
FIG. 13 is a flowchart of the fuel injection control process according to a second embodiment of the present invention.

FIG. 13 is a flowchart of the fuel injection control process in this embodiment. Steps S41 to S44, S46, S47, S49, S52 and S53 shown in FIG. 13 perform the same processes as corresponding steps S11 to S14, S16, S17, S19, S20, and S21 shown in FIG. 4.

Figure 15:
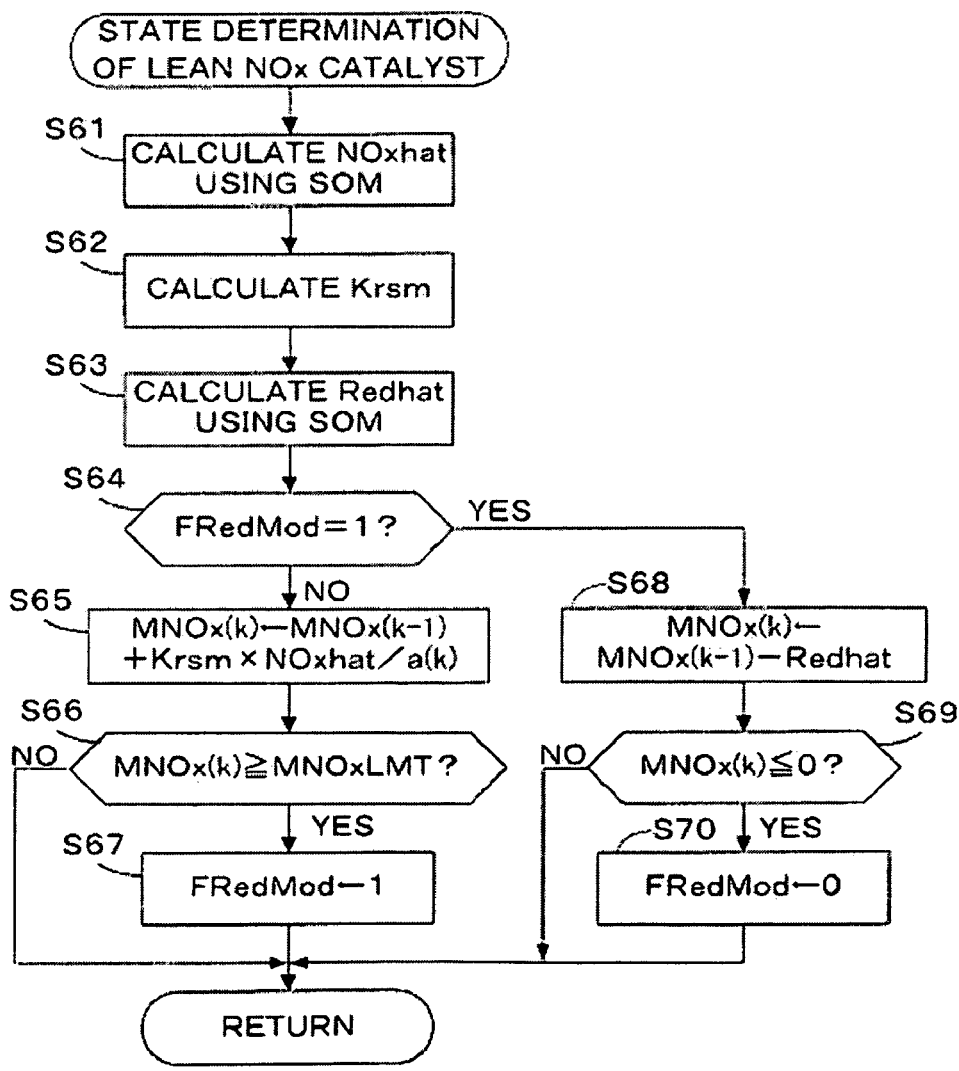
FIG. 15 is a flowchart of a process for performing a state determination of a lean NOx catalyst.

In step S45, the state determination process of the lean NOx catalyst shown in FIG. 15 is performed. In step S61 of FIG. 15, an estimated NOx emission amount NOxhat is calculated using a self-organizing map (hereinafter referred to as "NOx emission amount SOM") for calculating the NOx emission amount. The NOx emission amount SOM is set corresponding to the reference engine by the same method as that for the self-organizing map for calculating the estimated exhaust gas recirculation amount EGRhat (hereinafter referred to as "EGR amount SOM"). The NOx emission amount SOM is used in order to calculate the estimated NOx emission amount NOxhat from an input data vector xNOx shown by the following equation (31). That is, the input parameters of the NOx emission amount SOM are the lift amount command value Lcmd of the EGR valve, the boost pressure PB, the intake air temperature TI, the exhaust pressure PE, the fuel injection amount Tout, the dividing ratio Rm1, the intake air flow rate GA, and the engine rotational speed NE.

$$xNOx = (Lcmd, PB, TI, PE, Tout, Rm1, GA, NE) \tag{31}$$

A weighting coefficient vector CNOxi shown by the following equation (32) is stored Corresponding to each neuron NRNOxi of the NOx emission amount SOM.

$$CNOxi = \begin{pmatrix} CNOx0i, CNOx1i, CNOx2i, CNOx3i, CNOx4i, \\ CNOx5i, CNOx6i, CNOx7i, CNOx8i \end{pmatrix} \tag{32}$$

Therefore, the neuron NRNOxi is first selected according to the lift amount command value Lcmd and the boost pressure PB. Next, the weighting coefficient vector CNOXi of the selected neuron NRNOxi is applied to the following equation (33), to calculate the estimated NOx emission amount NOxhat.

$$NOxhat = CNOx1i \times Lcmd + CNOx2i \times PB + \tag{33}$$
$$CNOx3i \times TI + CNOx4i \times PE + CNOx5i \times Tout +$$
$$CNOx6i \times Rm1 + CNOx7i \times GA + CNOx8i \times NE + CNOx0i$$

Figure 16:
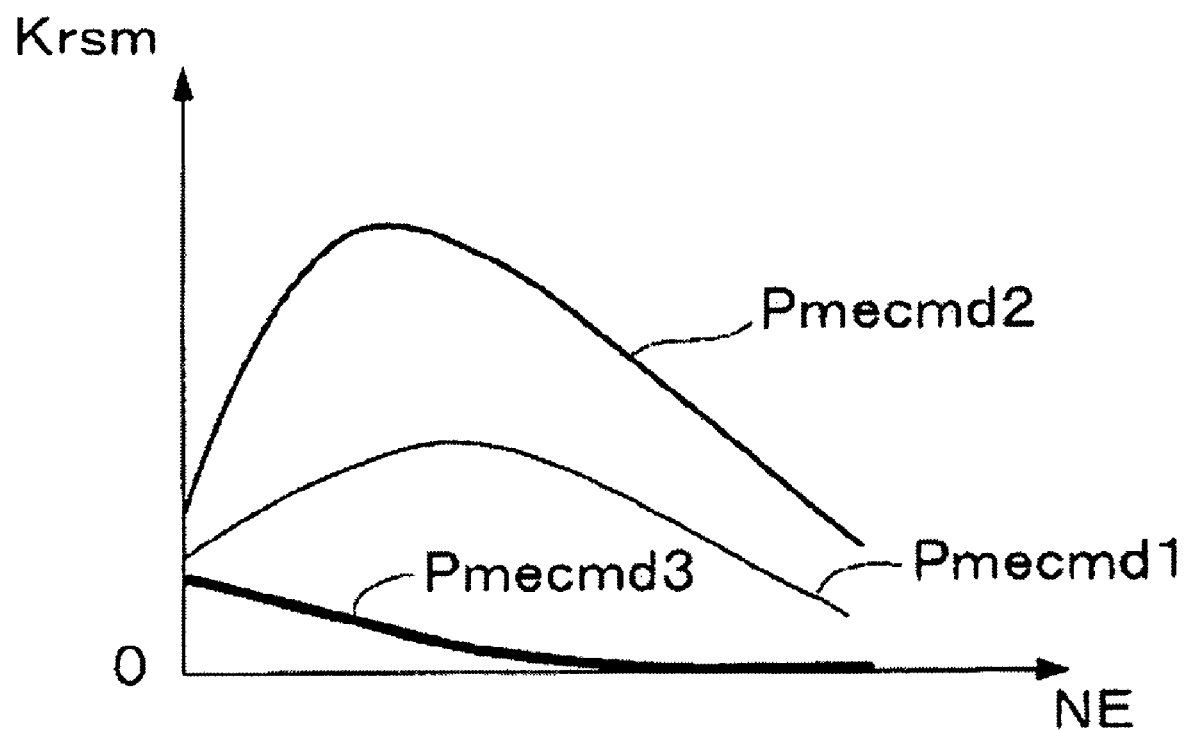
FIG. 16 shows a map referred to in the process of FIG. 15.

In step S62, a Krsm map shown in FIG. 16 is retrieved according to the engine rotational speed NE and the engine load target value Pmecmd, to calculate a modifying coefficient Krsm. The modifying coefficient Krsm is applied to a calculation of an amount MNOx of NOx trapped in the lean NOx catalyst in step S65. The Krsm map is set like the Lcmd map for calculating the lift amount command value Lcmd. That is, the modifying coefficient Krsm is set so as to increase in the medium-load and medium-speed operating region where the exhaust gas recirculation amount is made to increase, since it is necessary to increase a correction degree of the NOx emission amount by the correlation parameter a(k) as the exhaust gas recirculation amount increases.

In step S63, an estimated reducing component emission amount Redhat is calculated using a self-organizing map (hereinafter referred to as "reducing component emission amount SOM") for calculating an amount of reducing components (HC, CO) discharged from the engine. The estimated reducing component emission amount Redhat takes a value which is converted so as to indicate an amount of NOx reduced by the discharged reducing components.

The reducing component emission amount SOM is set corresponding to the reference engine by the same method of the EGR amount SOM, and is used for calculating the estimated reducing component emission amount Redhat from an input data vector xRed shown by the following equation (34). That is, the input parameters of the reducing component emission amount SOM are the lift amount command value Lcmd of the EGR valve, the boost pressure PB, the intake air temperature TI, the exhaust pressure PE, the fuel injection amount Tout, the dividing ratio Rm1, a post injection amount Toutpost, the intake air flow rate GA, and the engine rotational speed NE. The post injection amount Toutpost is a fuel injection amount in the post injection described below.

$$xRed=(Lcmd, PB, TI, PE, Tout, Rm1, Toutpost, GA, NE) \quad (34)$$

A weighting coefficient vector CRedi shown by the following equation (35) is stored corresponding to each neuron NRRedi of the reducing component emission amount SOM.

$$Credi = \begin{pmatrix} CRed0i, CRed1i, CRed2i, CRed3i, CRed4i, \\ CRed5i, CRed6i, CRed7i, CRed8i, CRed9i \end{pmatrix} \quad (35)$$

Therefore, the neuron NRRedi is first selected according to the lift amount command value Lcmd and the boost pressure PB. Next, the weighting coefficient vector CRedi of the selected neuron NRRedi is applied to the following equation (36), to calculate the estimated reducing component emission amount Redhat.

$$Redhat = CRed1i \times Lcmd + CRed2i \times PB + CRed3i \times TI + \\ CRed4i \times PE + CRed5i \times Tout + CRed6i \times Rm1 + \\ CRed7i \times Toutpost + CRed8i \times GA + CRed9i \times NE + CRed0i \quad (36)$$

In step S64, it is determined whether or not a NOx reduction mode flag FRedMod is equal to "1". The NOx reduction mode flag FRedMod is set to "1" when executing a NOx reduction process in order to reduce NOx trapped in the lean NOx catalyst 31. In the NOx reduction process, the post injection (fuel injection in the explosion stroke after performing the main injection or in the exhaust stroke) is performed for supplying reducing components to the exhaust system.

If FRedMod is equal to "0" in step S64, the modifying coefficient Krsm, the estimated NOx emission amount NOxhat, and the correlation parameter a(k) are applied to the following equation (37), to calculate a trapped NOx amount MNOx(k) (step S65).

$$MNOx(k)=MNOx(k-1)+Krsm \times NOxhat/a(k) \quad (37)$$

In step S66, it is determined whether or not the trapped NOx amount MNOx(k) is equal to or greater than a NOx amount determination threshold value MNOxLMT. If the answer to step S66 is affirmative (YES), the NOx reduction mode flag FRedMod is set to "1" (step S67). If the trapped NOx amount MNOx(k) dose not reach the NOx amount determination threshold value MNOxLMT, the process immediately ends.

If the NOx reduction mode flag FRedMod is set to "1", the answer to step S64 becomes affirmative (YES), and the process proceeds to step S68, in which the estimated reducing component emission amount Redhat is applied to the following equation (38), to update the trapped NOx amount MNOx (k) in the decreasing direction.

$$MNOx(k)=MNOx(k-1)-Redhat \quad (38)$$

In step S69, it is determined whether or not the trapped NOx amount MNOx(k) is equal to or less than "0". If the answer to step S69 is affirmative (YES), the NOx reduction mode flag FRedMod is set to "0" (step S70). If the trapped NOx amount MNOx(k) is not equal to "0", the process immediately ends.

By applying the correlation parameter a(k) to the calculation of the trapped NOx amount MNOx(k) (equation (37)), the influence of the characteristic variation or aging of the engine can be eliminated, thereby obtaining an accurate value of the trapped NOx amount MNOx. Consequently, the reduction process of the trapped NOx can be performed at an appropriate timing, and the situation such that the NOx emission amount exceeds the regulation value can be avoided.

Referring back to FIG. 13, in steps S46 and S47, the pilot injection amount Toutp and the dividing ratio Rm1 are calculated, like steps S16 and S17 of FIG. 4. In step S48, the basic main injection amount Toutmbs is calculated by the above-described equation (14), and the first main injection amount Toutm1 is calculated by the following equation (15a).

$$Toutm1=Rm1 \times Toutmbs \quad (15a)$$

In step S49, the second main injection amount Toutm2 is calculated, like step S19 of FIG. 4.

Figure 14:
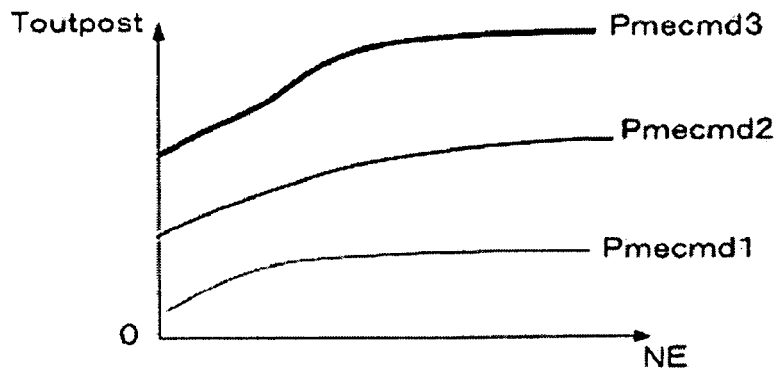
FIG. 14 shows a map referred to in the process of FIG. 13.

In step S50, it is determined whether or not the NOx reduction mode flag FRedMod is equal to "1". If the answer to step S50 is affirmative (YES), the process proceeds to step S51, in which a Toutpost map shown in FIG. 14 is retrieved according to the engine rotational speed NE and the engine load target value Pmecmd, to calculate the post injection amount Toutpost. The Toutpost map is set so that the post injection amount Toutpost increases as the engine rotational speed NE increases and/or the engine load target value Pmecmd increases. By increasing the post injection amount Toutpost corresponding to an increase in the intake air flow rate, the concentration of reducing components in the exhaust gases is controlled to the desired value.

If FRedMod is equal to "0" in step S50, the process immediately proceeds to step S52. In steps S52 and S53, the failure determination is performed, like steps S20 and S21 of FIG. 4.

In this embodiment, the estimated NOx emission amount NOxhat is calculated using the NOx emission amount SOM, and the estimated NOx emission amount NOxhat is corrected by the correlation parameter a(k) and the modifying coefficient Krsm, to calculate the trapped NOx amount MNOx in the lean NOx catalyst 31. Accordingly, the influence of the characteristic variation and aging of the engine (especially the exhaust gas recirculation device) can be eliminated, thereby obtaining an accurate value of the trapped NOx amount MNOx. Consequently, the reduction process of the trapped NOx can be performed at an appropriate timing, and such a situation that the emission amount of NOx exceeds the regulation value can be avoided.

FIGS. 17A-17F show time charts of an example of the control operation with respect to the reference engine. The time charts respectively show changes in the engine rotational speed NE, the boost pressure PB, the actual exhaust gas recirculation amount EGRact, the estimated exhaust gas recirculation amount EGRhat, the trapped NOx amount MNOx calculated by the above-described equation (37) or (38), an actual trapped NOx amount MNOxact, the NOx reduction mode flag FRedMod, and an amount of NOx discharged to the downstream side of the lean NOx catalyst 31 (hereinafter referred to as "downstream side NOx emission amount") ENOxDS. In FIG. 17C, the solid line corresponds to the actual exhaust gas recirculation amount EGRact, and the dashed line corresponds to the estimated exhaust gas recirculation amount EGRhat. Further, in FIG. 17D, the solid line corresponds to the actual trapped NOx amount MNOxact, and the dashed line corresponds to the calculated trapped NOx amount MNOx. It is confirmed that the actual trapped NOx amount MNOxact and the calculated trapped NOx amount MNOx substantially coincide with each other. In this state, the NOx reduction process is performed at an appropriate timing, and the downstream side NOx emission amount ENOxDS is maintained at a low level.

Figures 18A, 18B, 18C, 18D:
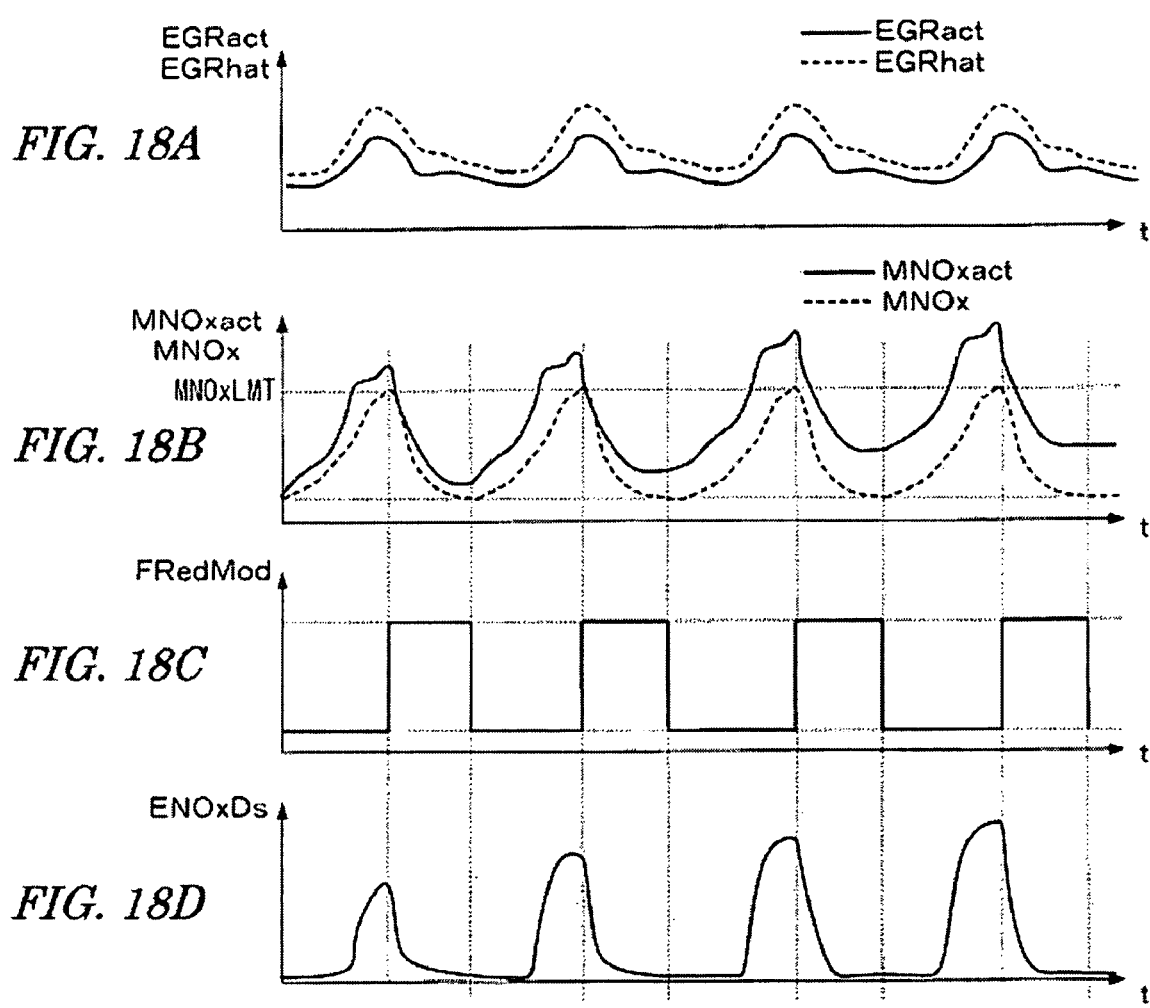

FIGS. 18A-18D shows an example of the control operation in which a clogging of the EGR valve has occurred and the correction of the NOx emission amount by the correlation parameter a(k) is not performed. Changes in the engine rotational speed NE and the boost pressure PB, which are not shown in FIGS. 18A-18D, are respectively the same as those of FIG. 17. As shown in FIG. 18A, the actual exhaust gas recirculation amount EGRact becomes less than the estimated exhaust gas recirculation amount EGRhat and the start timing of the NOx reduction mode (the timing when FRedMod shown in FIG. 18C changes from "0" to "1") delays. Consequently, the downstream side NOx emission amount ENOxDS shown in FIG. 18D increases compared with the example shown in FIG. 17F.

Figure 19A:
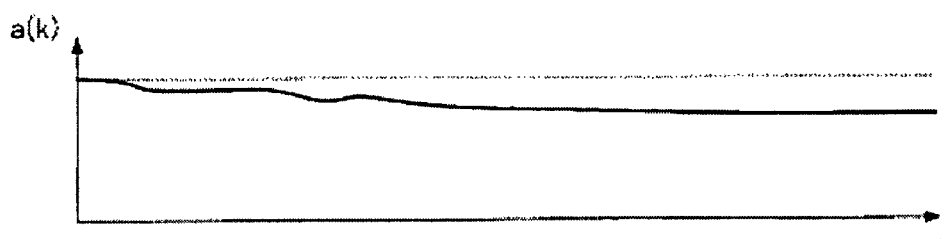
Figure 19B:
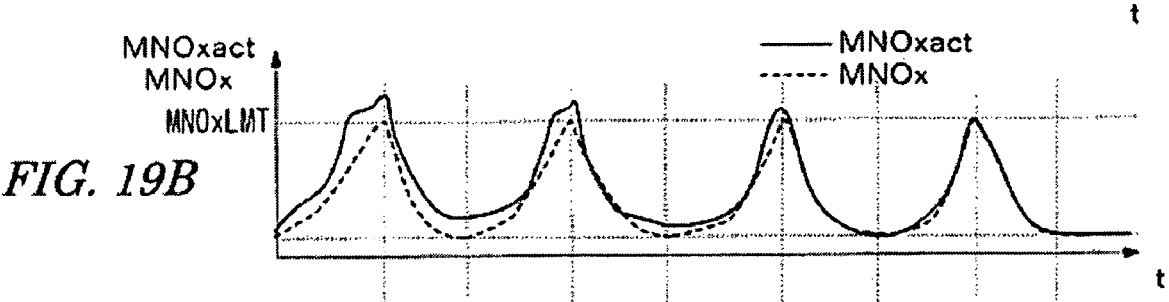
Figure 19C:
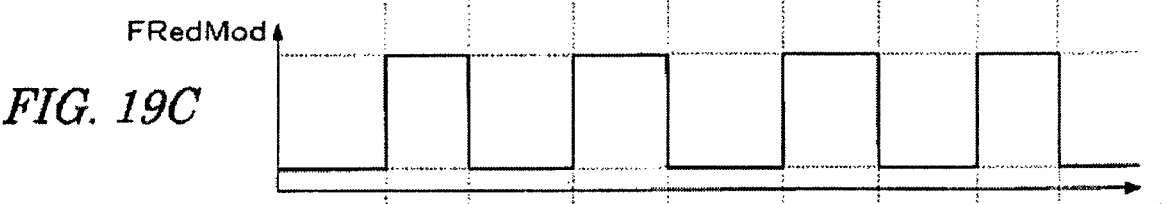
Figure 19D:
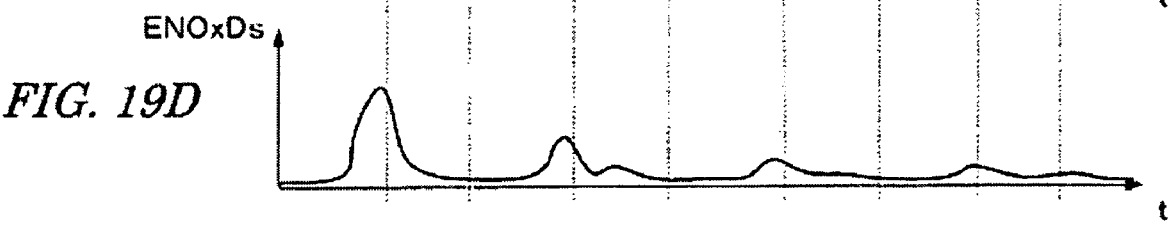

FIGS. 19A-19D show an example in which the correction of the emission amount of NOx is performed according to the correlation parameter a(k) (equation (37)) in the example of the control operation shown in FIGS. 18A-18D. The solid line in FIG. 19B shows changes in the actual trapped NOx amount MNOxact. The correlation parameter a(k) gradually converges to a value which reflects the present engine state by repeating the control operation. The corrected NOx emission amount (=Krsm×NOxhat/a(k)) gradually becomes appropriate with the convergence of the correlation parameter a(k) and the start timing of the NOx reduction process gradually becomes appropriate as shown in FIG. 19C. Consequently, the downstream side NOx emission amount ENOxDS gradually decreases as shown in FIG. 19D.

In this embodiment, the ECU 20 constitutes the estimated exhaust gas recirculation amount calculating means, the engine control parameter calculating means, the difference parameter calculating means, the fuel injection control means, and the failure determining means. Specifically, step S31 of FIG. 8 corresponds to the estimated exhaust gas recirculation amount calculating means, and steps S61 to S65 of FIG. 15 correspond to the engine control parameter calculating means. That is, the trapped NOx amount MNOx in the lean NOx catalyst 31 corresponds to "the engine control parameter". Further, steps S48 to S51 of FIG. 13 correspond to the fuel injection control means, and steps S52 and S53 correspond to the failure determining means.

Third Embodiment

Figure 20:
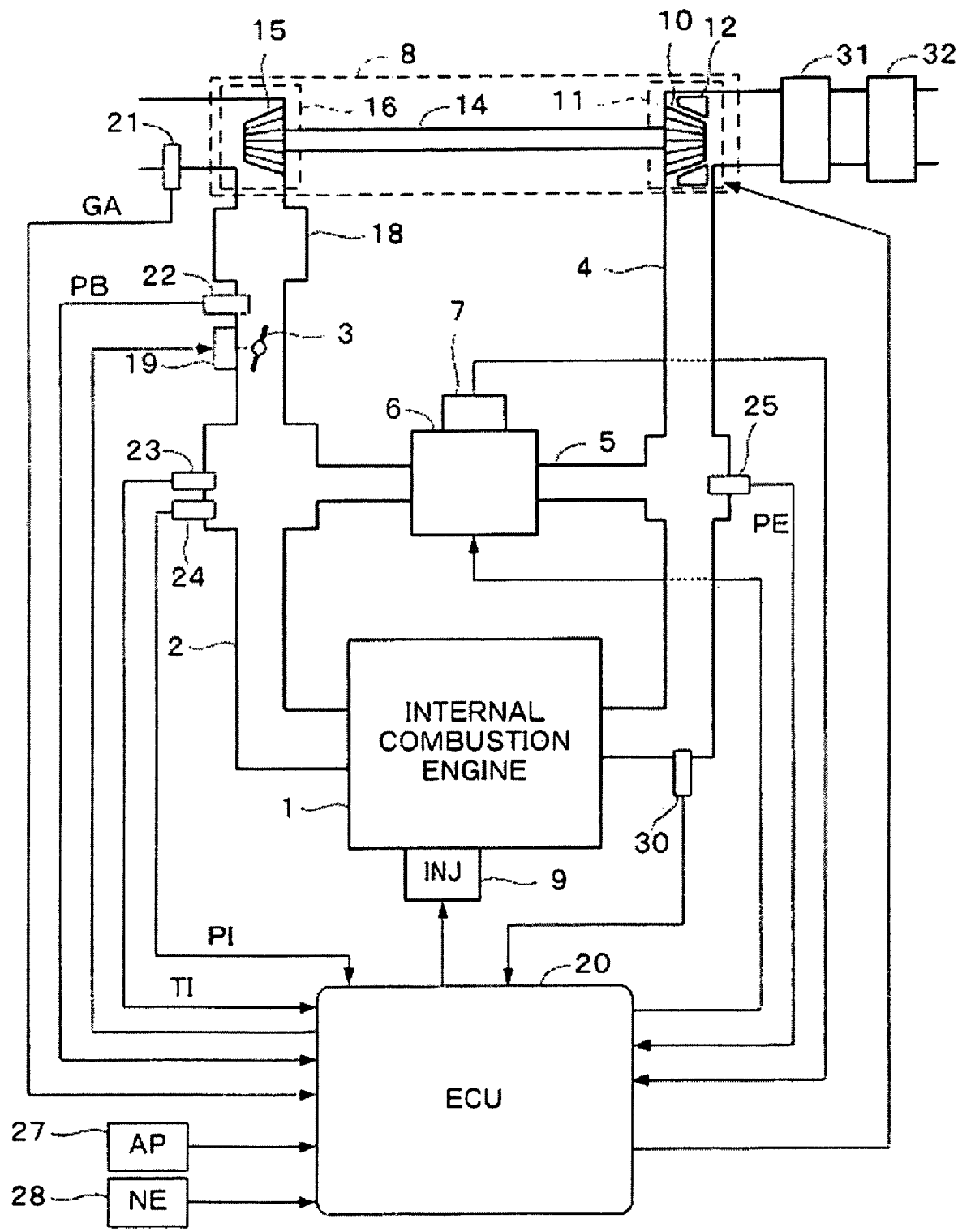
FIG. 20 shows a configuration of an internal combustion engine and a control system therefor according to a third embodiment of the present invention.

FIG. 20 is a schematic diagram showing a configuration of an internal combustion engine and a control system therefor according to the present embodiment. In this embodiment, the exhaust gas recirculation amount sensor 26 is not provided, and an air-fuel ratio sensor 30 is provided in the exhaust pipe 4 immediately downstream of the engine 1. The air-fuel ratio sensor 30 detects an air-fuel ratio AF of an air-fuel mixture in the combustion chamber by detecting an oxygen concentration in the exhaust gases, and supplies a detection signal to the ECU 20. The configuration shown in FIG. 20 is the same as that shown in FIG. 1, except for the above-described point.

In this embodiment, a state determination of the exhaust gas recirculation control and/or the boost pressure control is performed using the EGR amount SOM, without using the exhaust gas recirculation amount sensor. A distance parameter Discave is calculated as a parameter indicative of the determined control state, and the dividing ratio correction coefficient Km1 is calculated according to the distance parameter Discave. Further, the failure determination is performed based on the distance parameter Discave.

Further in this embodiment, a self-organizing map (hereinafter referred to as "first failure EGR amount SOM") for calculating the estimated exhaust gas recirculation amount corresponding to a state where a failure has occurred in the exhaust gas recirculation device (for example, a clogging of the EGR valve), and a self-organizing map (hereinafter referred to as "second failure EGR amount SOM") for calculating the estimated exhaust gas recirculation amount corresponding to a state where a failure has occurred in the intake air flow rate sensor 21 (for example, a failure that an error of the detected value exceeds a predetermined value) are previously set, and the failure determination is performed using these SOMs. Specifically, a first and a second failure distance parameters Diseave and Disaave are calculated using the first and the second failure EGR amount SOMs. The failure determinations of the exhaust gas recirculation device and the intake air flow rate sensor 21 are performed according to the first and the second failure distance parameters Diseave and Disaave. The present embodiment is the same as the first embodiment except for the points described below.

Figure 21:
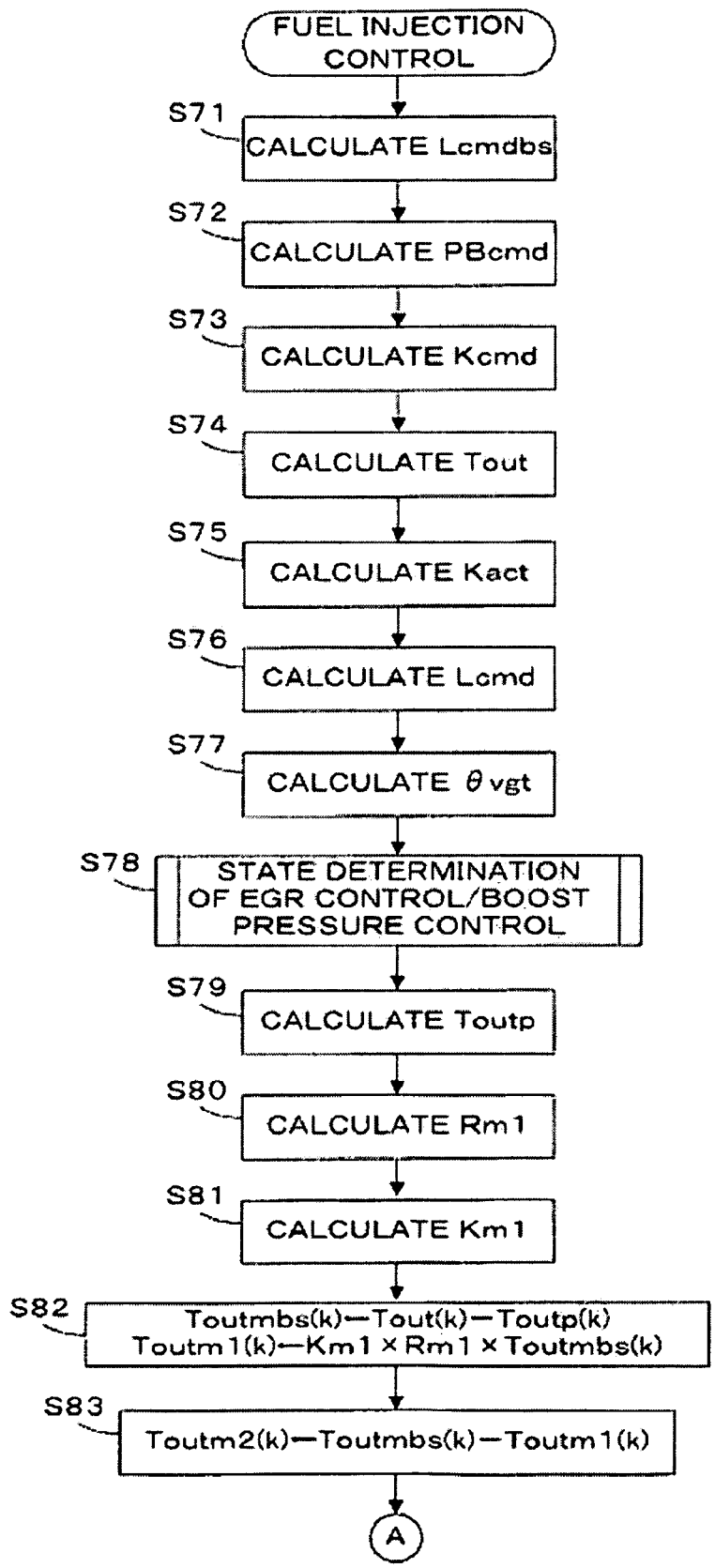
FIGS. 21 and 22 show a flowchart of the fuel injection control process according to the third embodiment.
Figure 22:
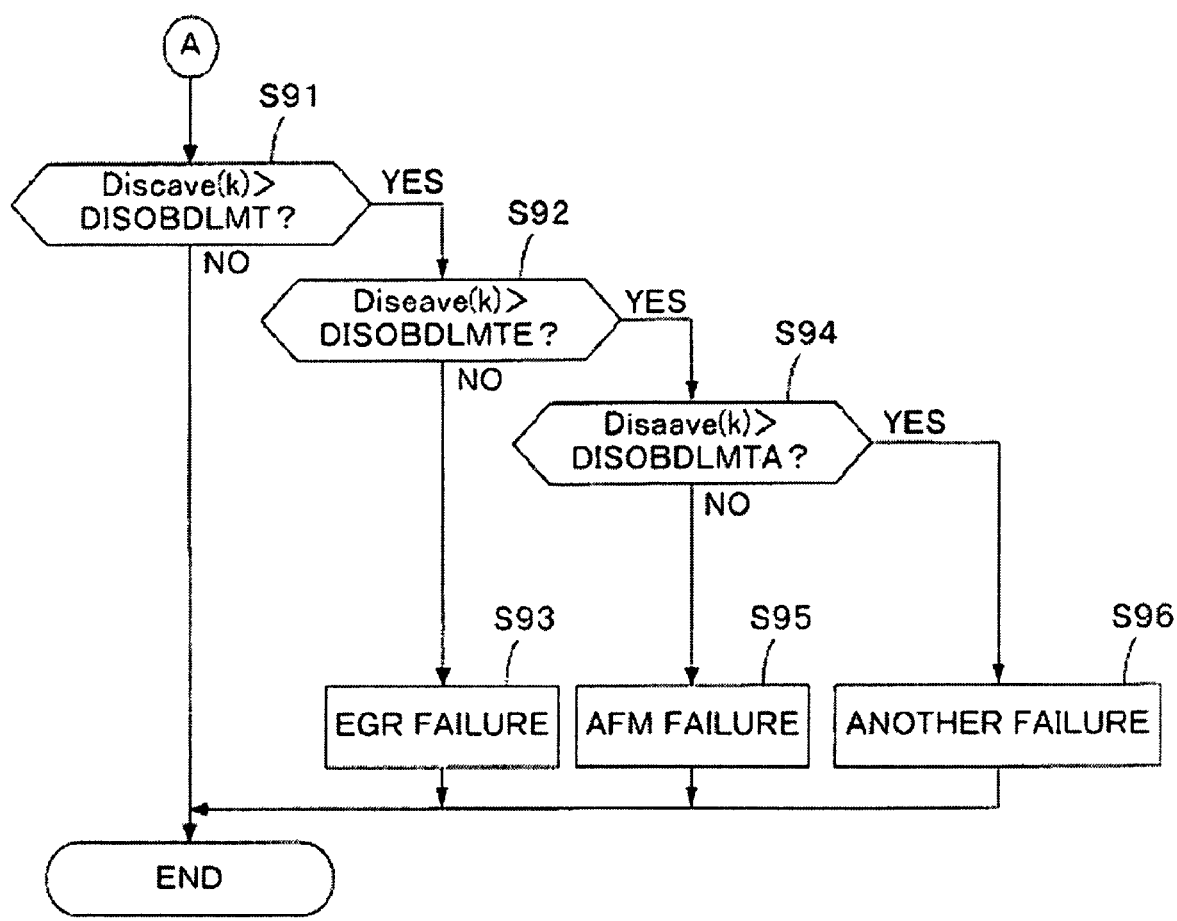
Figure 23A:
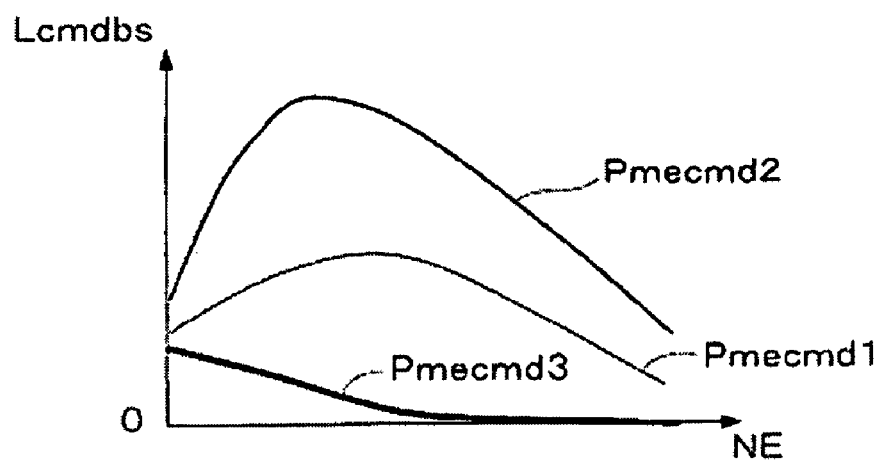
FIGS. 23A-23C show maps referred to in the process of FIG. 22.

FIGS. 21 and 22 show a flowchart of the fuel injection control process in this embodiment. In step S71, an Lcmdbs map shown in FIG. 23A is retrieved according to the engine rotational speed NE and the engine load target value Pmecmd, to calculate an EGR valve lift amount basic command value Lcmdbs. The Lcmdbs map is set similarly to the Lcmd map shown in FIG. 5A.

Figure 23B:
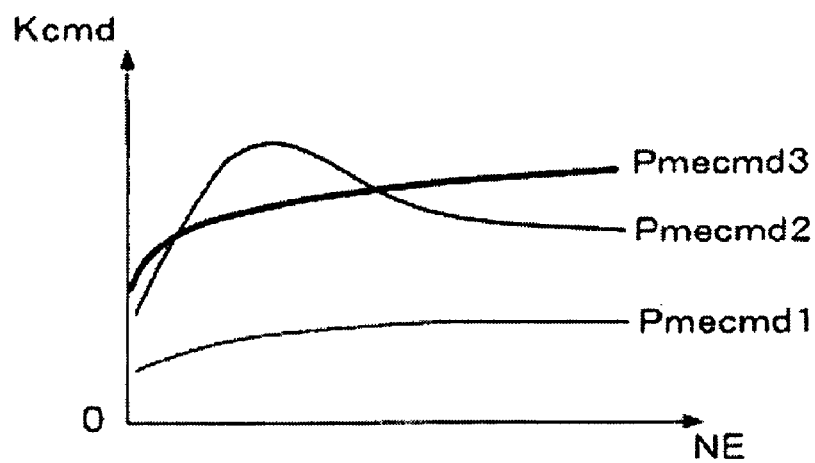

In step S72, the same process as step S12 of FIG. 4 is performed, to calculate the target boost pressure PBcmd. In step S73, a Kcmd map shown in FIG. 23B is retrieved according to the engine rotational speed NE and the engine load target value Pmecmd, to calculate a target equivalent ratio Kcmd. The target equivalent ratio Kcmd is obtained by coverting a target air-fuel ratio AFcmd to an equivalent ratio. According to the Kcmd map, the target equivalent ratio Kcmd is basically set so as to increase as the engine load target value Pmecmd increases. That is, the target equivalent ratio Kcmd is set to a comparatively small value in the low-load engine operating region in order to improve the fuel consumption. In the medium-speed and medium-load engine operating region, the target equivalent ratio Kcmd is set to a greater value than the value corresponding to a high load operation wherein the engine load target value Pmecmd is equal to the high load value Pmecmd3, since the exhaust gas recirculation amount is set to a comparatively large value.

In step S74, the same process as step S13 of FIG. 4 is performed, to calculate the fuel injection amount Tout. In step S75, the air-fuel ratio AF detected by the air-fuel ratio sensor 30 is converted to the equivalent ratio, to calculate a detected equivalent ratio Kact.

In step S76, the EGR valve lift amount command value Lcmd is calculated with the sliding mode control so that the detected equivalent ratio Kact coincides with the target equivalent ratio Kcmd. Specifically, the EGR valve lift amount command value Lcmd(k) is calculated by adding a sliding mode correction term Lsmc(k) to the basic command value Lcmdbs(k) calculated in step S71 by the following equation (41).

$$Lcmd(k)=Lcmdbs(k)+Lsmc(k) \tag{41}$$

The sliding mode correction term Lsmc(k) is calculated by the following equation (42) as a sum of a reaching law input Lrch(k) and an adaptative law input Ladp(k). The reaching law input Lrch(k) and the adaptative law input Ladp(k) are respectively calculated by the following equations (43) and (44).

$$Lsmc(k) = Lrch(k) + Ladp(k) \tag{42}$$

$$Lrch(k) = KLrch \times \sigma L(k) \tag{43}$$

$$Ladp(k) = KLadp \times \sum_{i=0}^{k} \sigma L(i) \tag{44}$$

In the equations (43) and (44), "$\sigma L$" is a switching function value calculated by the following equation (45), and "KLrch" and "KLadp" are respectively a reaching law control gain and an adaptative law control gain. In the equation (45), "eaf(k)" is a control deviation calculated by the following equation (46), and "SL" is a switching function setting parameter, which is set to a value between "−1" and "0".

$$\sigma L(k)=eaf(k)+SL \times eaf(k-1) \tag{45}$$

$$eaf(k)=Kact(k)-Kcmd(k) \tag{46}$$

In step S77, the vane opening θvgt(k) of the turbine is calculated with the sliding mode control so that the detected boost pressure PB coincides with the target boost pressure PBcmd. Specifically, the vane opening θvgt(k) is calculated by the following equation (47) as a sum of a reaching law input θrch(k) and an adaptative law input θadp(k). The reaching law input θrch(k) and the adaptative law input θadp(k) are respectively calculated by the following equations (48) and (49).

$$\theta vgt(k) = \theta rch(k) + \theta adp(k) \tag{47}$$

$$\theta rch(k) = K\theta rch \times \sigma V(k) \tag{48}$$

$$\theta adp(k) = K\theta adp \times \sum_{i=0}^{k} \sigma V(i) \tag{49}$$

In the equations (48) and (49), "$\sigma V$" is a switching function value calculated by the following equation (50), and "Kθrch" and "Kθadp" are respectively a reaching law control gain and an adaptative law control gain. In the equation (50), "epb(k)" is a control deviation calculated by the following equation (51), and "Sθ" is a switching function setting parameter, which is set to a value between "−1" and "0".

$$\sigma V(k)=epb(k)+S\theta \times epb(k-1) \tag{50}$$

$$epb(k)=PBcmd(k)-PB(k) \tag{51}$$

Figure 24:
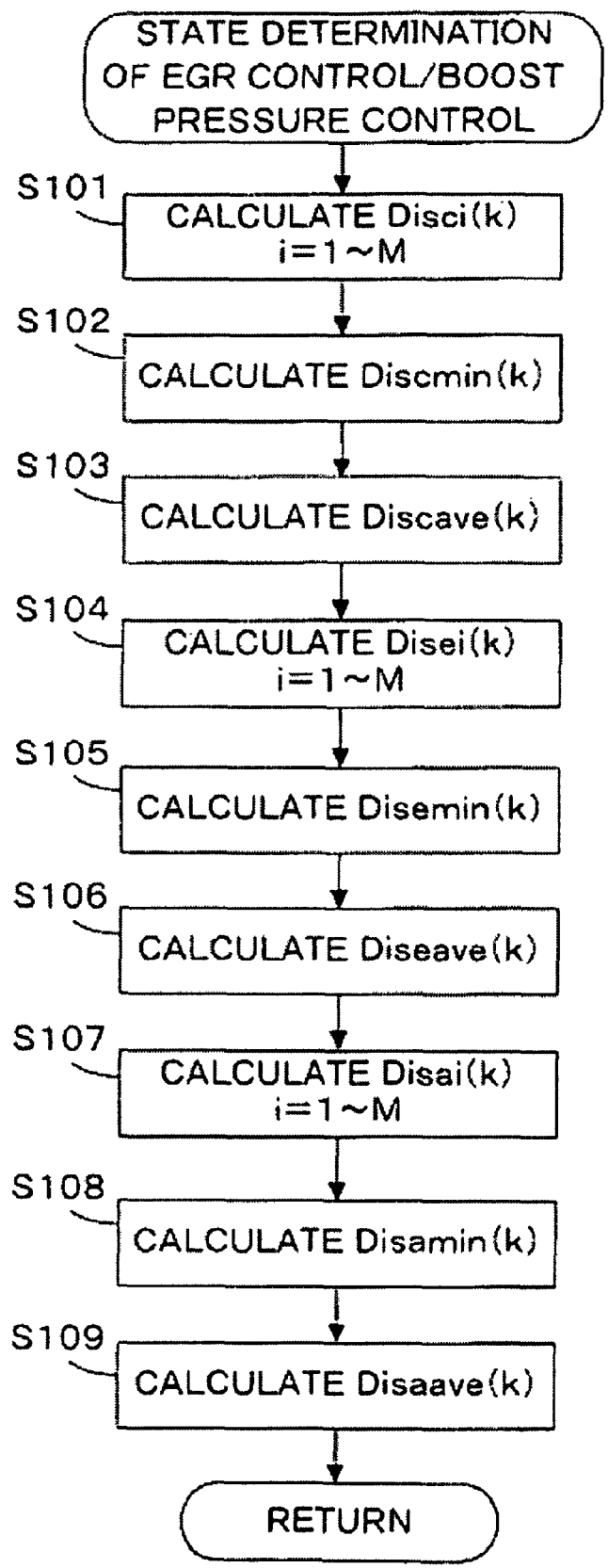
FIG. 24 is a flowchart of a process for performing a state determination of an exhaust gas recirculation control and a boost pressure control.

In step S78, a state determination process of the EGR control and/or the boost pressure control shown in FIG. 24 is performed. The distance parameter Discave, the first failure distance parameter Diseave, and the second failure distance parameter Disaave, which are described above, are calculated. The distance parameter Discave indicates a degree of a deviation of the present control state from the control state of the reference engine. That is, the distance parameter Discave increases as the degree of the deviation increases. Specifically, a larger value of the distance parameter Discave indicates, for example, that the actual exhaust gas recirculation amount EGRact is less than the flow rate corresponding to the reference engine due to a clogging of the EGR valve. Further, the first failure distance parameter Diseave indicates that the present control state is closer to the failed state corresponding to the first failure EGR amount SOM (the state that the exhaust gas recirculation device has failed), as the first failure distance parameter Diseave decreases. The second failure distance parameter Disaave indicates that the present control state is closer to the failed state corresponding to the second failure EGR amount SOM (the state that the intake air flow rate sensor 21 has failed), as the second failure distance parameter Disaave decreases.

In step S79, the pilot injection amount Toutp is calculated, like step S15 of FIG. 4. In step S80, the dividing ratio Rm1 is calculated, like step S16 of FIG. 4.

Figure 23C:
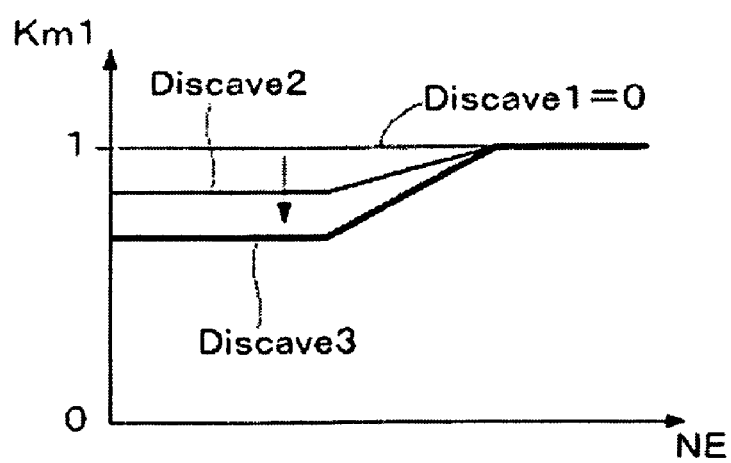

In step S81, a Km1 map shown in FIG. 23C is retrieved according to the engine rotational speed NE and the distance parameter Discave, to calculate the dividing ratio correction coefficient Km1. According to the Km1 map, when the distance parameter Discave is equal to a first predetermined value Discave1 (=0), the dividing ratio correction coefficient Km1 is set to "1.0". Further, the dividing ratio correction coefficient Km1 is set so as to decrease as the distance parameter Discave increases, i.e., as the actual exhaust gas recirculation amount decreases. That is, the second predetermined value Discave2 and the third predetermined value Discave3 shown in FIG. 23C satisfy a relationship of 0<Discave2<Discave3. By decreasing the dividing ratio Rm1' (=Rm1×Km1) corrected by the dividing ratio correction coefficient Km1, i.e., by decreasing the ratio of the first main injection amount Toutm1, the NOx emission amount can be maintained at a low level.

In step S82, the basic main injection amount Toutmbs(k) is calculated by the equation (14) in the first embodiment, and the first main injection amount Toutm1(k) is calculated by the following equation (15b). In step S83, the second main injection amount Toutm2(k) is calculated by the equation (17) in the first embodiment.

$$Toutm1(k)=Km1 \times Rm1 \times Toutmbs(k) \tag{15b}$$

In step S91, it is determined whether or not the distance parameter Discave(k) is greater than a first failure determination threshold value DISOBDLMT. If the answer to step S91 is negative (NO), it is determined that the engine is normal (the NOx emission amount can be suppressed to a value below the regulation value by correcting the dividing ratio Rm1 according to the distance parameter Discave), and the process immediately ends.

If Discave is greater than DISOBDLMT in step S91, it is determined that any failure has occurred, and it is further determined whether or not the first failure distance parameter Diseave(k) is greater than a second failure determination threshold value DISOBDLMTE (step S92). If the answer to step S92 is negative (NO), it is determined that the exhaust gas recirculation device has failed, and the warning lump indicative of the failure is turned on (step S93).

If Diseave(k) is greater than DISOBDLMTE in step S92, it is further determined whether or not the second distance parameter Disaave is greater than a third failure determination threshold value DISOBDLMTA (step S94). If the answer to step S94 is negative (NO), it is determined that the intake air flow rate sensor 21 has failed, and the warning lump indicative of the failure is turned on (step S95).

If Disaave(k) is greater than DISOBDLMTA in step S94, it is determined that any device mounted on the engine 1 other than the exhaust gas recirculation device and the intake air flow rate sensor 21 has failed, and the warning lump indicative of the failure is turned on (step S96).

FIG. 24 is a flowchart of a process for performing the state determination of the EGR control and/or the boost pressure control. This process is performed in step S78 of FIG. 21.

In step S101, the EGR valve lift amount command value Lcmd(k) and the detected boost pressure PB(k) are applied to the following equation (61), to calculate a two-dimensional distance Disci(k) with respect to all neurons of the EGR amount SOM. In the equation (61), "Lcmdci" and "PBci" are coordinates of the i-th neuron NRi (i=1 to M) on the two-dimensional plane shown in FIG. 2.

$$Disci(k) = \sqrt{(Lcmdci - Lcmd(k))^2 + (PBci - PB(k))^2} \qquad (61)$$

In step S102, a minimum value Discmin(k) of the two-dimensional distances Disci(k) which are calculated with respect to the "M" neurons, is calculated by the following equation (62).

$$Discmin(k) = min(Disc1(k), Disc2(k), \ldots, DiscM(k)) \qquad (62)$$

In step S103, a moving averaging calculation of the minimum value Discmin(k) (the number of data: Nave+1) is performed by the following equation (63), to calculate the distance parameter Discave(k).

$$Discave(k) = \frac{1}{Nave + 1} \sum_{j=0}^{Nave} Discmin(k - j) \qquad (63)$$

The distance parameter Discave incicates a deviation amount DEVREF of the present state of the EGR control and/or the boost pressure control from the control state with respect to the reference engine. That is, the distance parameter Discave takes a value substantially equal to "0" if the present control state is the same as the control state with respect to the reference engine. Therefore, the distance parameter Discave increases as the deviation amount DEVREF increases due to the characteristic variation or aging of the engine. Consequently, if the distance parameter Discave is greater than the first failure determination threshold value DISOBDLMT, it is possible to determine that any abnormality exists in the present control state, i.e., any one of the devices mounted on the engine 1 has failed (FIG. 22, step S91).

In step S104, a calculation similar to that of step S101 is performed using the first failure EGR amount SOM described above, and a two-dimensional distance Disei(k) is calculated by the following equation (64) with respect to all neurons of the first failure EGR amount SOM. In the equation (64), "Lcmdei" and "PBei" are coordinates of the i-th neuron (i=1 to M) of the first failure EGR amount SOM, on the two-dimensional plane defined by Lcmd and PB.

$$Disei(k) = \sqrt{(Lcmdei - Lcmd(k))^2 + (PBei - PB(k))^2} \qquad (64)$$

In step S105, a minimum value Disemin(k) of the calculated two-dimensional distances Disei(k) with respect to the "M" neurons, is calculated by the following equation (65).

$$Disemin(k) = min(Dise1(k), Dise2(k), \ldots, DiseM(k)) \qquad (65)$$

In step S106, a moving averaging calculation of the minimum value Disemin(k) is performed by the following equation (66), to calculate the first failure distance parameter Diseave(k).

$$Diseave(k) = \frac{1}{Nave + 1} \sum_{j=0}^{Nave} Disemin(k - j) \qquad (66)$$

The first failure distance parameter Diseave indicates a deviation amount DEVFL1 of the present state of the EGR control and/or the boost pressure control from the control state corresponding to the first failure EGR amount SOM. That is, if the present control state is the same as the control state corresponding to the first failure EGR amount SOM, the first failure distance parameter Diseave is substantially equal to "0". The first failure distance parameter Diseave increases as the deviation amount DEVFL1 increases. Consequently, if the first failure distance parameter Diseave is equal to or less than the second failure determination threshold value DISOBDLMTE, it is possible to determine that the exhaust gas recirculation device has failed (FIG. 22, steps S92, S93).

In step S107, a calculation similar to that of step S101 is performed using the second failure EGR amount SOM described above, and a two-dimensional distance Disai(k) is calculated by the following equation (67) with respect to all neurons of the second failure EGR amount SOM. In the following equation (67), "Lcmdai" and "PBai" in the equation (67) are coordinates of the i-th neuron (i=1 to M) of the second failure EGR amount SOM, on the two-dimensional plane defined by Lcmd and PB.

$$Disai(k) = \sqrt{(Lcmdai - Lcmd(k))^2 + (PBai - PB(k))^2} \qquad (67)$$

In step S108, a minimum value Disamin(k) of the two-dimensional distances Disai(k) with respect to the "M" neurons, is calculated by the following equation (68).

$$Disamin(k) = min(Disa1(k), Disa2(k), \ldots, DisaM(k)) \qquad (68)$$

In step S109, a moving averaging operation of the minimum value Disamin(k) is performed by the following equation (69), to calculate the second failure distance parameter Disaave(k).

$$Disaave(k) = \frac{1}{Nave+1} \sum_{j=0}^{Nave} Disamin(k-j) \quad (69)$$

The second failure distance parameter Disaave indicates a deviation amount DEVFL2 of the present state of the EGR control and/or the boost pressure control from the control state corresponding to the second failure EGR amount SOM. That is, if the present control state is the same as the control state corresponding to the second failure EGR amount SOM, the second failure distance parameter Disaave is substantially equal to "0". The second failure distance parameter Diseave increases as the deviation amount DEVFL2 increases. Consequently, if the second failure distance parameter Diseave is equal to or less than the third failure determination threshold value DISOBDLMTA, it is possible to determine that the intake air flow rate sensor 21 has failed (FIG. 22, steps S94, S95).

FIGS. 25A-25E show time charts of an example of the control operation with respect to the reference engine. The time charts respectively show changes in the engine rotational speed NE, the target boost pressure PBcmd, the boost pressure PB, the EGR valve lift amount basic command value Lcmdbs, the EGR valve lift amount command value Lcmd, the dividing ratio Rm1, and the NOx emission amount ENOx. In FIG. 25B, the solid line corresponds to the detected boost pressure PB, and the dashed line corresponds to the target boost pressure PBcmd. The two lines substantially coincide with each other. Further, in FIG. 25C, the solid line corresponds to the lift amount command value Lcmd, and the dashed line corresponds to the lift amount basic command value Lcmdbs. The two lines substantially coincide with each other. In this control state, the NOx emission amount ENOx is suppressed at a comparatively low level.

Figure 26A:
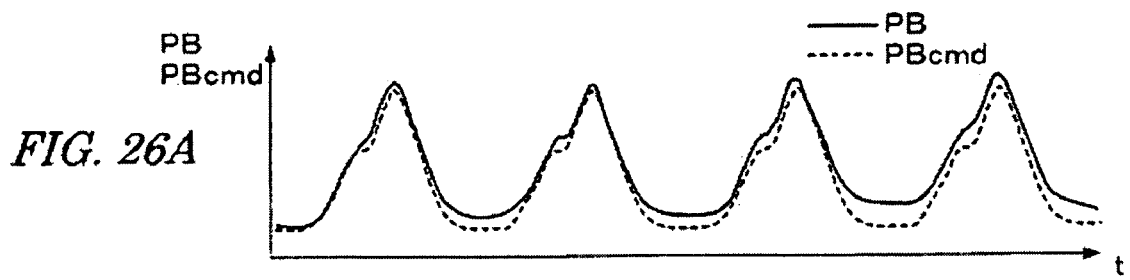
Figure 26B:
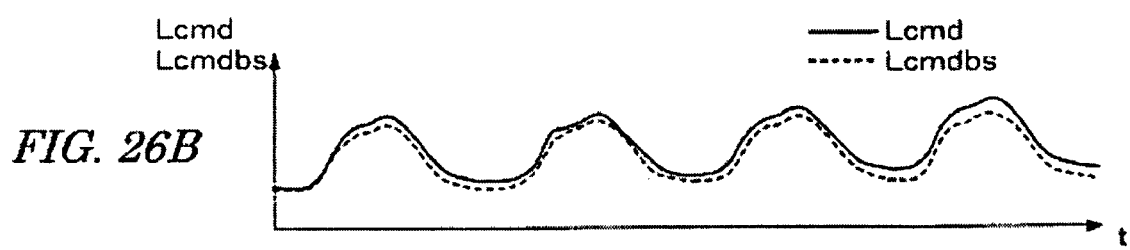
Figure 26C:
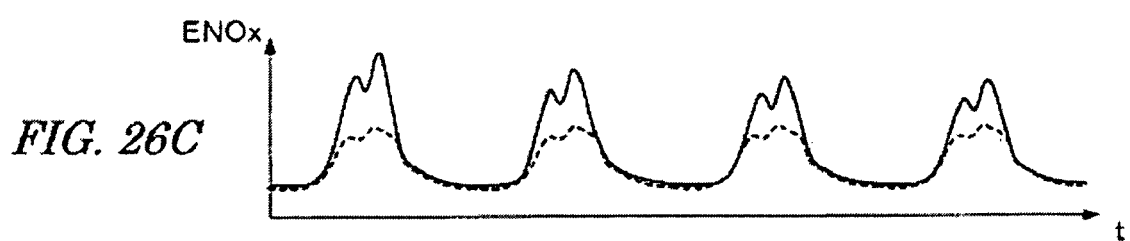

FIGS. 26A-26 C show an example of the control operation in which a clogging of the EGR valve has occurred and the correction by the dividing ratio correction coefficient Km1 described above is not performed. Changes in the engine rotational speed NE, which are not shown in FIGS. 26A-26C, are the same as those of FIG. 25A. As shown in FIG. 26A, a difference between the target boost pressure PBcmd and the detected boost pressure PB gradually increases, and a difference between the lift amount basic command value Lcmdbs and the lift amount command value Lcmd also gradually increases as shown in FIG. 26B. This is because the two feedback controls (steps S76 and S77) are operating to compensate the influence of reduction in the actual exhaust gas recirculation amount EGRact. Consequently, as shown in FIG. 26C, the NOx emission amount ENOx increases compared with the example of FIG. 25E shown by the dashed line.

Figure 27A:
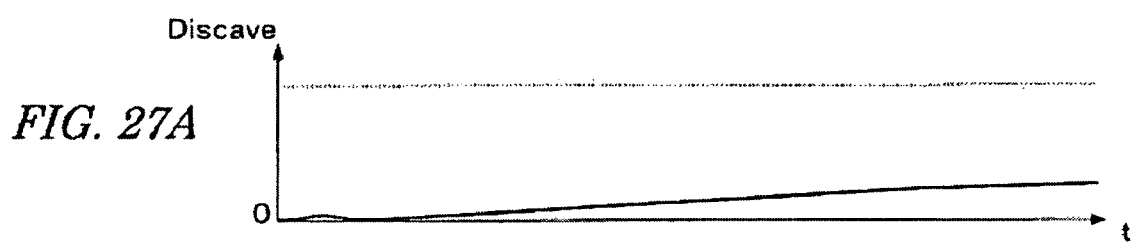
Figure 27B:
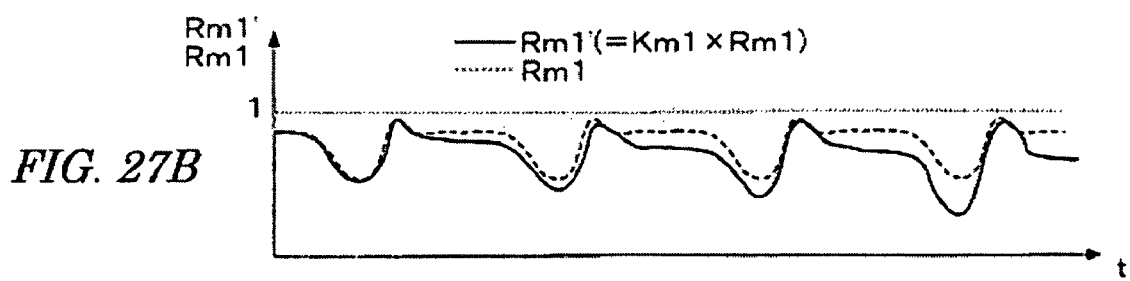
Figure 27C:
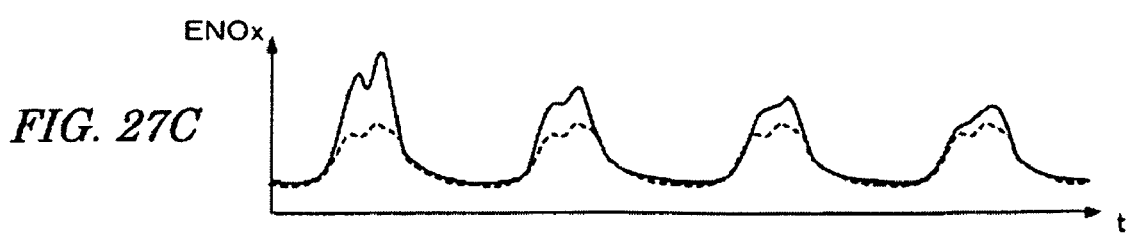

FIGS. 27A-27C show an example in which the dividing ratio correction coefficient Km1 calculated according to the distance parameter Discave(k) is applied to the example of the control operation shown in FIGS. 26A-26C. The solid line shown in FIG. 27B shows changes in the corrected dividing ratio Rm1' (=Rm1×Km1). The distance parameter Discave gradually converges to a value which reflects the present engine state by repeating the control operation. The corrected dividing ratio Rm1' gradually becomes appropriate along with the convergence of the distance parameter Discave, and the NOx emission amount ENOx gradually decreases as shown by the solid line in FIG. 27C.

According to this embodiment, the distance parameter Discave indicative of the engine state relevant to the exhaust gas recirculation amount is calculated using the self-organizing map for calculating the estimated exhaust gas recirculation amount EGRhat. Further, the dividing ratio Rm1' of the main fuel injection amount is calculated according to the calculated distance parameter Discave. In the self-organizing map, a combination of the input parameters and a pattern of appearance frequency of the input parameters are stored as a distribution of neurons. Therefore, by setting the self-organizing map corresponding to the reference engine, the distance parameter Discave indicative of a relative difference with resect to the state of the reference engine can be calculated. By calculating the dividing ratio Rm1' according to the distance parameter Discave, the NOx emissions amount can be maintained at a comparatively low level in an engine of a different state compared with the state of the reference engine. Accordingly, the robustness of the emission amount of NOx can be improved.

Further, the failure determination is performed by comparing the distance parameter Discave, and the failure distance parameters Diseave and Disaave with the corresponding failure determination threshold values. Therefore, it is possible to determine a failure of the devices mounted on the engine 1 without any special sensor for determining the failure.

By previously setting the first failure EGR amount SOM corresponding to the state in which the exhaust gas recirculation device has failed, and the second failure EGR amount SOM corresponding to the state in which the intake air flow rate sensor 21 has failed, and performing the failure determination by the first and second failure distance parameters Diseave and Disaave calculated using these failure SOMs, a failure of the exhaust gas recirculation device or the intake air flow rate sensor can be determined.

In this embodiment, the exhaust gas recirculation device corresponds to the exhaust gas recirculation means; the exhaust gas recirculation amount sensor 26 corresponds to the exhaust gas recirculation amount detecting means; the fuel injection valve 9 corresponds to the fuel injection means: and the lean NOx catalyst 21 corresponds to the NOx removing means. The ECU 20 constitutes the engine condition parameter calculating means, the engine control parameter calculating means, the fuel injection control means, the trapped NOx amount estimating means, and the failure determining means. Specifically, steps S101 to S103 of FIG. 24 correspond to the engine condition parameter calculating means, and steps S80 and S81 of FIG. 24 correspond to the engine control parameter calculating means. That is, the dividing ratio Rm1' (=Km1×Rm1) corrected by the dividing ratio correction coefficient Km1 corresponds to "the engine control parameter". Steps S79 to S83 of FIG. 21 correspond to the fuel injection control means, and steps S22 to S96 of FIG. 22 correspond to the failure determining means.

Fourth Embodiment

In this embodiment, the NOx emission amount, which is applied to the calculation of an amount of NOx trapped in the lean NOx catalyst 31, is corrected according to the distance parameter Discave. The points that are different from the third embodiment are described below.

Figure 28:
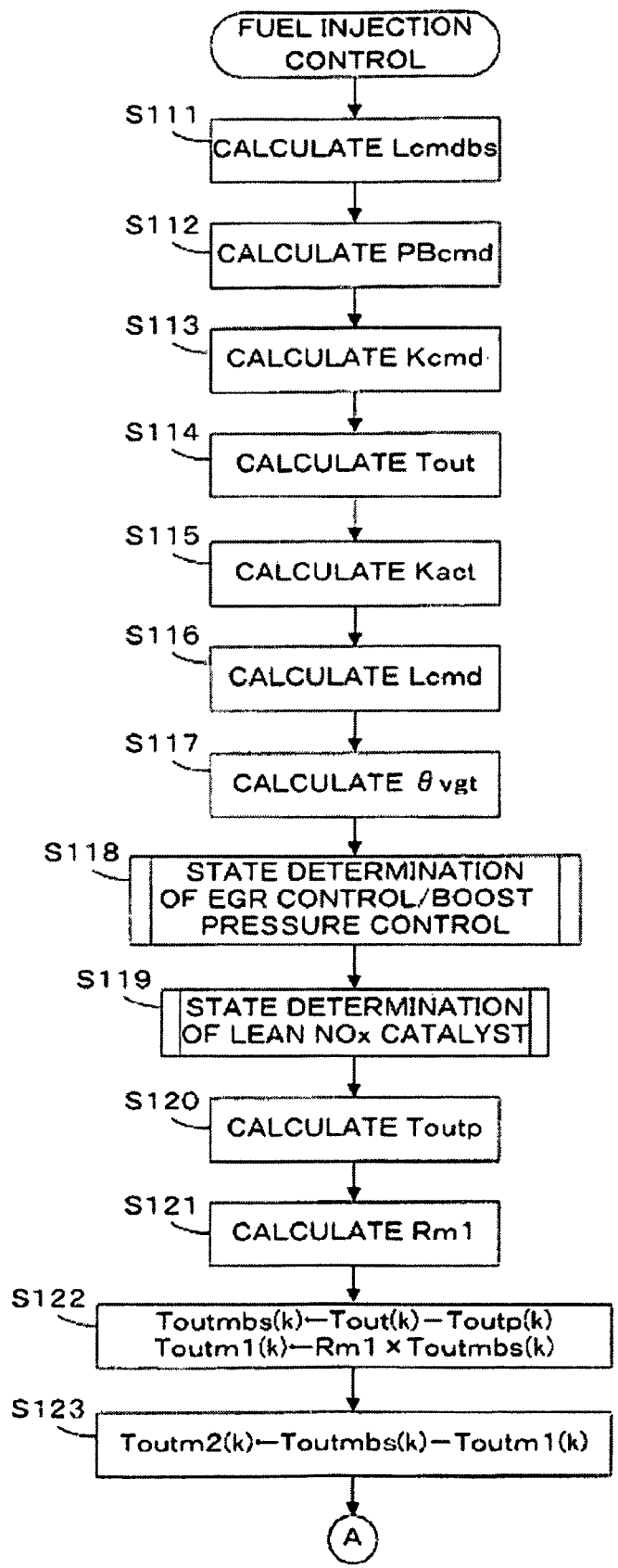
FIGS. 28 and 29 show a flowchart of the fuel injection control process according to a fourth embodiment of the present invention.
Figure 29:
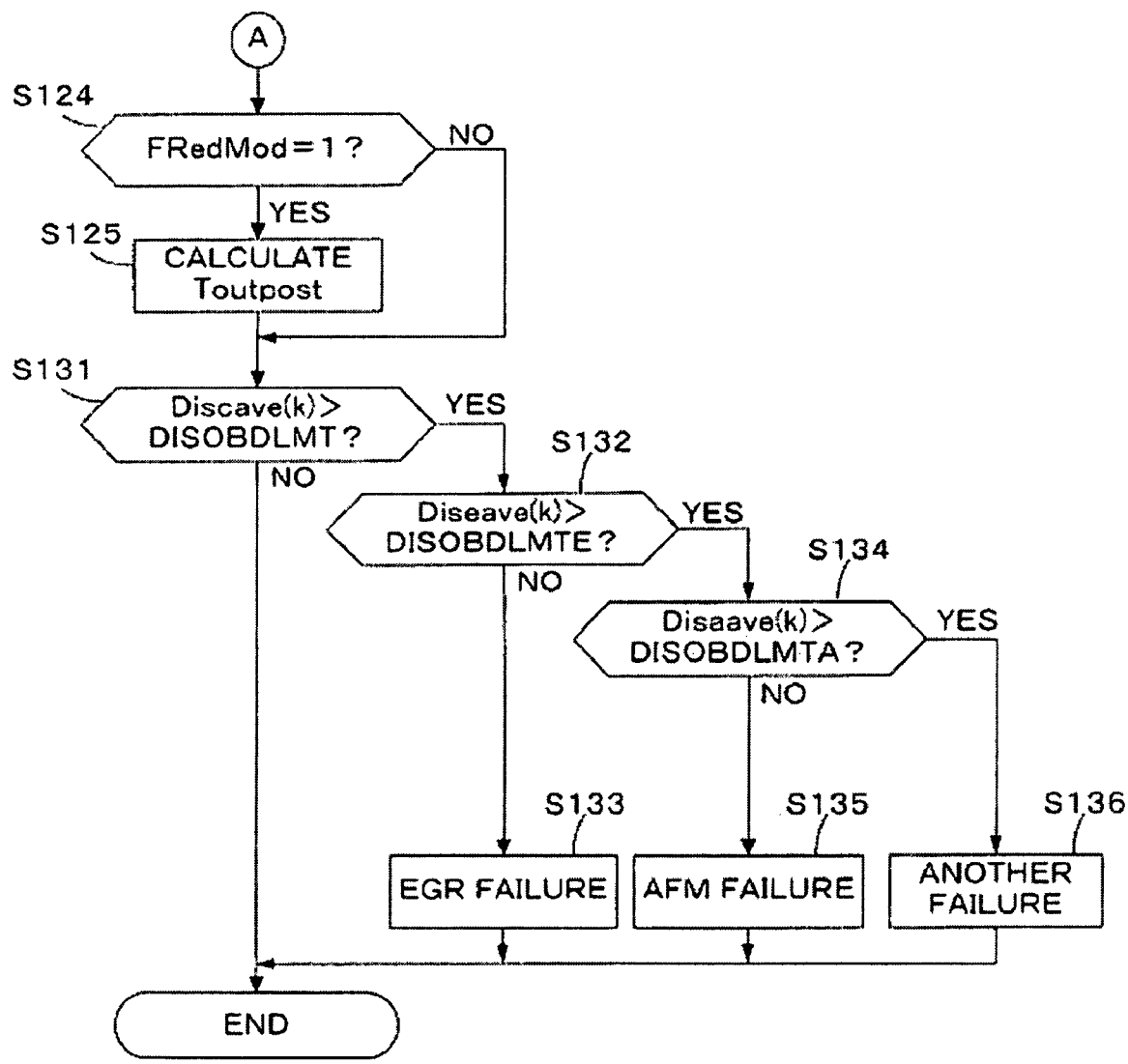

FIGS. 28 and 29 show a flowchart of the fuel injection control process in this embodiment. In steps S111 to S118, S120, S121 and S123 shown in FIG. 28, the same processes as steps S71 to S78, S79, S80, and S83 shown in FIG. 21 are performed. In steps S131 to S136 shown in FIG. 29, the same processes as steps S91 to S96 of FIG. 22 are performed.

Figure 30:
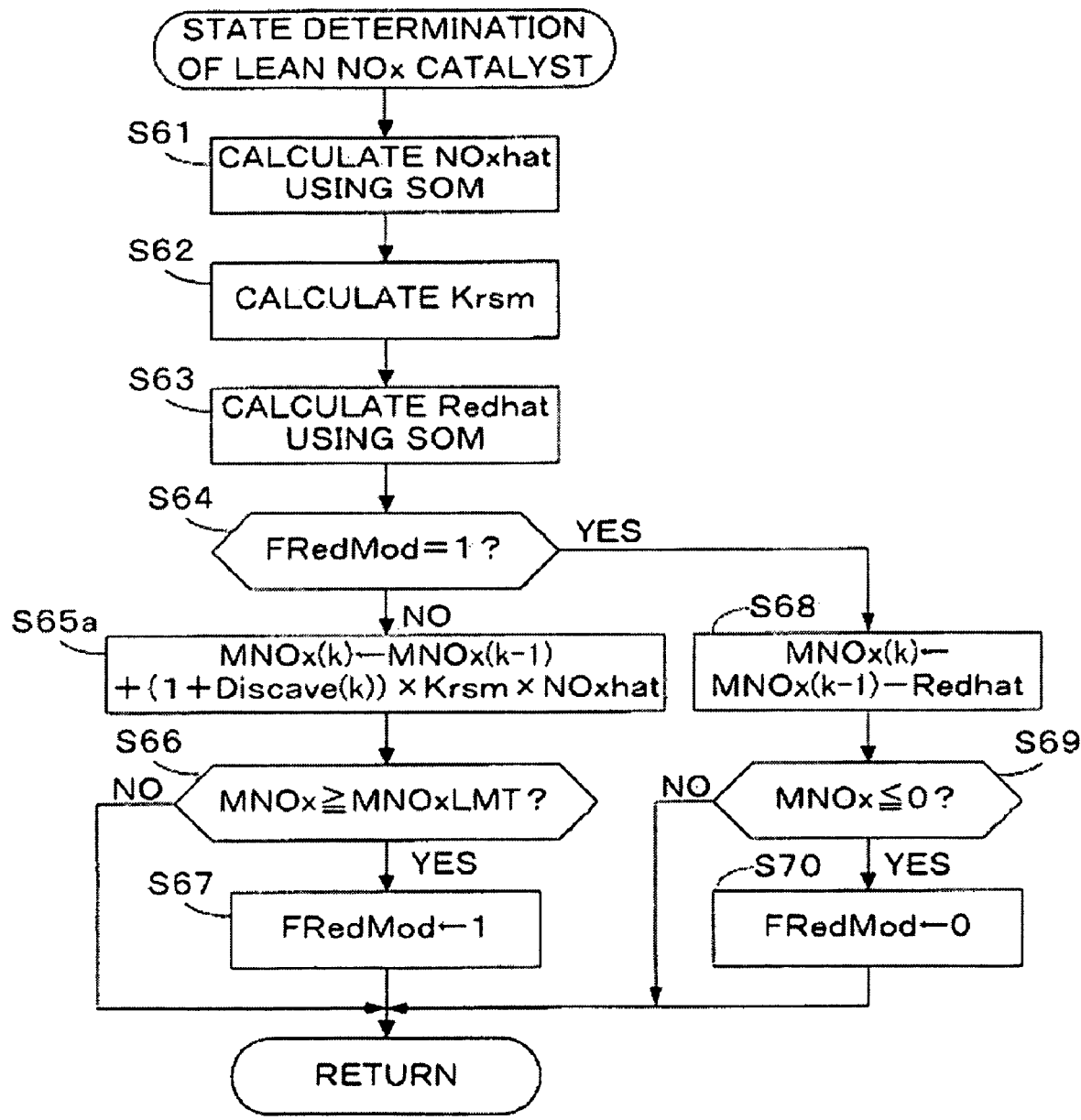
FIG. 30 is a flowchart of a process for performing a state determination of the lean NOx catalyst.

In step S119, a state determination process of the lean NOx catalyst shown in FIG. 30 is performed. The process of FIG.

30 is obtained by changing step S65 of FIG. 15 in the second embodiment to step S65a. In step S65a, the distance parameter Discave is applied to the following equation (71) instead of the equation (37) in which the correlation parameter a(k) is used, to calculate the trapped NOx amount MNOx.

$$MNOx(k)=MNOx(k-1)+(1+Discave(k)) \times Krsm \times Noxhat \quad (71)$$

In the equation (71), the second term on the right side which indicates an emission amount of NOx increases as the distance parameter Discave(k) increases. Accordingly, the trapped NOx amount MNOx corresponding to the increase in the actual NOx emission amount is obtained. Therefore, by determining the start timing of the NOx reduction process using the trapped NOx amount MNOx calculated by the equation (71) (steps S66 and S67), the NOx reduction process is started at an appropriate timing, to maintain an amount of NOx discharged to the downstream side of the lean NOx catalyst 31, at a comparatively low level.

Referring back to FIG. 28, in step S122, the first main injection amount Toutm1 is calculated by the equation (15a) in the second embodiment. In step S124 of FIG. 29, it is determined whether or not the reduction mode flag FRedMod is equaled to "1". If the answer to step S122 is affirmative (YES), the post injection amount Toutpost is calculated like step S51 of FIG. 13 in the second embodiment. That is, in the NOx reduction process, the post injection IPOST is performed and the reducing components are supplied to the exhaust system.

Figure 31A:
Figure 31B:
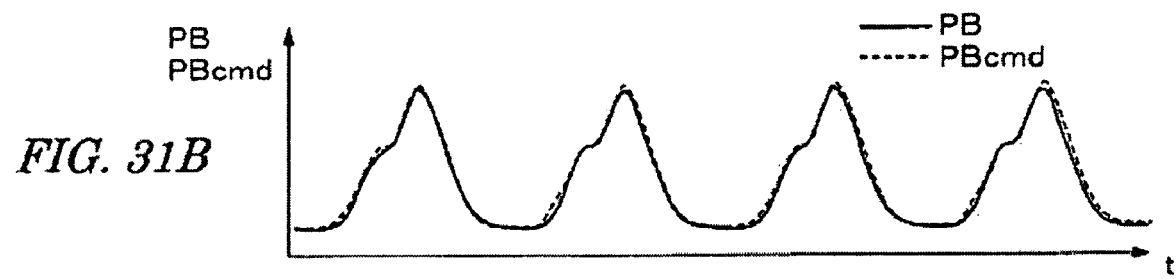
Figure 31C:
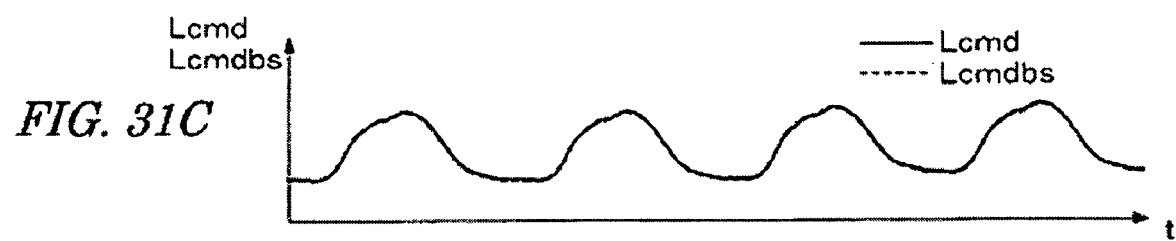
Figure 31D:
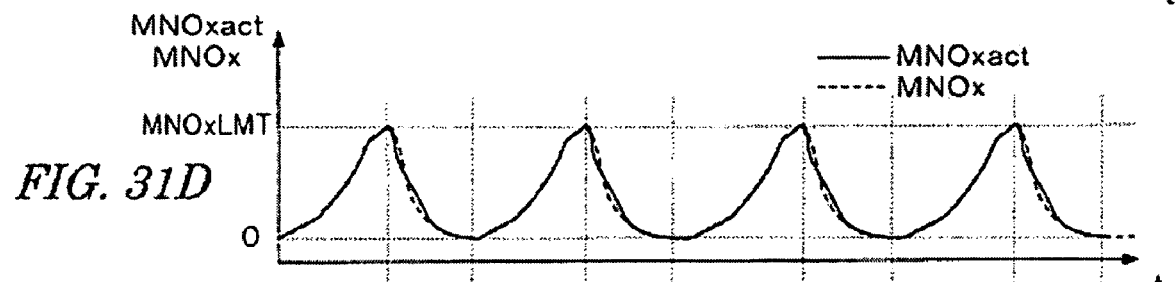
Figure 31E:
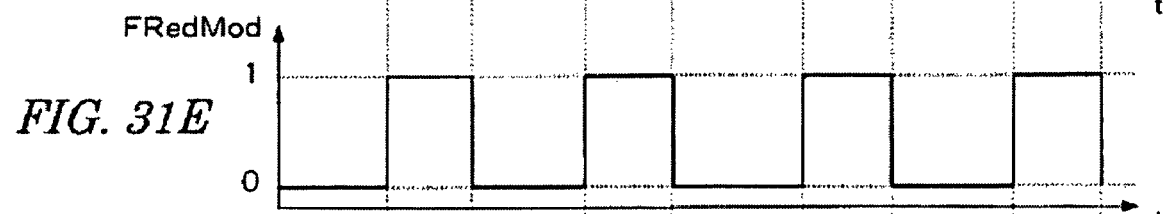
Figure 31F:
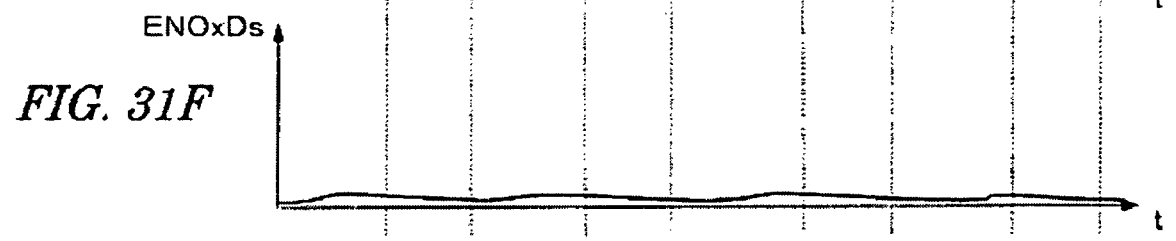

FIGS. 31A-31F show time charts of an example of the control operation with respect to the reference engine. These time charts respectively show changes in the engine rotational speed NE, the target boost pressure PBcmd, the boost pressure PB, the EGR valve lift amount basic command value Lcmdbs, the EGR valve lift amount command value Lcmd, the trapped NOx amount MNOx calculated by the equation (71) or (38), the actual trapped NOx amount MNOxact, the NOx reduction mode flag FRedMod, and the downstream side NOx emission amount ENOxDS. In FIG. 31B, the solid line corresponds to the detected boost pressure PB, and the dashed line corresponds to the target boost pressure PBcmd. The two lines substantially coincide with each other. In FIG. 31C, the solid line corresponds to the lift amount command value Lcmd, and the dashed line corresponds to the lift amount basic command value Lcmdbs. The two lines substantially coincide with each other. Further, in FIG. 31D, the solid line corresponds to the actual trapped NOx amount MNOxact, and the dashed line corresponds to the calculated trapped NOx amount MNOx. The actual trapped NOx amount MNOxact and the calculated trapped NOx amount MNOx substantially coincide with each other. In this state, the NOx reduction process is performed at an appropriate timing, thereby maintaining the downstream NOx emission amount ENOxDS at a comparatively low level.

FIGS. 32A and 32B show an example of the control operation in which a clogging of the EGR valve has occurred and the correction of the emission amount of NOx by the distance parameter Discave is not performed. Changes in the engine rotational speed NE, which are not shown in FIGS. 32A and 32B, is the same as that of FIG. 31A. As shown in FIG. 32A, a difference between the target boost pressure PBcmd and the detected boost pressure PB gradually increases, and a difference between the lift amount basic command value Lcmdbs and the lift amount command value Lcmd also gradually increases as shown in FIG. 32B. This is because the two feedback controls (steps S76 and S77) are operating to compensate the influence of reduction in the actual exhaust gas recirculation amount EGRact. Therefore, as shown in FIG. 32C, the actual trapped NOx amount MNOxact becomes greater than the calculated trapped NOx amount MNOx shown by the dashed line. Consequently, as shown in FIG. 32D, the start timing of the NOx reduction process (timing at which FRedMod changes from "0" to "1") delays, and the downstream NOx emission amount ENOxDS increases immediately before the start of the NOx reduction process (FIG. 32E).

FIGS. 33A-33D show an example of the control operation in which the NOx emission amount is corrected according to the distance parameter Discave(k) (equation (71)) in the example shown in FIGS. 32A-32E. The solid line of FIG. 33B shows changes in the actual trapped NOx amount MNOxact. The distance parameter Discave(k) gradually converges to a value which reflects the present engine state by repeating the control operation. The corrected NOx emission amount (=(1+Discave(k))×Krsm×NOxhat) becomes appropriate along with the convergence of the distance parameter Discave(k), and the start timing of the NOx reduction process gradually becomes appropriate as shown in FIG. 33C. Consequently, the downstream side NOx emission amount ENOxDS gradually decreases as shown in FIG. 33D.

As described above, in the present embodiment, the estimated NOx emission amount NOxhat is calculated using the NOx emission amount SOM, and the estimated NOx emission amount Noxhat is corrected by the distance parameter Discave(k) and the modifying coefficient Krsm, to calculate the trapped NOx amount MNOx of the lean NOx catalyst 31. Accordingly, the influence of the characteristic variation or aging of the engine (especially the exhaust gas recirculation device) can be eliminated, thereby obtaining an accurate value of the trapped NOx amount MNOx. Consequently, it is possible to perform the reduction process of the trapped NOx at an appropriate timing, and such a situation that the emission amount of NOx exceeds the regulation value can be avoided.

In this embodiment, the ECU 20 constitutes the engine condition parameter calculating means, the engine control parameter calculating means, the fuel injection control means, and the failure determining means. Specifically, steps S61 to S65a of FIG. 30 correspond to the engine control parameter calculating means. That is, the trapped NOx amount MNOx of the lean NOx catalyst 31 corresponds to "the engine control parameter". Steps S120 to S123 of FIG. 28, and steps S124 and S125 of FIG. 29 correspond to the fuel injection control means, and steps S131 to S136 of FIG. 29 correspond to the failure determining means.

Fifth Embodiment

Figure 34:
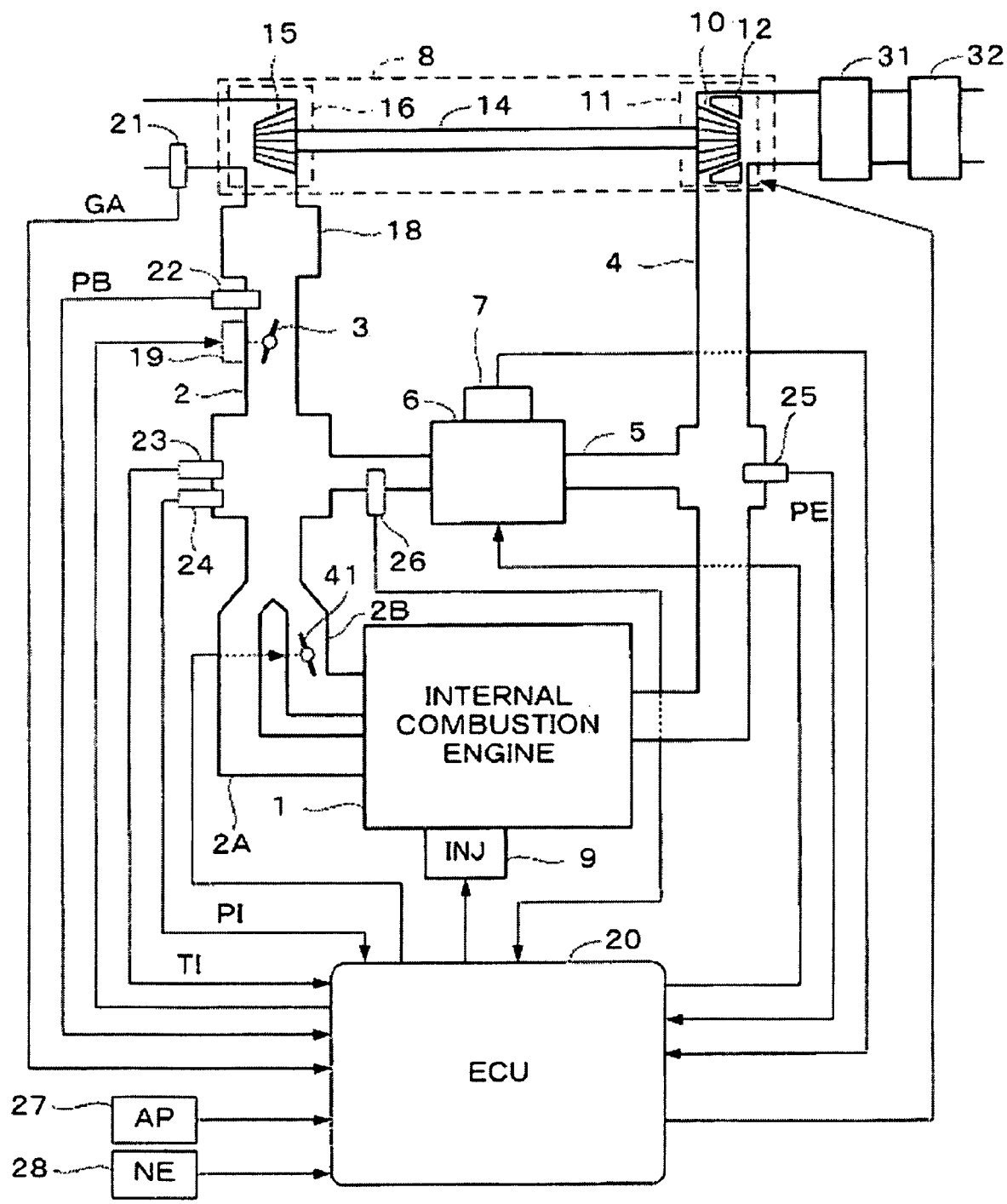
FIG. 34 shows a configuration of an internal combustion engine and a control system therefor according to a fifth embodiment of the present invention.

FIG. 34 shows a configuration of an internal combustion engine and a control system therefor according to a fifth embodiment of the present invention. In this embodiment, the intake pipe 2 branches out to intake pipes 2A and 2B, and further branches out corresponding to each cylinder of the engine. In FIG. 34, the configuration corresponding to only one cylinder is shown. Each cylinder of engine 1 is provided with two intake valves (not shown) and two exhaust valves (not shown). Two intake gates (not shown), opened and closed by the two intake valves, are connected respectively to the intake pipes 2A and 2B.

Further, a swirl control valve 41 (hereinafter referred to as "SCV") is disposed in the intake pipe 2B. The SCV 14 restricts the amount of air inhaled through the intake pipe 2B to generate a swirl in the combustion chamber of the engine 1.

The SCV 14 is a butterfly valve, which is driven by an actuator (not shown). A valve opening of the SCV 41 is controlled by the ECU 20.

In this embodiment, a valve opening control amount θSCV for the SCV 41 is corrected according to the correlation parameter a(k) described in the first embodiment. This embodiment is the same as the first embodiment except for the points described below. That is, in this embodiment, the correction of the dividing ratio Rm1 of the fuel injection amount and the valve opening control amount θSCV of the SCV 41 are performed according to the correlation parameter a(k).

Figure 35:
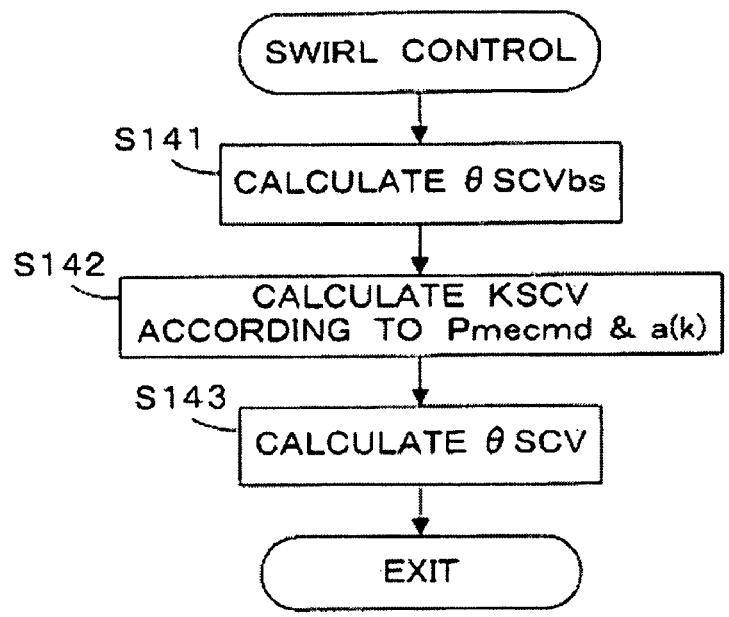
FIG. 35 is a flowchart of a process for controlling an opening of a swirl control valve in the fifth embodiment.

FIG. 35 is a flowchart of a process for performing a swirl control by changing the opening of the SCV 41. This process is executed at every predetermined time intervals (for example, 2 milliseconds) by the CPU in the ECU 20.

Figure 36A:
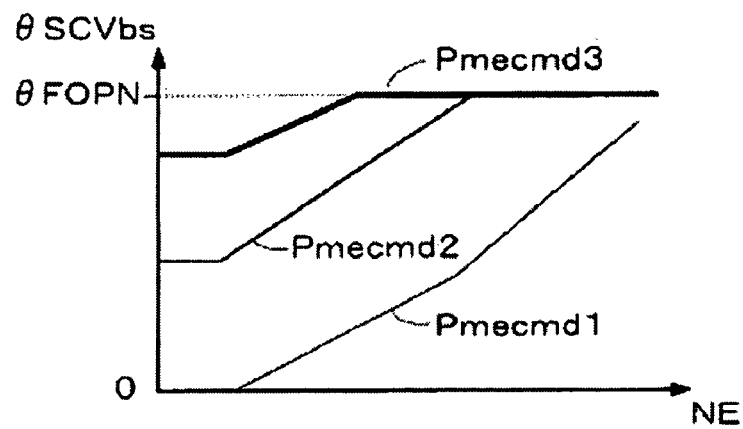
FIGS. 36A and 36B show maps referred to in the process of FIG. 35.

In step S141, a θSCVbs map shown in FIG. 36A is retrieved according to the engine rotational speed NE and the engine load target value Pmecmd, to calculate a basic opening control amount θSCVbs. The θSCVbs map is basically set so that the basic opening control amount θSCVbs increases as the engine rotational speed NE increases, and the basic opening control amount θSCVbs increases as the engine load target value Pmecmd increases. In FIG. 36A, the relationship of "Pmecmd1<Pmecmd2<Pmecmd3" is satisfied, like the embodiments described above.

The above-described setting of the θSCVbs map is adopted by taking the following points into consideration. In the low-load region and the medium-load region, the swirl in the combustion chamber is strengthened (the opening of the SCV 19 is set to a comparatively small value), so that the degree of mixing the injected fuel and air is made higher to improve the combustion state. In the high-load region, the swirl is weakened (the opening of the SCV 19 is set to a comparatively large value), since a change in the fuel concentration depending on a position in the combustion chamber becomes larger, and the particulate matter and unburnt fuel components increase in a portion where the fuel concentration is comparatively high, if the swirl is too strong. If the engine rotational speed NE becomes comparatively high, the intake air inertia increases. Accordingly, the fuel diffusibility in the combustion chamber increases even if the opening of the SCV 19 is maintained at the same level. Therefore, the opening of the SCV 19 is made larger compared with that in the low-rotational speed region, thereby optimizing the fuel diffusibility.

Figure 36B:
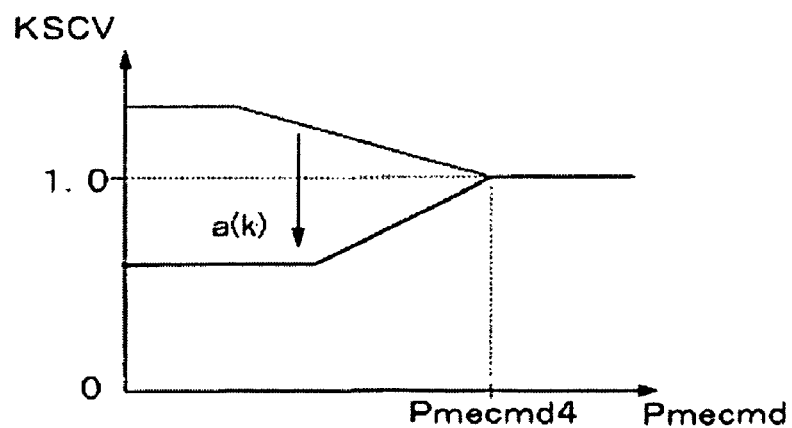

In step S142, a KSCV map shown in FIG. 36B is retrieved according to the engine load target value Pmecmd and the correlation parameter a(k), to calculate an SCV opening correction coefficient KSCV. The KSCV map is set as follows: the SCV opening correction coefficient KSCV is set to "1.0" regardless of the engine load target value Pmecmd, when the correlation parameter a(k) is equal to "1.0"; and the SCV opening correction coefficient KSCV decreases as the correlation parameter a(k) increases in the range where the engine load target value Pmecmd is less than a predetermined value Pmecmd4. When the correlation parameter a(k) is greater than "1.0", the actual exhaust gas recirculation amount EGRact is greater than the exhaust gas recirculation amount in the reference engine. Accordingly, the swirl is strengthened to improve the combustion state. On the other hand, when the correlation parameter a(k) is less than "1.0", the actual exhaust gas recirculation amount EGRact is less than the exhaust gas recirculation amount in the reference engine. Accordingly, the swirl is weakened to reduce the combustion speed, thereby reducing the NOx emission amount.

In step S143, the SCV opening control amount θSCV is calculated by the following equation (81).

$$\theta SCV = KSCV \times \theta SCVbs \tag{81}$$

It is to be noted that the calculated SCV opening control amount θSCV exceeds an upper limit value θSCVMAX which corresponds to a fully open state of the SCV 41, the SCV opening control amount θSCV is set to the upper limit value θSCVMAX.

In this embodiment, not only the dividing ratio Rm1 of the fuel injection amount but also the opening of the SCV 41 are corrected according to the correlation parameter a(k). Therefore, the divided injections are performed with an appropriate dividing ratio and the swirl of a suitable strength is generated, regardless of the characteristic variation or aging of the engine, thereby improving the robustness of the NOx emission amount.

In this embodiment, the dividing ratio Rm1' and the SCV opening control amount θSCV correspond to the "engine control parameter", and the process of FIG. 35 constitutes a part of the engine control parameter calculating means.

Sixth Embodiment

This embodiment is obtained by adding the calculation process of the SCV opening control amount θSCV using the distance parameter Discave(k) to the third embodiment. That is, the configuration wherein the exhaust recirculation amount sensor 26 is removed from the configuration of FIG. 34, and the air-fuel ratio sensor 30 is added thereto, is adopted (not shown). This embodiment is the same as the third embodiment except for the points described below.

Figure 37:
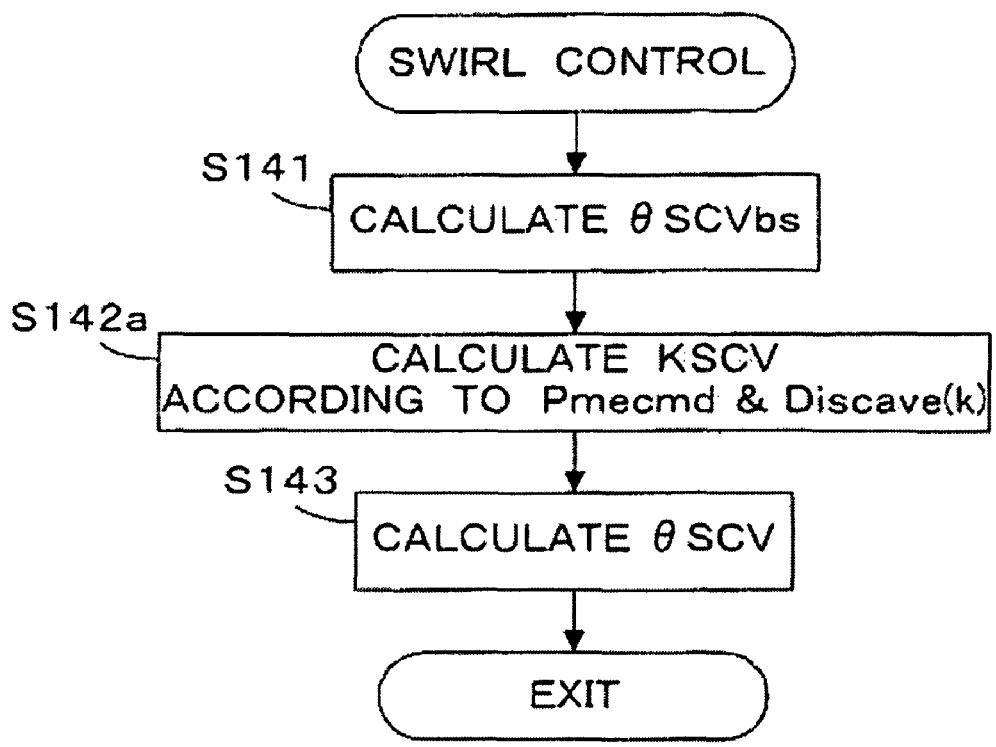
FIG. 37 is a flowchart of a process for controlling an opening of the swirl control valve in a sixth embodiment.

FIG. 37 is a flowchart of the swirl control process in this embodiment. In FIG. 37, steps S141 and S143 are the same as those shown in FIG. 35.

Figure 38:
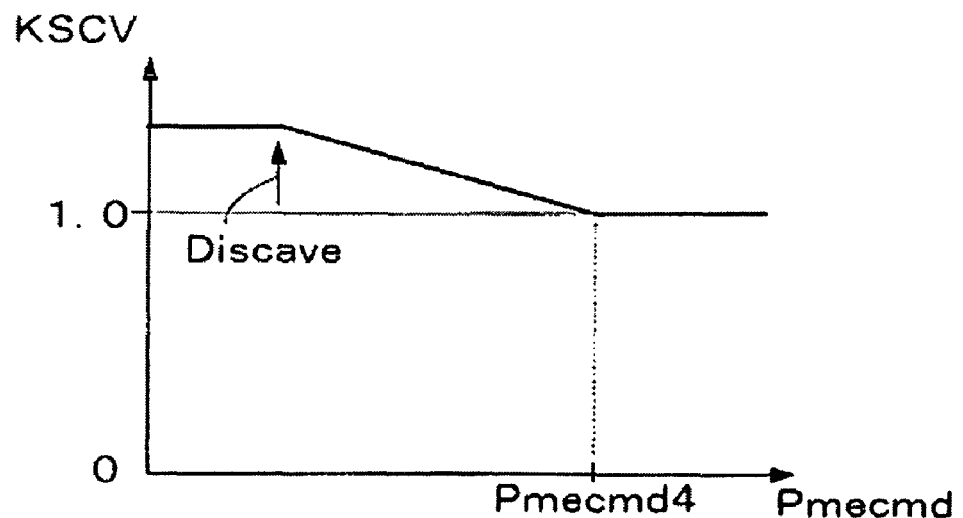
FIG. 38 shows a map referred to in the process of FIG. 37.

In step S142a, a KSCV map shown in FIG. 38 is retrieved according to the engine load target value Pmecmd and the distance parameter Discave(k), to calculate the SCV opening correction coefficient KSCV. The KSCV map is set as follows: the SCV opening correction coefficient KSCV is set to "1.0" regardless of the engine load target value Pmecmd, when the distance parameter Discave(k) is equal to "0"; and the SCV opening correction coefficient KSCV increases as the distance parameter Discave(k) increases in the range where the engine load target value Pmecmd is less than the predetermined value Pmecmd4. When the distance parameter Discave(k) is greater than "0", the actual exhaust gas recirculation amount EGRact is less than the exhaust gas recirculation amount in the reference engine. Accordingly, the swirl is weakened to reduce the combustion speed, thereby reducing the NOx emission amount.

In this embodiment, not only the dividing ratio Rm1 of the fuel injection amount but also the opening of the SCV 41 are corrected according to the distance parameter Discave(k). Therefore, the divided injections are performed with an appropriate dividing ratio and the swirl of a suitable strength is generated, regardless of the characteristic variation or aging of the engine, thereby improving the robustness of the NOx emission amount.

In this embodiment, the dividing ratio Rm1' and the SCV opening control amount θSCV correspond to the "engine control parameter", and the process of FIG. 37 constitutes a part of the engine control parameter calculating means.

The present invention is not limited to the embodiments described above, and various modifications may be made. For example, in the first, second, and fifth embodiments, not only the self-organizing map but also what is known as the so-called perceptron, as shown in FIGS. 39 and 40, are applicable as the neural network.

Figure 39:
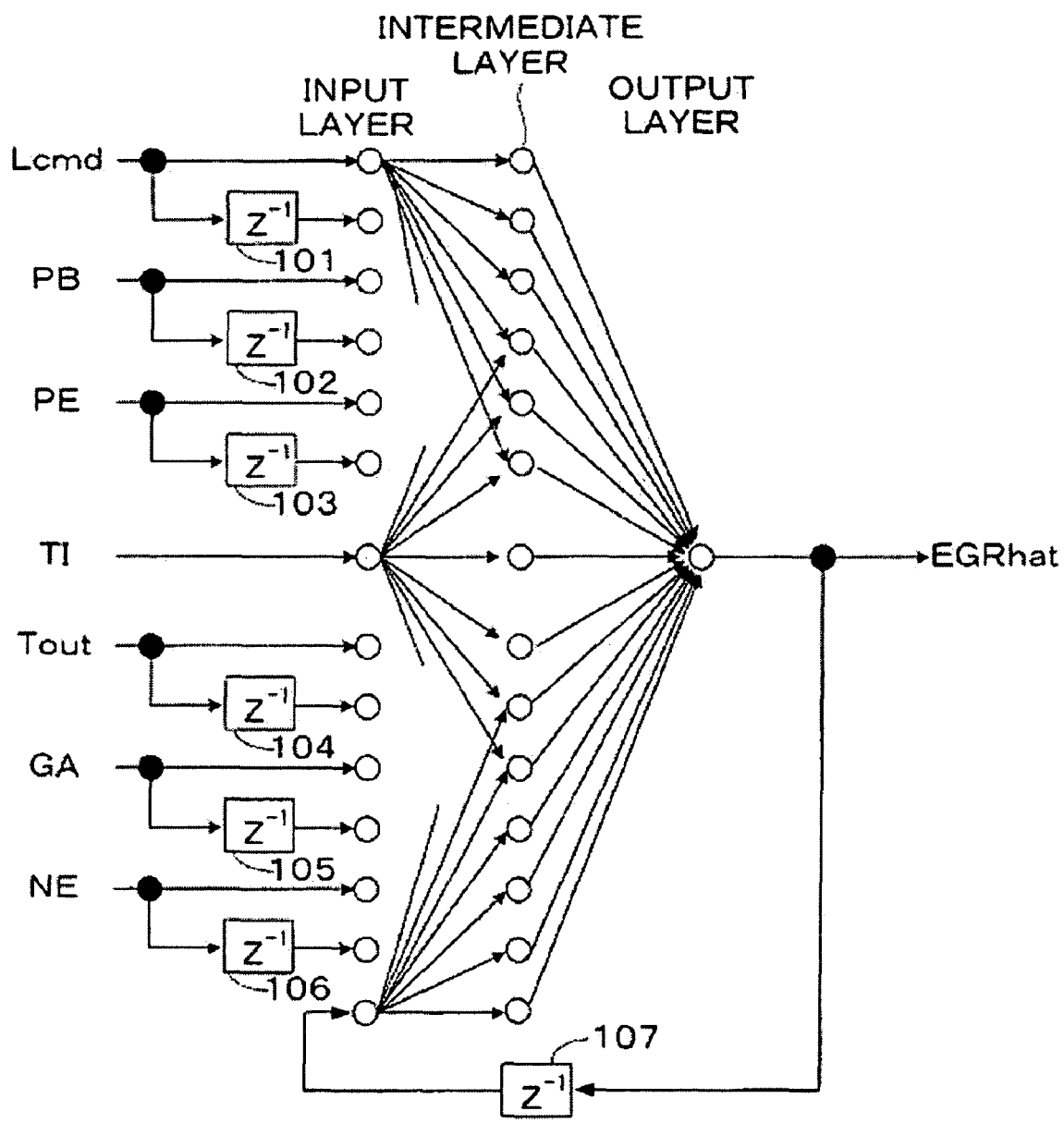
FIG. 39 illustrates a perceptron for calculating the estimated exhaust gas recirculation amount (EGRhat)
Figure 40:
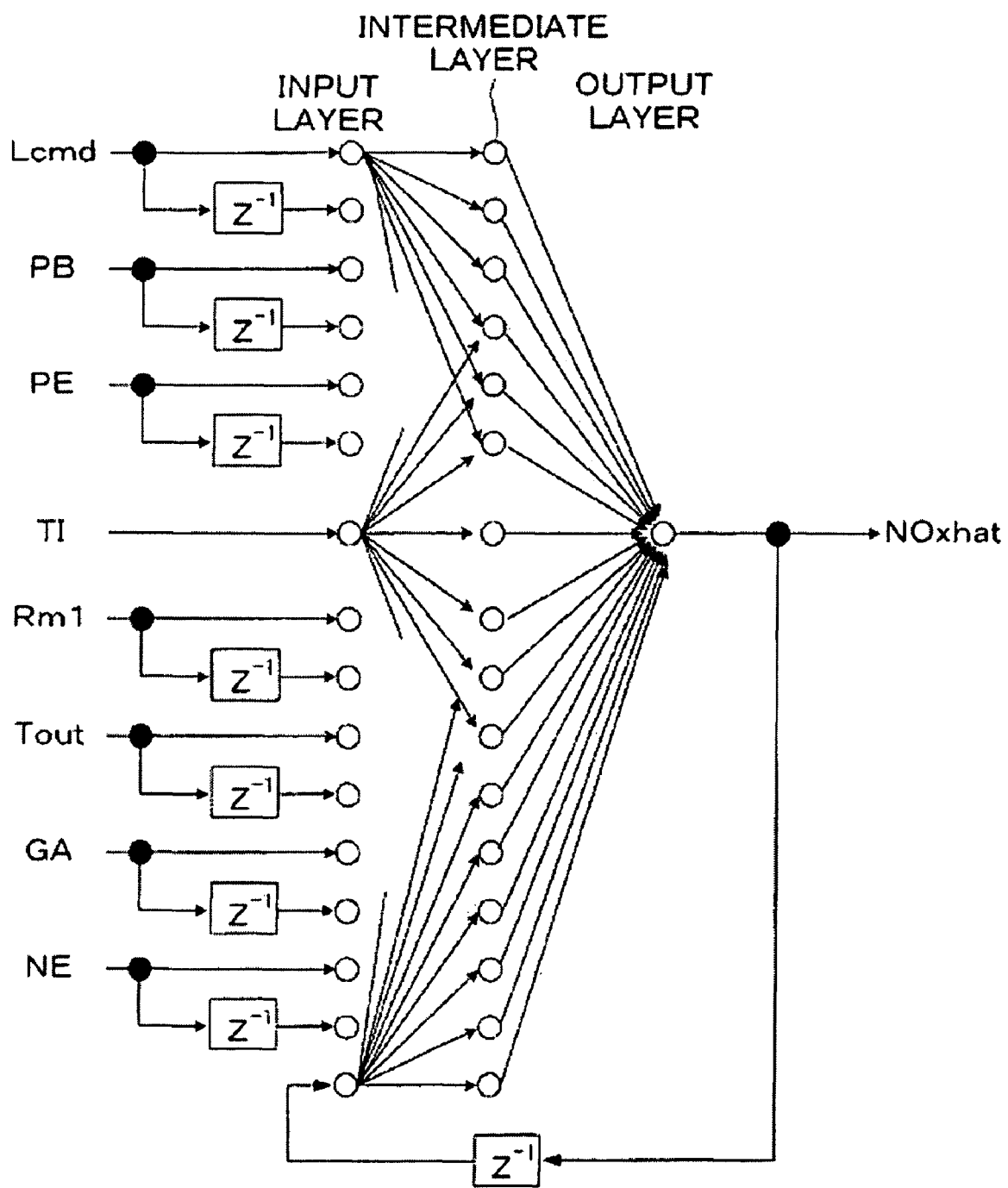
FIG. 40 illustrates a perceptron for calculating an estimated NOx emission amount (NOxhat).

The neural network shown in FIG. 39 is configured for calculating the estimated exhaust gas recirculation amount EGRhat. This neural network has a three-layer structure of an input layer, an intermediate layer, and an output layer, and further includes delay blocks 101 to 107 for delaying the input data by one sampling period. The well-known back-propagation learning algorithm is adopted as a learning algorithm. It is to be noted that other methods, such as the random search method, may be adopted as the learning algorithm.

The parameters which are input to the neurons of the input layer are the input parameters of the EGR amount SOM described above, i.e., the lift amount command value Lcmd, the boost pressure PB, the exhaust pressure PE, the intake air temperature TI, the fuel injection amount Tout, the intake air flow rate GA, the engine rotational speed NE, and the preceding values of these parameters (except for the intake air temperature TI) detected one sampling period before, and the preceding value of the estimated exhaust gas recirculation amount EGRhat which is the output parameter of the neural network calculated one sampling period before.

If the input parameter is expressed by Ui (i=1 to Ni), each input parameter Ui is weighted by a coupling coefficient matrix, and the weighted input parameters (Wij·Ui) are input to each neuron of the intermediate layer. An output Xj(k) (j=1 to Nj) of the intermediate layer is given by the following equation (81). In the equation (81), "Wij" is a coupling coefficient; "W0" is an additional term; and "F" is an input/output function to which, for example, a sigmoid function or a radial basis function and the like are applied.

$$Xj(k) = F\left(\sum_{i=0}^{Ni} Wij \cdot Ui(k) + W0\right) \quad (81)$$

In the output layer, if an output parameter is expressed by Y(k), the output parameter Y(k) is given by the following equation (82). In this equation, "Rj" is a coupling coefficient and "R0" is an additional term.

$$Y(k) = \sum_{j=0}^{Nj} Rj \cdot Xj(k) + R0 \quad (82)$$

The coupling coefficients Wij and Rj, and the additional terms W0 and R0 in the equations (81) and (82) are previously calculated with a predetermined learning algorithm using input data for the learning, and stored in the memory. The engine on which the setting of the neural network is based is the reference engine of the average characteristic like the EGR amount SOM described above.

An estimation accuracy in the transient state can be improved by adopting the preceding values of the engine operating parameters and the preceding value of the output parameter, as the input parameters. In the configuration shown in FIG. 39, the data detected one sampling period before are used as the input parameters. Alternatively, the data detected two sampling periods before, and/or the data detected three sampling periods before may further be used.

The neural network shown in FIG. 40 is configured for calculating the estimated NOx emission amount NOxhat, and has the same structure as that of the neural network shown in FIG. 39. It is to be noted that the dividing ratio Rm1 of the main injection is added as an input parameter. The estimated NOx emission amount NOxhat can be calculated using the equations similar to the equations (81) and (82).

The neural network for calculating the estimated reducing component emission amount Redhat can be similarly configured by adding the post injection amount Toutpost as an input parameter to the neural network shown in FIG. 39.

Further, in the first, second, and fifth embodiments described above, the correlation parameter a(k), which indicates the relationship between the estimated exhaust gas recirculation amount EGRhat calculated by the EGR amount SOM and the detected actual exhaust gas recirculation amount EGRact, is used as the difference parameter. Alternatively, a difference (EGRact−EGRhat) between the actual exhaust gas recirculation amount EGRact and the estimated exhaust gas recirculation amount EGRhat, or a ratio (EGRact/EGRhat) may be used as the difference parameter.

In the above-described first embodiment, an example in which the correlation parameter a(k) is applied only to the calculation of the dividing ratio Rm1' of the fuel injection amount is shown, and in the second embodiment, an example in which the correlation parameter a(k) is applied only to the calculation of the trapped NOx amount MNOx is shown. Alternatively, the correlation parameter a(k) may be applied to the calculation of the dividing ratio Rm1' and the calculation of the trapped NOx amount MNOx by combining the two examples shown in the first and second embodiments. In such a combination, it is to be noted that it is necessary to make a degree of each correction with the correlation parameter a(k) less than that in the examples of the first and second embodiments.

In the above-described third embodiment, an example in which the distance parameter Discave is applied only to the calculation of the dividing ratio Rm1' of the fuel injection amount is shown, and in the fourth embodiment, an example in which the distance parameter Discave is applied only to the calculation of the trapped NOx amount MNOx is shown. Alternatively, the distance parameter Discave may be applied to the calculation of the dividing ratio Rm1' and the calculation of the trapped NOx amount MNOx by combining the two examples shown in the third and fourth embodiments. In such a combination, it is to be noted that it is necessary to make a degree of each correction with the distance parameter Discave less than that in the examples of the third and fourth embodiments.

Further, in the above-described embodiments, two or more input parameters are input to the neural network. When using the neural network with one input parameter, the output parameter can be estimated accurately taking the influence of the input parameter.

Further the above-described fifth and sixth embodiments are implemented by adding the swirl control (FIGS. 35 and 37) respectively to the first and third embodiments. The swirl control of FIG. 35 may be added to the second embodiment, and the swirl control of FIG. 37 may be added to the fourth embodiment.

The present invention can be applied also to a control system for a watercraft propulsion engine, such as an outboard engine having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A control system for an internal combustion engine having exhaust gas recirculation means for recirculating a part of exhaust gases to an intake system of said engine, the control system comprising:
    estimated exhaust recirculation amount calculating means for calculating an estimated exhaust gas recirculation amount, using a neural network to which at least one engine operating parameter indicative of an operating condition of said engine is input, wherein said neural network outputs an estimated value of an amount of exhaust gases recirculated by said exhaust gas recirculation means;
    engine control parameter calculating means for calculating at least one engine control parameter for controlling said engine, based on the estimated exhaust gas recirculation amount, and
    exhaust gas recirculation amount detecting means for detecting the exhaust gas recirculation amount, wherein said engine control parameter calculating means has difference parameter calculating means for calculating a difference parameter indicative of a difference between the detected exhaust gas recirculation amount and the estimated exhaust gas recirculation amount,
    wherein said engine control parameter calculating means calculates the at least one engine control parameter according to the difference parameter.

2. A control system according to claim 1, wherein said neural network is a neural network to which a self-organizing map algorithm is applied.

3. A control system according to claim 1, wherein the difference parameter is a correlation parameter indicative of a relationship between the estimated exhaust gas recirculation amount and the detected exhaust gas recirculation amount, and the correlation parameter is calculated using a sequential statistical processing algorithm.

4. A control system according to claim 1, wherein said engine has fuel injection means for injecting fuel into a combustion chamber of said engine, and said control system includes fuel injection control means for controlling said fuel injection means so that said fuel injection means performs a plurality of fuel injections in one combustion cycle of said engine in a predetermined operating condition of said engine,
    wherein the at least one engine control parameter includes a dividing ratio of fuel injection amounts corresponding to the plurality of fuel injections.

5. A control system according to claim 1, wherein said engine has NOx removing means for removing NOx in the exhaust gases, and said control system includes trapped NOx amount estimating means for calculating an estimated trapped NOx amount which is an estimated value of an amount of NOx trapped by said NOx removing means,
    wherein the at least one engine control parameter includes the estimated trapped NOx amount.

6. A control system according to claim 1, wherein said engine has swirl control means for controlling a swirl of an air-fuel mixture in a combustion chamber of said engine, and the at least one engine control parameter includes a control amount of said swirl control means.

7. A control system according to claim 1, further comprising failure determining means for determining a failure of said exhaust gas recirculation means based on the difference parameter.

8. A control method for an internal combustion engine having an exhaust gas recirculation device for recirculating a part of exhaust gases to an intake system of said engine, the control method comprising the steps of:
    a) calculating an estimated exhaust gas recirculation amount, using a neural network to which at least one engine operating parameter indicative of an operating condition of said engine is input, wherein said neural network outputs an estimated value of an amount of exhaust gases recirculated by said exhaust gas recirculation device;
    b) calculating at least one engine control parameter for controlling said engine, based on the estimated exhaust gas recirculation amount,
    c) detecting the exhaust gas recirculation amount; and
    d) calculating a difference parameter indicative of a difference between the detected exhaust gas recirculation amount and the estimated exhaust gas recirculation amount,
    wherein the at least one engine control parameter is calculated according to the difference parameter.

9. A control method according to claim 8, wherein said neural network is a neural network to which a self-organizing map algorithm is applied.

10. A control method according to claim 8, wherein the difference parameter is a correlation parameter indicative of a relationship between the estimated exhaust gas recirculation amount and the detected exhaust gas recirculation amount, and the correlation parameter is calculated using a sequential statistical processing algorithm.

11. A control method according to claim 8, wherein said engine has at least one fuel injection valve for injecting fuel into a combustion chamber of said engine, and said control method includes the step of
    e) controlling said at least one fuel injection valve so that said at least one fuel injection valve performs a plurality of fuel injections in one combustion cycle of said engine in a predetermined operating condition of said engine,
    wherein the at least one engine control parameter includes a dividing ratio of fuel injection amounts corresponding to the plurality of fuel injections.

12. A control method according to claim 8, wherein said engine has a NOx removing device for removing NOx in the exhaust gases, and said control method includes the step of
    f) calculating an estimated trapped NOx amount which is an estimated value of an amount of NOx trapped by said NOx removing means,
    wherein the at least one engine control parameter includes the estimated trapped NOx amount.

13. A control method according to claim 8, wherein said engine has at least one swirl control valve for controlling a swirl of an air-fuel mixture in a combustion chamber of said engine, and the at least one engine control parameter includes a control amount of said at least one swirl control valve.

14. A control method according to claim 8, further comprising the step of
    g) determining a failure of said exhaust gas recirculation device based on the difference parameter.

* * * * *